Sept. 24, 1940.  S. BRAND ET AL  2,216,063
CALCULATING MACHINE
Filed June 13, 1935  26 Sheets-Sheet 1
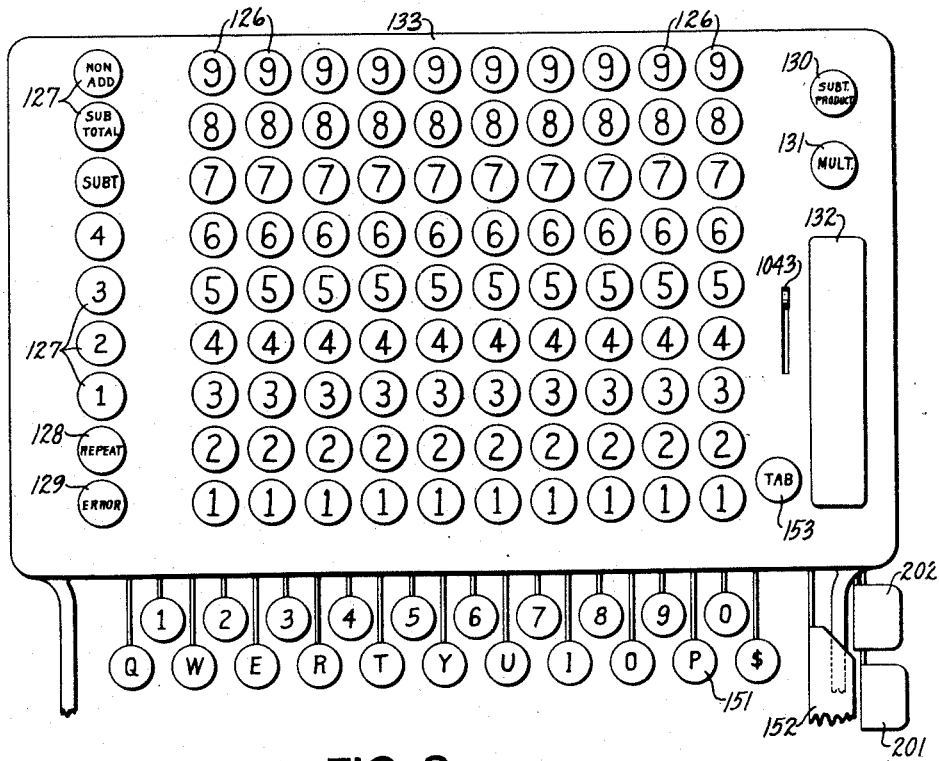
Inventors
Samuel Brand and
Gunnar Nelson
By
their attorney Sept. 24, 1940.　　　S. BRAND ET AL　　　2,216,063
CALCULATING MACHINE
Filed June 13, 1935　　　26 Sheets-Sheet 2

Add Subt Product Accumulator.

Add Product Accumulator.

F-Cycle.

G-Cycle.

H-Cycle.

1-Times Multiplicand.

2-Times Multiplicand.

Inventors
Samuel Brand and
Gunnar Nelson
By Carl Beust
their Attorney

Sept. 24, 1940.  S. BRAND ET AL  2,216,063
CALCULATING MACHINE
Filed June 13, 1935  26 Sheets-Sheet 3

3-Times Multiplicand.

4-Times Multiplicand.

5-Times Multiplicand.

6-Times Multiplicand.

7-Times Multiplicand.

8-Times Multiplicand.

Inventors
Samuel Brand and
Gunnar Nelson
By Carl Benst
their Attorney

Sept. 24, 1940.   S. BRAND ET AL   2,216,063
CALCULATING MACHINE
Filed June 13, 1935   26 Sheets-Sheet 4

9-Times Multiplicand.

Cycle-A.

Cycle-B.

Cycle-C.

Cycle-D.

Cycle-E.

Inventors
Samuel Brand and
Gunnar Nelson
By Carl Benst
their Attorney

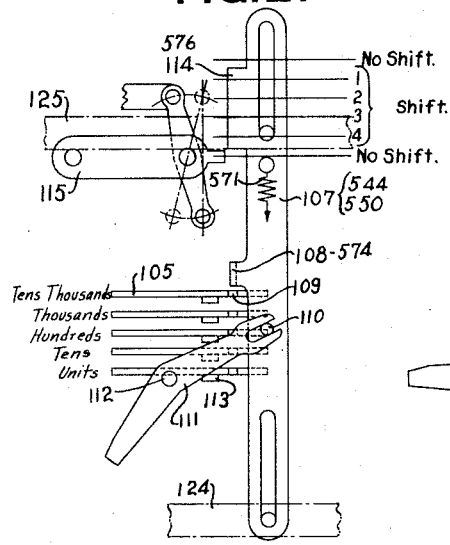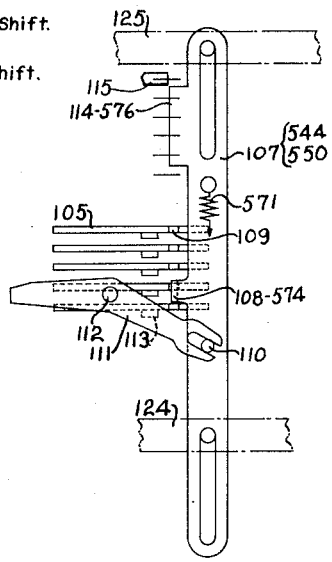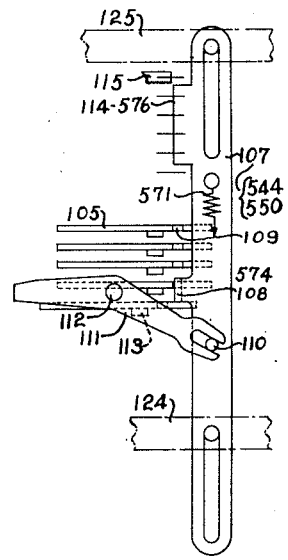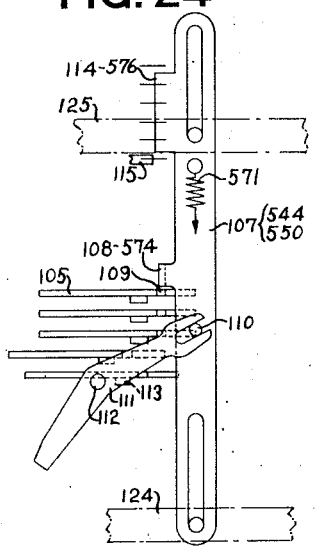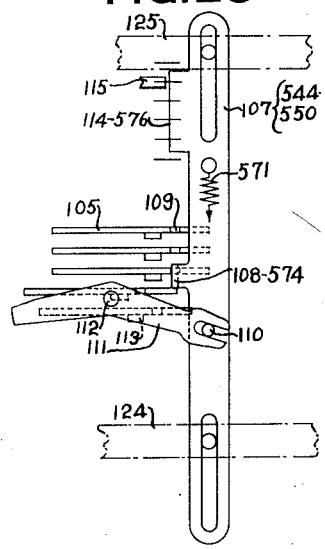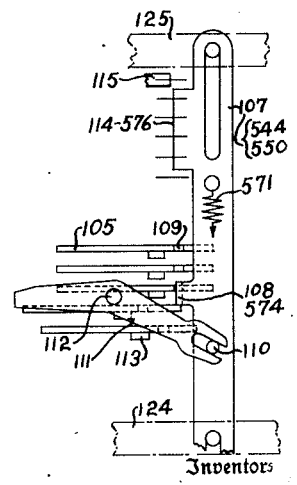

360° Represents one Cycle of a multiplying operation or a complete operation of the Accounting Machine.

Sept. 24, 1940.    S. BRAND ET AL    2,216,063
CALCULATING MACHINE
Filed June 13, 1935    26 Sheets-Sheet 8

FIG. 28

"F" is the 1st cycle in a Multiplying Operation.
The condition for this cycle is set in either Cycle "C" or "E".

Multiplier Digits: 0 1 2 3 4 5 6 7 8 9 A B

| # | Name of Control Disk | Event |
|---|---|---|
| 1 | Multiplier Racks Coupling Pinions 102. Disk 423. Fig.60. | Uncoupled / Coupled |
| 2 | Add-Subtract Product Accumulator 103. Disk 813. Fig. 71. | Add / Neutral / Sub.Tot. / Subt.orTot |
| 24 | Add-Subtract Product Accumulator 103. Disk 816. Fig. 70. | Add / Neutral / Sub.Tot. / Subt.orTot. — Subtract key will make this Disk active & cripple Disk 7 |
| 3 | Add Product Accumulator. 104. Disk 412. Fig. 66. | Add / Neutral / Sub.Tot. / Subt.orTot. |
| 4 | Multiplier Segments 105 Engaging Disk 493. Fig. 61. | Add / Neutral / Sub.Tot. / Subt.orTot. |
| 5 | *1 Multiplicand Control Disk 358. Fig.64. 1 times Multiplicand. | Add / Neutral / Sub.Tot. / Subt.orTot. |
| 6 | *2 Multiplicand Control Disk 425 Fig.63. 2 times Multiplicand. | Add / Neutral / Sub.Tot. / Subt.orTot. |
| 7 | *3 Multiplicand Control Disk 372. Fig.65. 3 times Multiplicand. | Add / Neutral / Sub.Tot. / Subt.orTot. |
| 8 | *10 Multiplicand Control Disk 283. Fig.62. 10 times Multiplicand. | Add / Neutral / Sub.Tot. / Subt.orTot. |
| 9 | *2 Multiplicand Storage Device Shifts to Main Racks. Disk 757. Fig.54. | Neutral / Shifts. |
| 10 | *2 Multiplicand Storage Device Shifts to Aux. Racks. Disk 762. Fig. 55. | Neutral / Shifts. |
| 11 | *3 Multiplicand Storage Device Shifts to Main Racks. Disk 763. Fig. 57. | Neutral / Shifts. |
| 12 | *3 Multiplicand Storage Device Shifts to Aux. Racks. Disk 776. Fig. 58. | Neutral / Shifts. |
| 13 | *10 Multiplicand Storage Device Shifts to Higher Order. Disk 737. Fig.51. | Neutral / Shifts. |
| 14 | *10 Multiplicand Storage Device Shifts to Lower Order. Disk 735. Fig.52. | Neutral / Shifts. |
| 15 | Aliner for Multiplier Segments and *1, *2 and *10 Multiplicand Storage Device. Disk 698. Fig.43. | Aliner In / Out |
| 16 | Resetting of Multiplier Segments and *1, *2 and *10 Multiplicand Storage Device. Disk 671. Fig.41. | Resetting / Neutral |
| 17 | Subt. Shift Yoke 861, Disk 866. Fig.49 Normally Controls Transfer Mech. of Add-Subt. Product Accumulator 103. | Adding / Subtract. |
| 18 | Subt. Shift Yoke 861 Disk 888. Fig.50 Controls Transfer Mech when product is subtracted from Accounting Mach. Accum. | Adding / Subtract. — Subtract Key will make this Disk Active & Cripple Disk *17. |
| 19 | Multiplier Segments 105 Lateral Release Disk 564. Fig 32. | Release |
| 20 | Motor Bar Control Disk 959. Fig.37 Stops Machine in Cycles A, E and G. | Cycles / Stops. — Subtract Key will make this Disk Active & Cripple Disk *21. |
| 21 | Motor Bar Control Disk (Add) 962 Fig.38 Stops Machine in Cycles A, C and G. | Cycles / Stops. |
| 23 | Main Slide 507 and Aux. Slide 499 Control Disk 541. Figs. 80 and 81. | Mult. / Aux.Cycles / Last M.* |
| 22 | Carriage Restoring Control Disk 643 Fig. 47. | Restore / Neutral. |
| 25 | Printer Control Disk 971. Fig.85. | Enabled. / Disabled. |
| 26 | Zero Latch Control Disk 938. Fig.84. | Enabled / Disabled. |
| | Name of Control Disk. | Event C D E F G H 0 1 2 3 4 5 6 7 8 9 A B |

Inventors
Samuel Brand and
Gunnar Nelson
By Carl Bunst
their Attorney

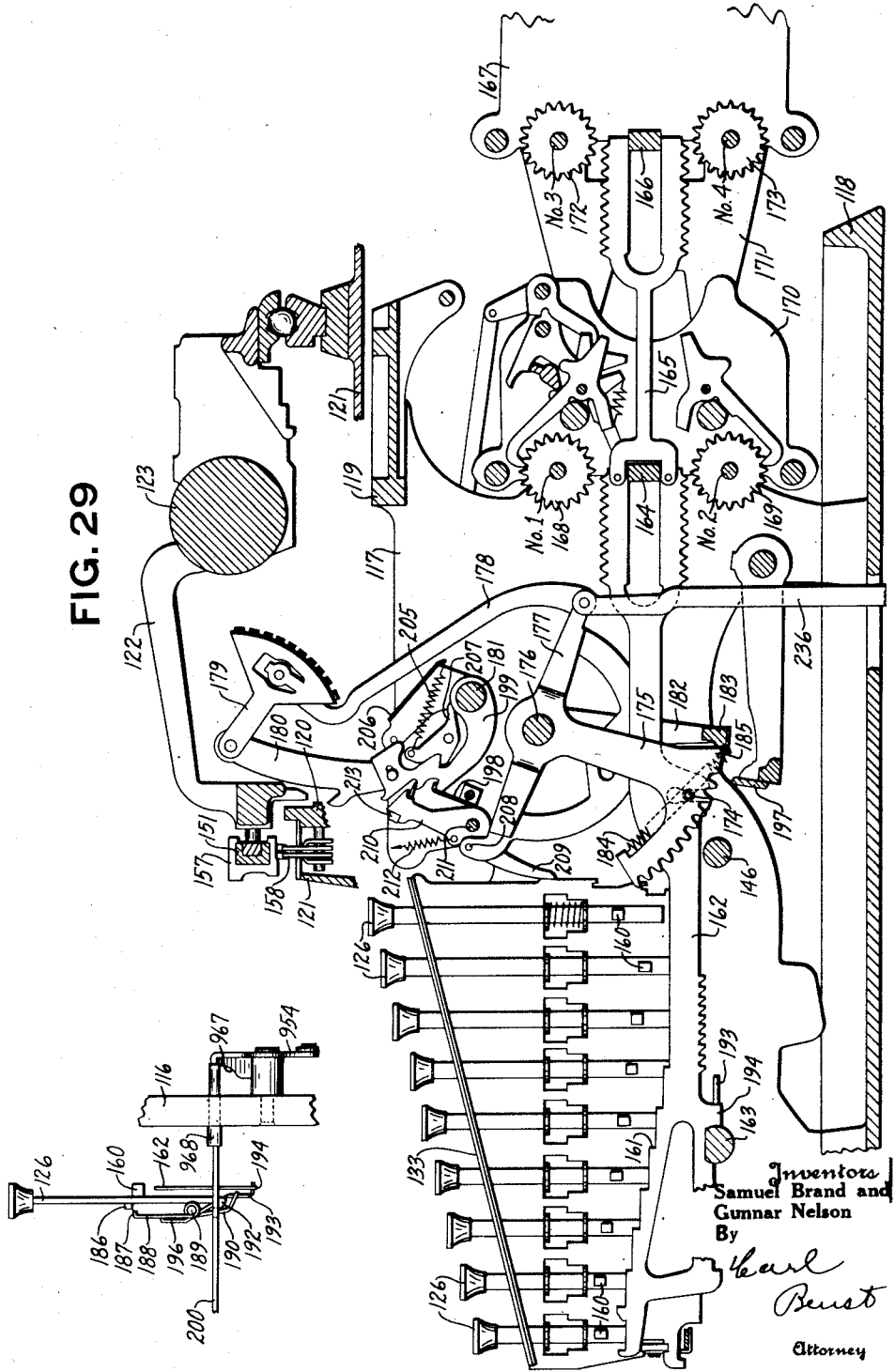

Sept. 24, 1940.                  S. BRAND ET AL                   2,216,063
                                CALCULATING MACHINE
                               Filed June 13, 1935                26 Sheets-Sheet 10

Inventors
Samuel Brand and
Gunnar Nelson
By Carl Benst
their Attorney

Sept. 24, 1940. S. BRAND ET AL 2,216,063
CALCULATING MACHINE
Filed June 13, 1935 26 Sheets-Sheet 11
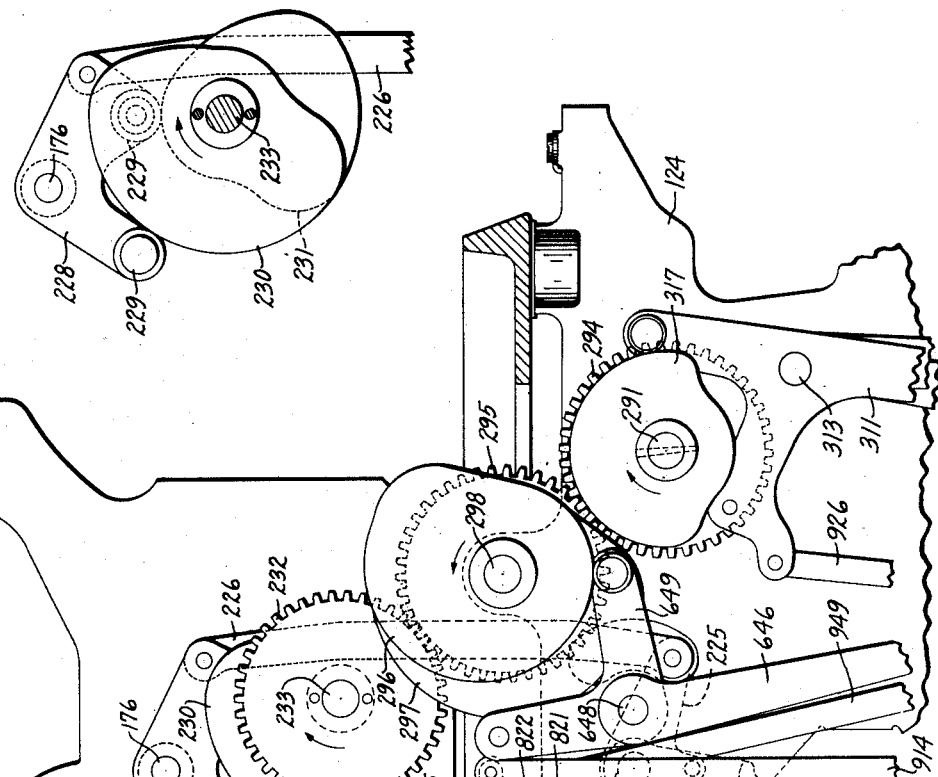
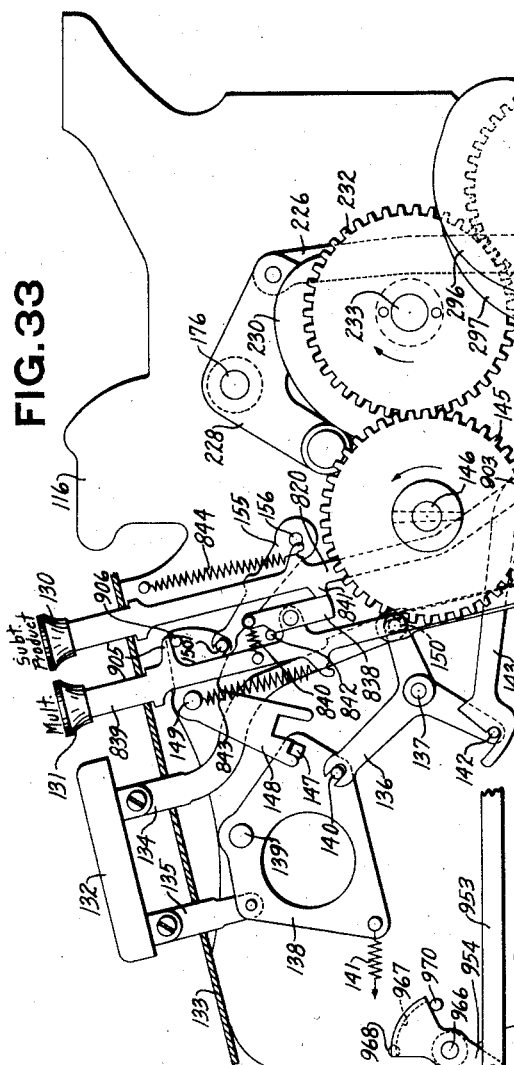
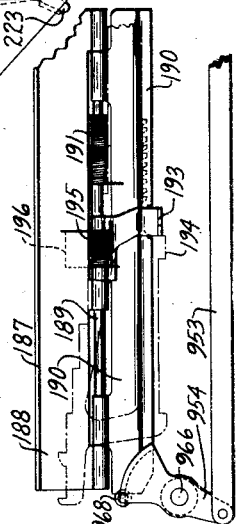
Inventors
Samuel Brand and
Gunnar Nelson
By *Earl Benst*
their Attorney Inventors
Samuel Brand and
Gunnar Nelson
By Carl Benst
their Attorney Sept. 24, 1940.                S. BRAND ET AL                2,216,063
                            CALCULATING MACHINE
                    Filed June 13, 1935          26 Sheets-Sheet 13

Inventors
Samuel Brand and
Gunnar Nelson
By Carl Beust
their Attorney

Sept. 24, 1940.   S. BRAND ET AL   2,216,063
CALCULATING MACHINE
Filed June 13, 1935    26 Sheets-Sheet 14
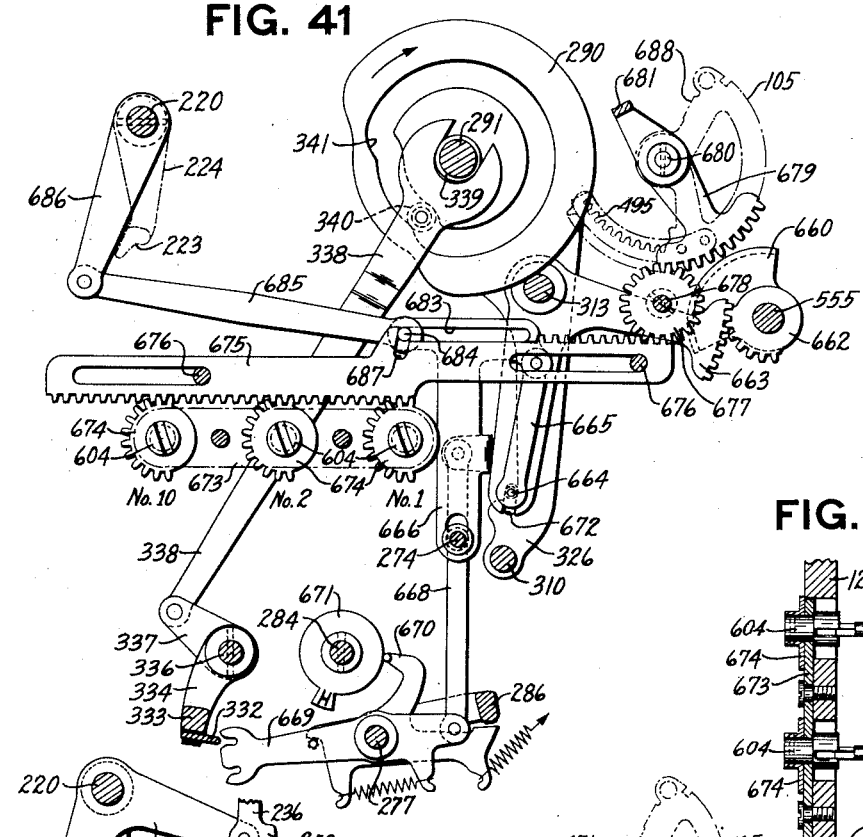
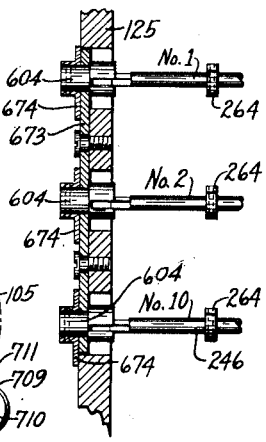
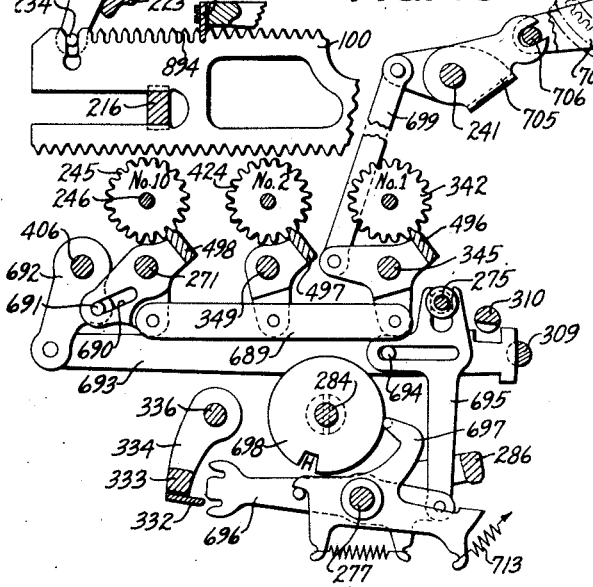
Inventors
Samuel Brand and
Gunnar Nelson
By Carl Benst
their Attorney Sept. 24, 1940.  S. BRAND ET AL  2,216,063
CALCULATING MACHINE
Filed June 13, 1935  26 Sheets-Sheet 15

Inventors
Samuel Brand and
Gunnar Nelson
By Carl Beust
their Attorney

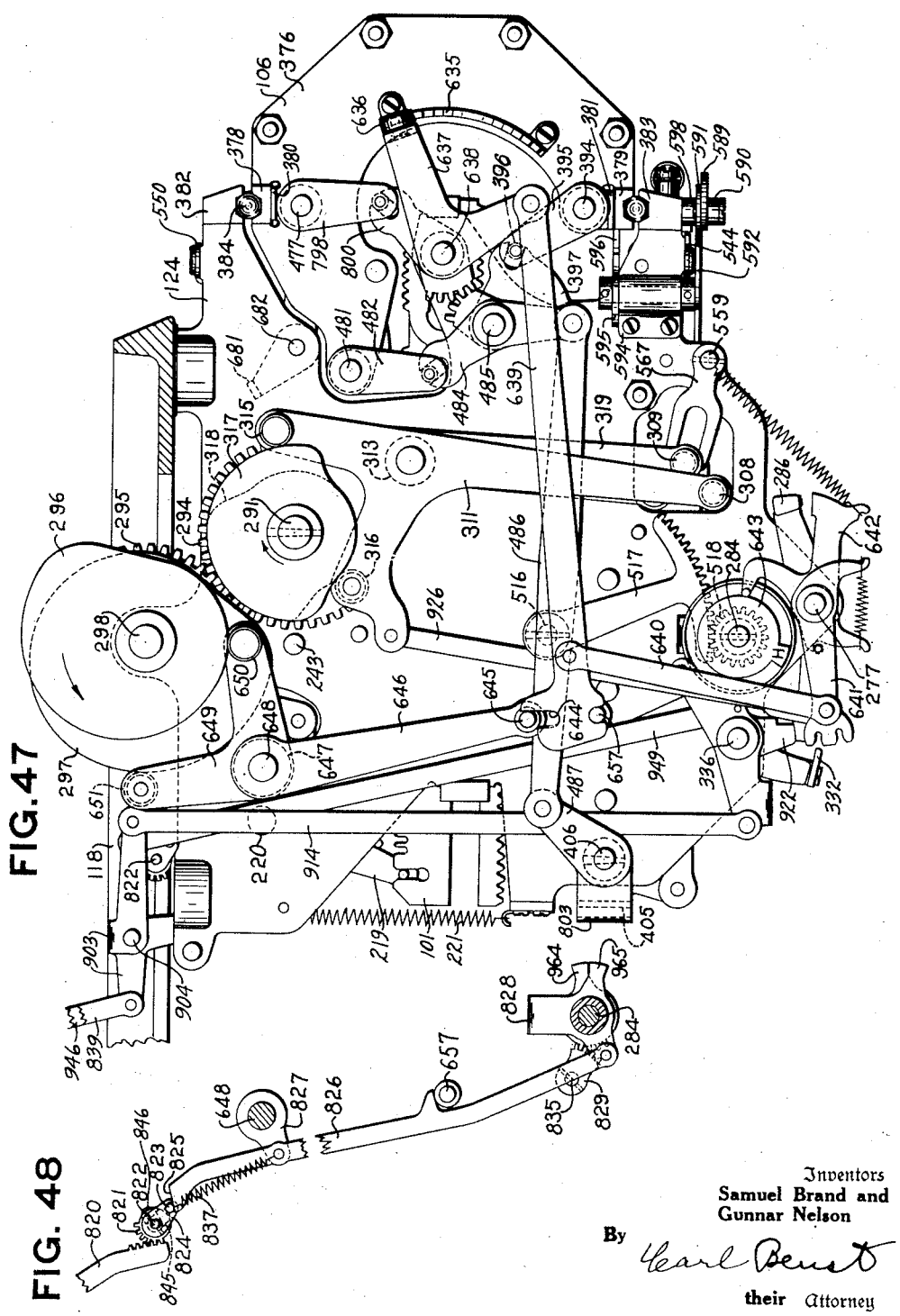

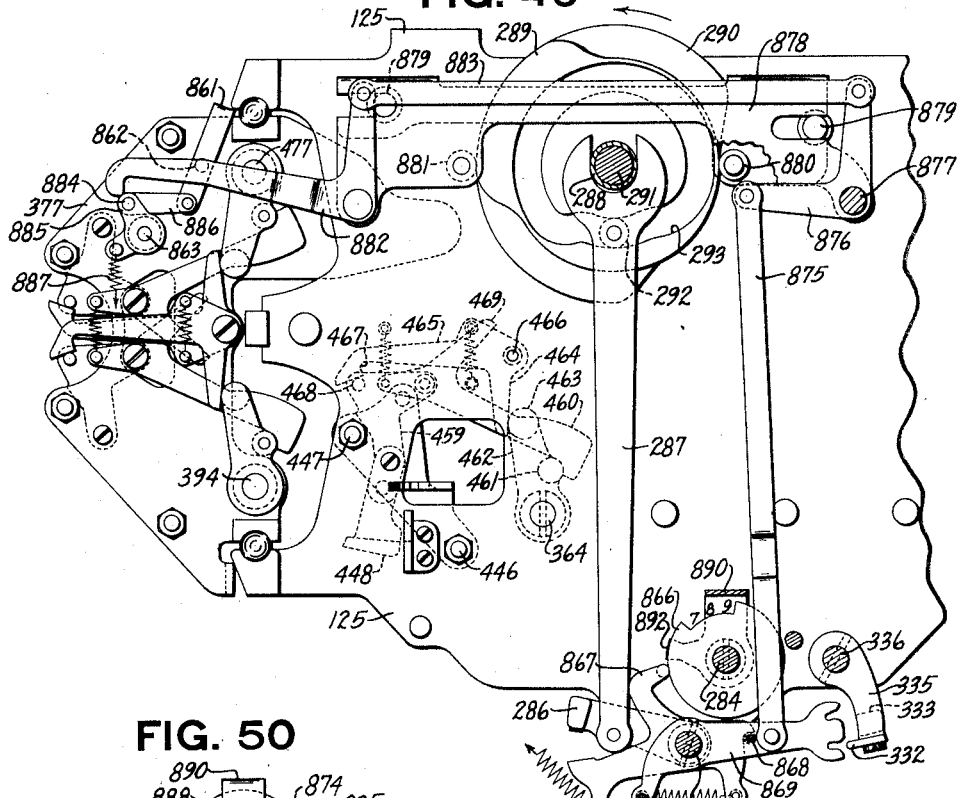
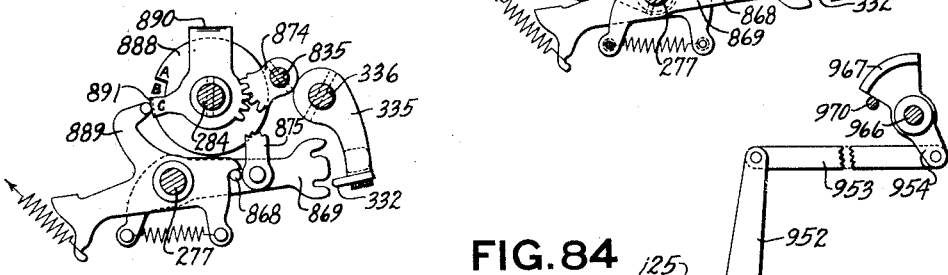
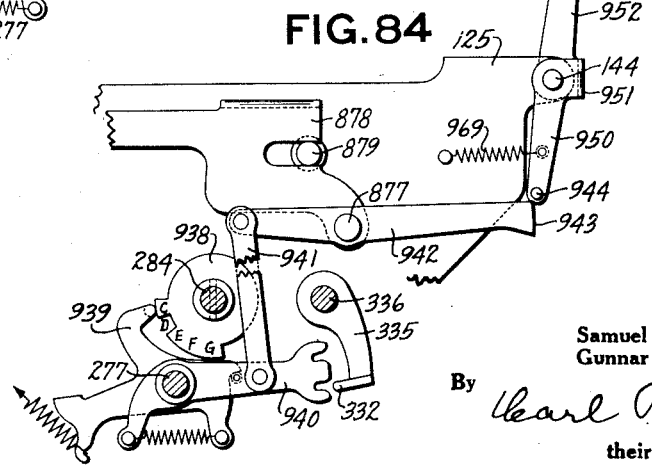

Sept. 24, 1940.  S. BRAND ET AL  2,216,063
CALCULATING MACHINE
Filed June 13, 1935  26 Sheets-Sheet 18

Inventors
Samuel Brand and
Gunnar Nelson
By Earl Benet
their Attorney

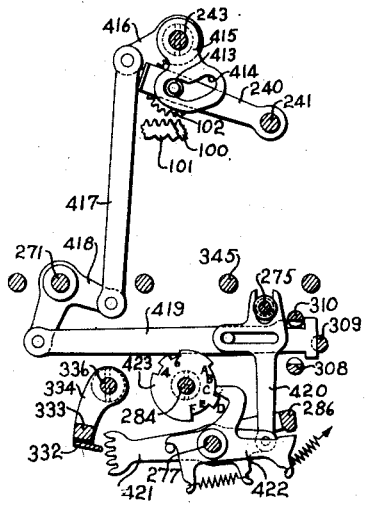
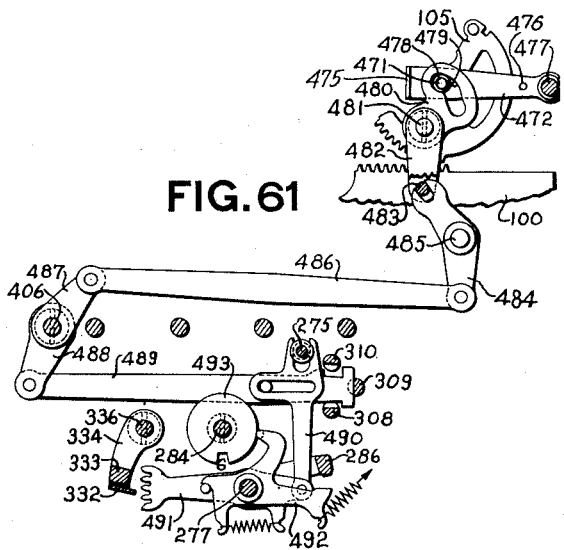
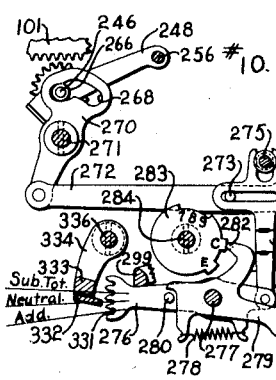
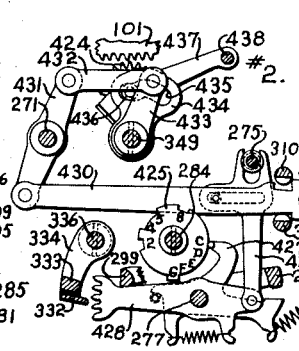
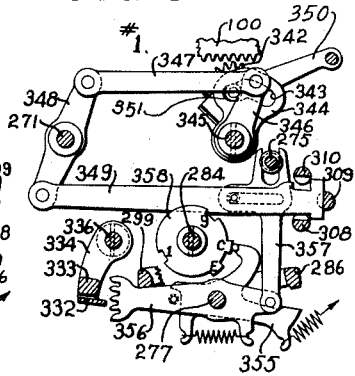
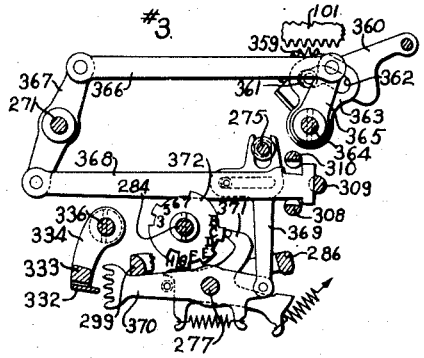
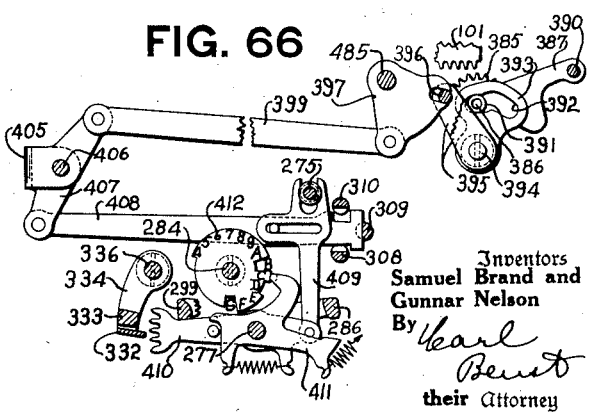

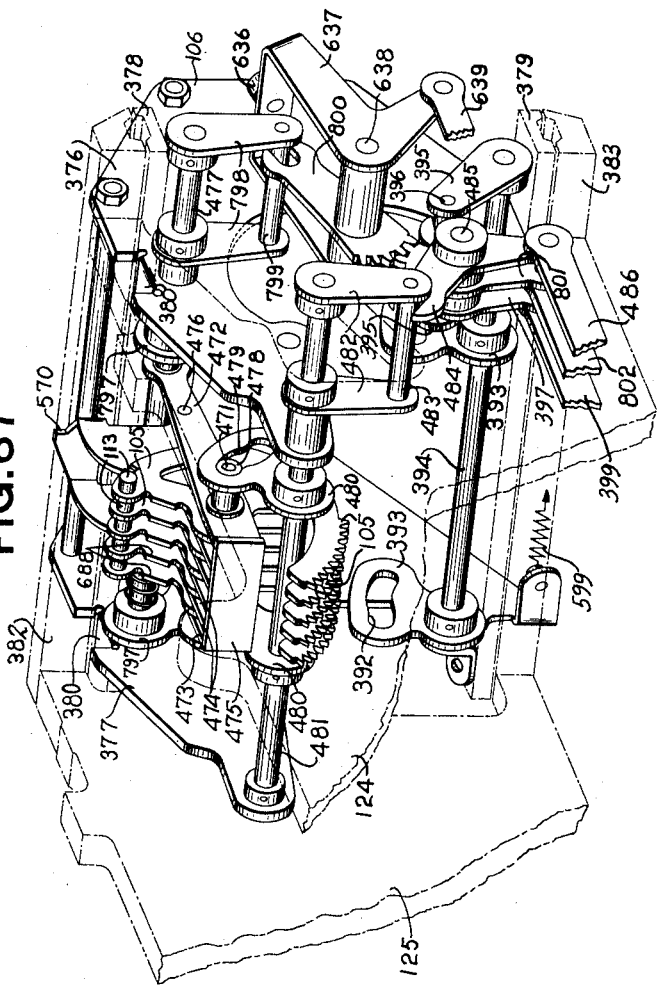

Sept. 24, 1940.  S. BRAND ET AL  2,216,063
CALCULATING MACHINE
Filed June 13, 1935  26 Sheets-Sheet 21
FIG. 69
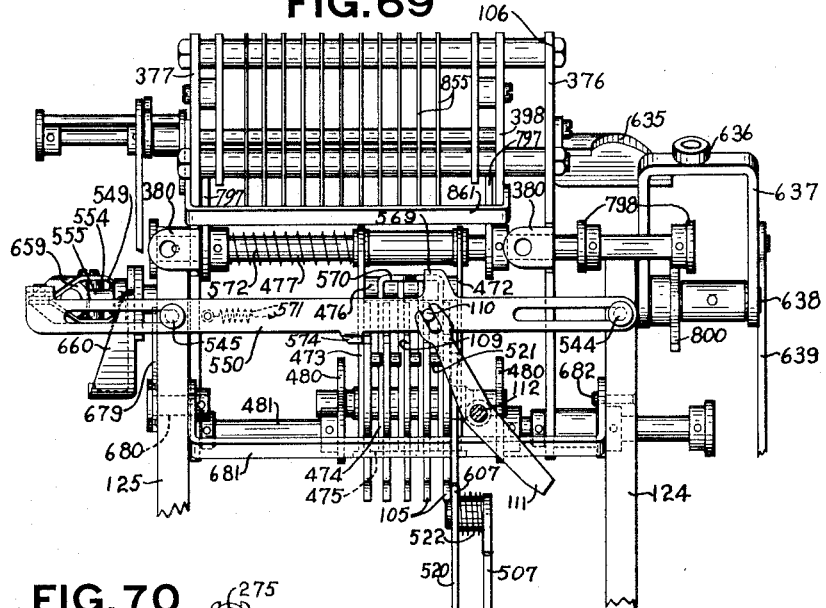
FIG. 70
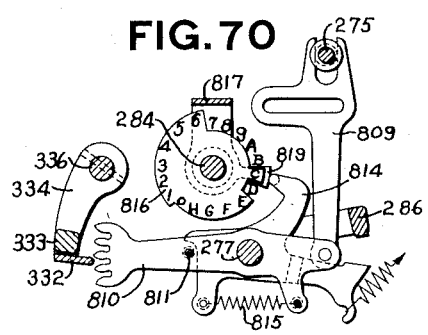
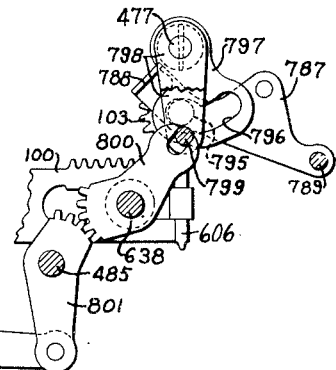
FIG. 71
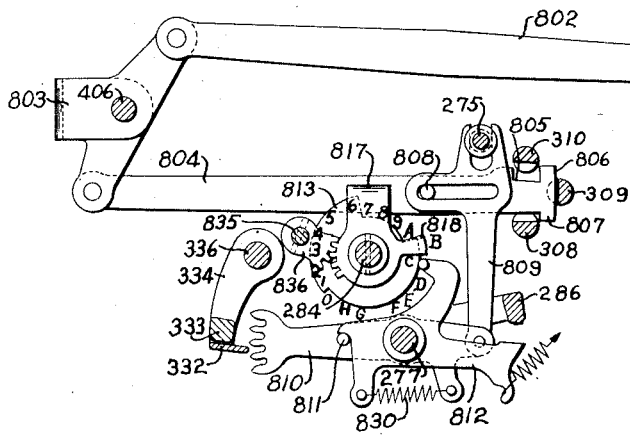
Inventors
Samuel Brand and
Gunnar Nelson
By Carl Beust
their Attorney Sept. 24, 1940.  S. BRAND ET AL  2,216,063
CALCULATING MACHINE
Filed June 13, 1935    26 Sheets-Sheet 22

Inventors
Samuel Brand and
Gunnar Nelson
By *Earl Beust*
their Attorney

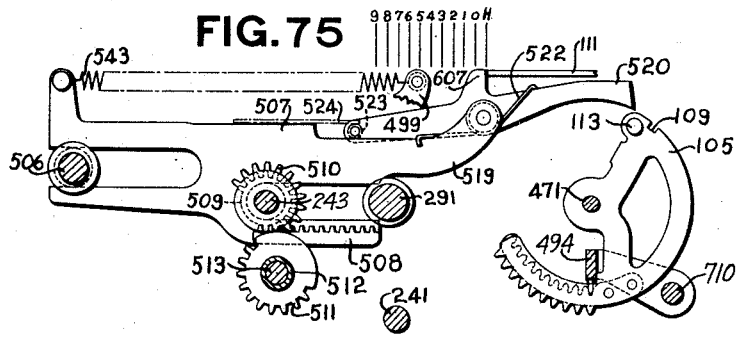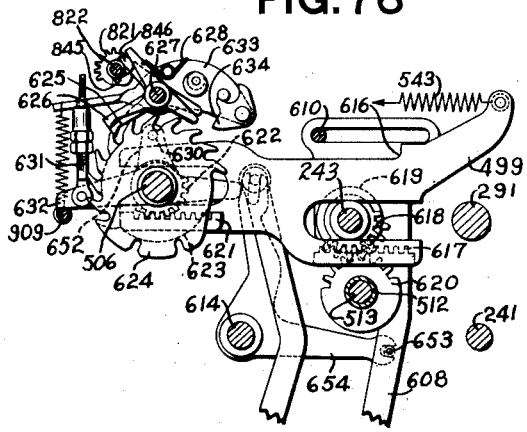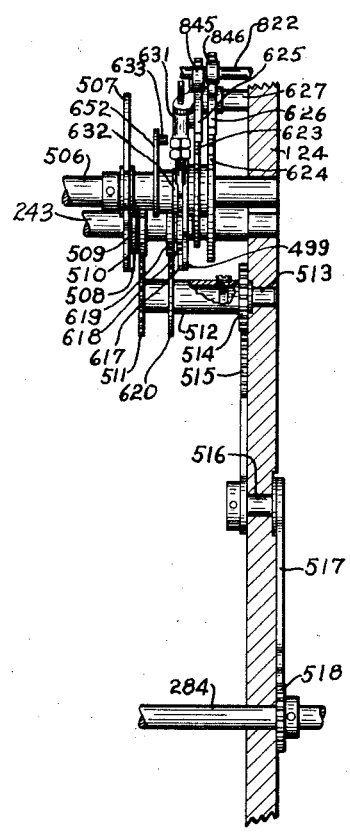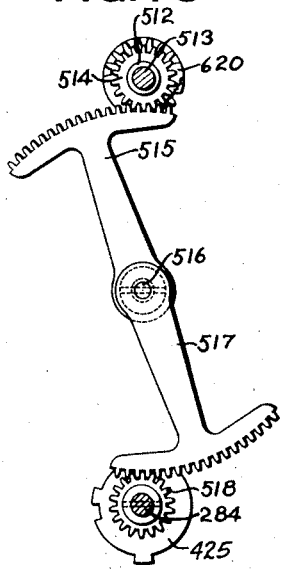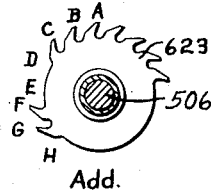

Sept. 24, 1940.   S. BRAND ET AL   2,216,063
CALCULATING MACHINE
Filed June 13, 1935   26 Sheets-Sheet 24
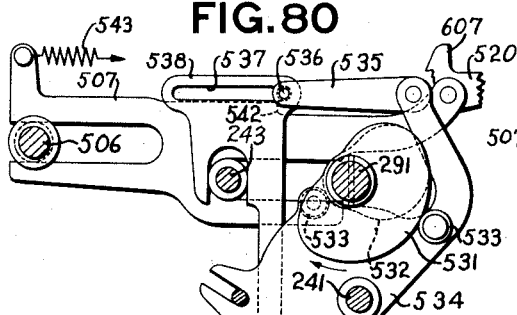
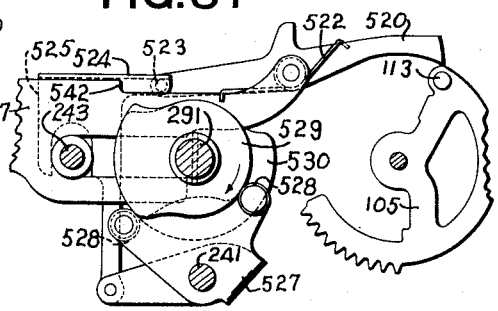
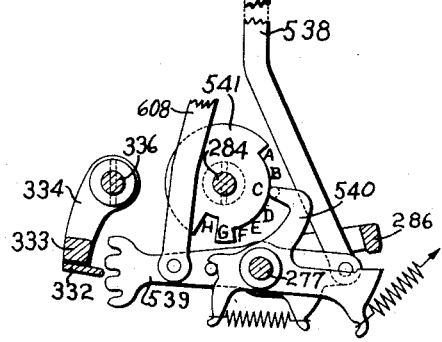
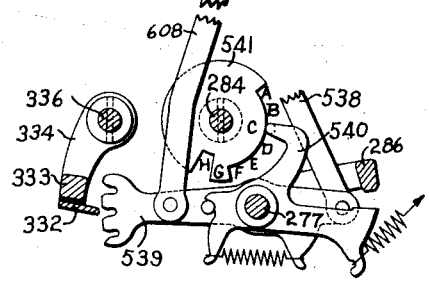
Inventors
Samuel Brand and
Gunnar Nelson
By *Earl Benst*
their Attorney Sept. 24, 1940. S. BRAND ET AL 2,216,063
CALCULATING MACHINE
Filed June 13, 1935 26 Sheets-Sheet 25

Inventors
Samuel Brand and
Gunnar Nelson
By *Earl Beust*
their Attorney

Sept. 24, 1940.       S. BRAND ET AL       2,216,063
CALCULATING MACHINE
Filed June 13, 1935
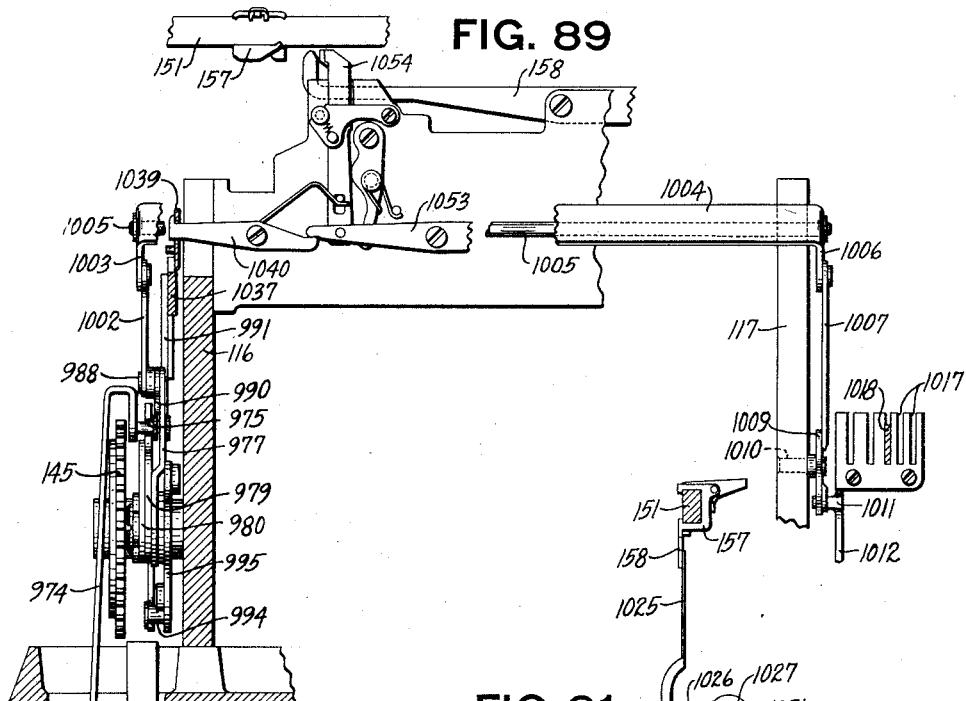
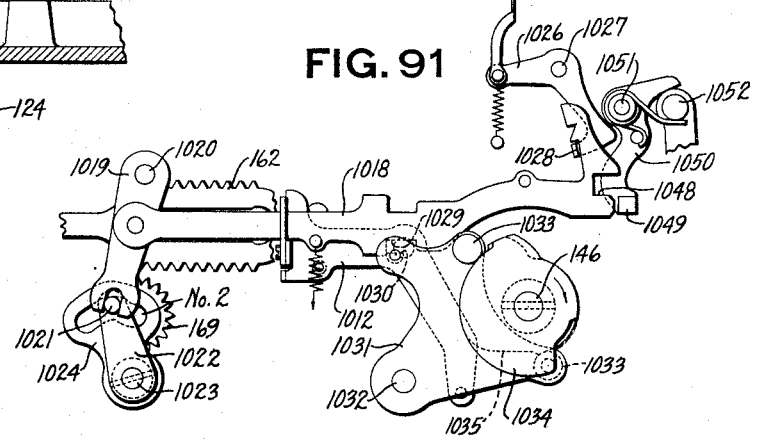
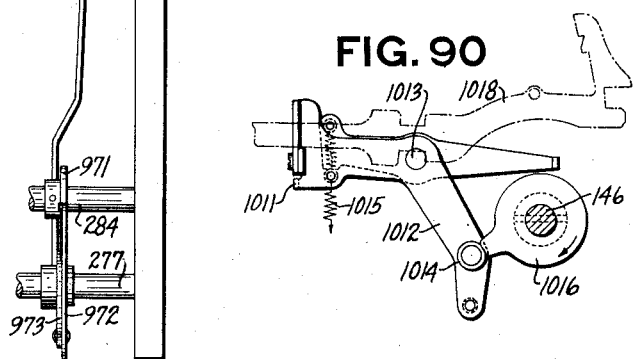
Inventors
Samuel Brand and
Gunnar Nelson
By Carl Beust
their Attorney Patented Sept. 24, 1940

2,216,063

UNITED STATES PATENT OFFICE 2,216,063

CALCULATING MACHINE

Samuel Brand, Binghamton, N. Y., and Gunnar Nelson, Dayton, Ohio, assignors to The National Cash Register Company, Dayton, Ohio, a corporation of Maryland Application June 13, 1935, Serial No. 26,422

61 Claims. (Cl. 235—60)

This invention relates to accounting or bookkeeping machines and the like, and particularly to a multiplying device adapted to be incorporated in such a machine.

The present invention is shown embodied in the well known Ellis accounting machine, illustrated and described in Letters Patent of the United States, No. 1,197,276, and No. 1,197,278, issued Sept. 5, 1916, to Halcolm Ellis; and Patent No. 1,203,863, issued Nov. 7, 1916, also to Halcolm Ellis; and U. S. Patent No. 1,819,084, issued August 18, 1931, to Emil John Ens.

However, it is not desired to limit the use of this invention to any particular machine as it may, with minor alterations and adjustments, be adapted for use with most any adding or accounting machine.

This invention consists of new and novel mechanism to accomplish a short method of multiplication. Following is a brief outline of the short method of multiplication performed by the machine of this invention.

First, 1, 2, 3 and 10 times the multiplicand are entered respectively in four multiplicand storage devices. Second, the multiplier is entered in a storage device provided for that purpose. Third, the denominational digits of the multiplier are interpreted beginning with the lowest order, and the storage device or devices containing the multiple of the multiplicand corresponding to the interpreted multiplier digit are operated in a sub-total operation and the amounts therein are transferred positively or positively and negatively to one or both of two product accumulators.

For example, if the interpreted multiplier digit is 1, 2 or 3 the storage device containing 1, 2 or 3 times the multiplicand is operated in a sub-total operation and the amount therein is entered into one of the product accumulators. If the interpreted multiplier digit is 4 or 6, the storage device containing 2 or 3 times the multiplicand is operated in a sub-total operation and the amount therein is entered once in each of the product accumulators, so that the combined amounts in both accumulators will equal 4 or 6 times the multiplicand. If the multiplier digit is 5, the storage devices containing respectively 2 and 3 times the multiplicand are operated in a sub-total operation and 2 times the multiplicand is entered into one product accumulator and 3 times the multiplicand is entered into the other product accumulator.

When the interpreted digit of the multiplier is 7, 8 or 9, the storage device containing 10 times the multiplicand is operated in a sub-total operation and 10 times the multiplicand is entered into one of the product storage accumulators. Simultaneously the storage device containing the difference (3, 2 or 1 times the multiplicand) between 10 times the multiplicand and 7, 8 or 9 times the multiplicand, is operated in a sub-total operation and the amount therein is entered subtractively into the other product accumulator so that the total amount in the two product accumulators is equal to 7, 8 or 9 times the multiplicand.

Finally the amounts in the two product accumulators are added to obtain a complete product and this complete product may be recorded by the accounting machine and be transferred positively or negatively, as desired, to the accounting machine accumulators.

In order to illustrate the method outlined above, a few specific examples of multiplication will now be given.

A specific example showing a problem in which the multiplier digits are 1, 2, and 3 will be explained.

In this problem, the multiplicand is 12345 and the multiplier is 321.

Multiples of the multiplicand times 1, 2, 3, and 10 are stored in the four multiplicand storage devices and have the following values:

12345, 24690, 37035, and 123450

In performing the multiplication, these multiples are selectively entered into the product accumulators as follows:

```
Add subtract
  product        Add product
accumulator    accumulator
  12345          00000        ─── The storage device containing
  24690          00000            one times the multiplicand is
  37035          00000            operated in a sub-total opera-
                                  tion and this amount is entered
 3962745        0000000           into the add-subtract product
                                  accumulator.
            →3962745→
                             ─── The product accumulators are
                                 then shifted one step to the
                                 next higher order.
                             ─── The storage device containing
                                 two times the multiplicand is
                                 operated in a sub-total opera-
                                 tion and this amount is entered
                                 into the add-subtract product
                                 accumulator.
                             ─── The product accumulators are
                                 then shifted one step to the
                                 next higher order.
                             ─── The storage device containing
                                 three times the multiplicand is
                                 operated in a sub-total operation
                                 and this amount is entered in
                                 the add-subtract product accu-
                                 mulator.
                             ─── The amount in the add-subtract
                                 product accumulator is trans-
                                 ferred to the add product accu-
                                 mulator to be added to the
                                 amount therein and form the
                                 complete product which may be
                                 recorded by the accounting
                                 machine and transferred posi-
                                 tively or negatively to the
                                 accounting machine totalizers.
```

A specific example showing a problem in which the multiplier digits are 4, 5, and 6 will be explained.

In this problem, the multiplicand is 12345 and the multiplier is 654.

Multiples of the multiplicand times 1, 2, 3, and 10 are stored in the four multiplicand storage devices and have the following values:

12345, 24690, 37035, and 123450

In performing this problem, the multiples are selectively entered into the product accumulators as follows:

```
Add-subtract
 product ac-   Add product
 cumulator    accumulator
  24690         24690        ─── The storage device containing
  37035         24690            two times the multiplicand is
  37035         37035            operated in a sub-total opera-
                                 tion and the amount therein is
 4098540       3975090           entered in each of the product
                                 accumulators so that the com-
           →4098540→             bined amounts equal four times
                                 the multiplicand.
               8073630
                             ─── The product accumulators are
                                 then shifted one step to the next
                                 higher order.
                             ─── The storage devices containing
                                 two and three times the multi-
                                 plicand are operated in a sub-
                                 total operation and three times
                                 the multiplicand is entered into
                                 the add-subtract product accum-
                                 ulator and two times the multi-
                                 plicand is entered into the add
                                 product accumulator so that the
                                 combined amounts equal five
                                 times the multiplicand.
                             ─── The product accumulators are
                                 then shifted one step to the next
                                 higher order.
                             ─── The storage device containing
                                 three times the multiplicand is
                                 operated in a sub-total operation
                                 and the amount contained
                                 therein is entered into each of
                                 the product accumulators, so
                                 that the combined amounts
                                 equal six times the multiplicand.
                             ─── The amount in the add-subtract
                                 product accumulator is trans-
                                 ferred to and added to the
                                 amount in the add product ac-
                                 cumulator to form the complete
                                 product therein, which product
                                 may be recorded by the account-
                                 ing machine and also trans-
                                 ferred positively or negatively
                                 to the accounting machine
                                 totalizers.
```

A specific example showing a problem in which the multiplier digits are 7, 8, and 9 will be explained.

In this problem, the multiplicand is 12345 and the multiplier is 987.

Multiples of the multiplicand times 1, 2, 3, and 10 are stored in the four multiplicand storage devices and have the following values:

12345, 24690, 37035, and 123450

In performing this problem, the multiples are selectively entered into the product accumulators as follows:

```
Add-subtract
  product       Add product
accumulator    accumulator
 00000000        123450       ─── The storage device containing
  −37035         123450           ten times the multiplicand is
  −24690         123450           operated in a sub-total opera-
  −12345                          tion and this amount is entered
                                  into the add product accumula-
 98481565       13702950          tor and the storage device con-
                                  taining three times the multi-
           →98481565→             plicand is operated in a sub-
                                  total operation and this amount
               12184515           is entered subtractively in the
                                  add-subtract product accumu-
                                  lator, so that the combined
                                  amounts entered at this time
                                  will equal seven times the
                                  multiplicand.
                              ─── The product accumulators are
                                  then shifted one step to the
                                  next higher order.
                              ─── The storage device containing
                                  ten times the multiplicand is
                                  operated in a sub-total opera-
                                  tion and this amount is entered
                                  in the add product accumulator
                                  and the storage device contain-
                                  ing two times the multiplicand
                                  is operated in a sub-total opera-
                                  tion and this amount is entered
                                  subtractively in the add-sub-
                                  tract product accumulator, so
                                  that the combined amounts
                                  equal eight times the multipli-
                                  cand.
                              ─── The product accumulators are
                                  then shifted one step to the
                                  next higher order.
                              ─── The storage device containing
                                  ten times the multiplicand is
                                  operated in a sub-total opera-
                                  tion and this amount is entered
                                  in the add product accumulator
                                  and the storage device contain-
                                  ing one times the multiplicand
                                  is operated in a sub-total opera-
                                  tion and this amount is entered
                                  subtractively in the add-sub-
                                  tract product accumulator, so
                                  that the combined amounts
                                  entered at this time equal nine
                                  times the multiplicand.
                              ─── The amount in the add-subtract
                                  product accumulator, which is
                                  the complement of the negative
                                  total of the various multiples, is
                                  transferred to the add product
                                  accumulator and added to the
                                  amount therein to form the prod-
                                  uct, which product may be re-
                                  corded by the accounting ma-
                                  chine and transferred positively
                                  or negatively to the accounting
                                  machine totalizers.
```

With the foregoing brief outline of the accomplishments of the machine of the instant invention in mind, it is broadly an object of this invention to provide means to perform multiplication by a short and direct method.

Another object is to provide means to accomplish a short and direct method of multiplication by combining multiples of the multiplicand corresponding to the denominational digits of the multiplier.

Still another object is to provide means to perform multiplication by entering multiples of the multiplicand in a series of storage devices, by combining the amounts in these devices corresponding to the denominational digits of the multiplier to obtain a complete product, and by registering and recording the complete product.

Another object is to provide means to perform multiplication by entering multiples of a multiplicand in a series of storage devices, by entering a multiplier in a storage device, by interpreting each denominational digit of the multiplier and performing a sub-total operation using the storage device or devices containing the multiples of the multiplicand corresponding to the interpreted digit and entering these multiples in product accumulators, and by finally combining the multiples thus entered in the product accumulators to obtain a complete product.

A further object of this invention is the provision of a multiplying device for use in connection with an accounting machine, said multiplying device adapted to perform multiplication by entering multiples of the multiplicand in a series of storage devices, by entering the multiplier in another storage device and by progressively taking a sub-total from one or a combination of the first mentioned storage devices containing multiples of the multiplicand corresponding to the denominational digits of the multiplier, by entering these sub-totals, which combined constitute the product, in suitable storage devices, and by transferring the product from the latter storage devices to the accumulators of the accounting machine and simultaneously recording said product.

Another object is to provide means to connect the mechanism of a multiplying device to the mechanism of an accounting machine.

Still another object is to provide means whereby a single keyboard may be used to enter both the multiplicand and the multiplier in the multiplying device and the accounting machine.

A further object is to provide means to control the operation and functioning of the accounting machine and the multiplying device during multiplying operations.

Another object is to provide means to automatically control the printing and totalizer engaging mechanism during multiplying operations.

A still further object is to provide means to impart a step by step movement to the control means to position the same during the non-multiplying cycles of the machine, and to provide means to cause a multiplier interpreting mechanism in cooperation with a multiplier storage device to position the control means during the multiplying cycles of the machine.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a diagrammatic view of the keyboard of the machine of the instant invention.

Fig. 2 is a facsimile of a bill or invoice statement prepared on the machine of this invention.

Figs. 3 to 20 inclusive are diagrammatic views illustrating the functioning of the multiplying device during multiplying operations.

Figs. 21 to 25A inclusive are diagrammatic views illustrating the mechanism that controls the shifting of the multiplier segments and the product accumulator carriage during multiplying operations.

Figure 26:
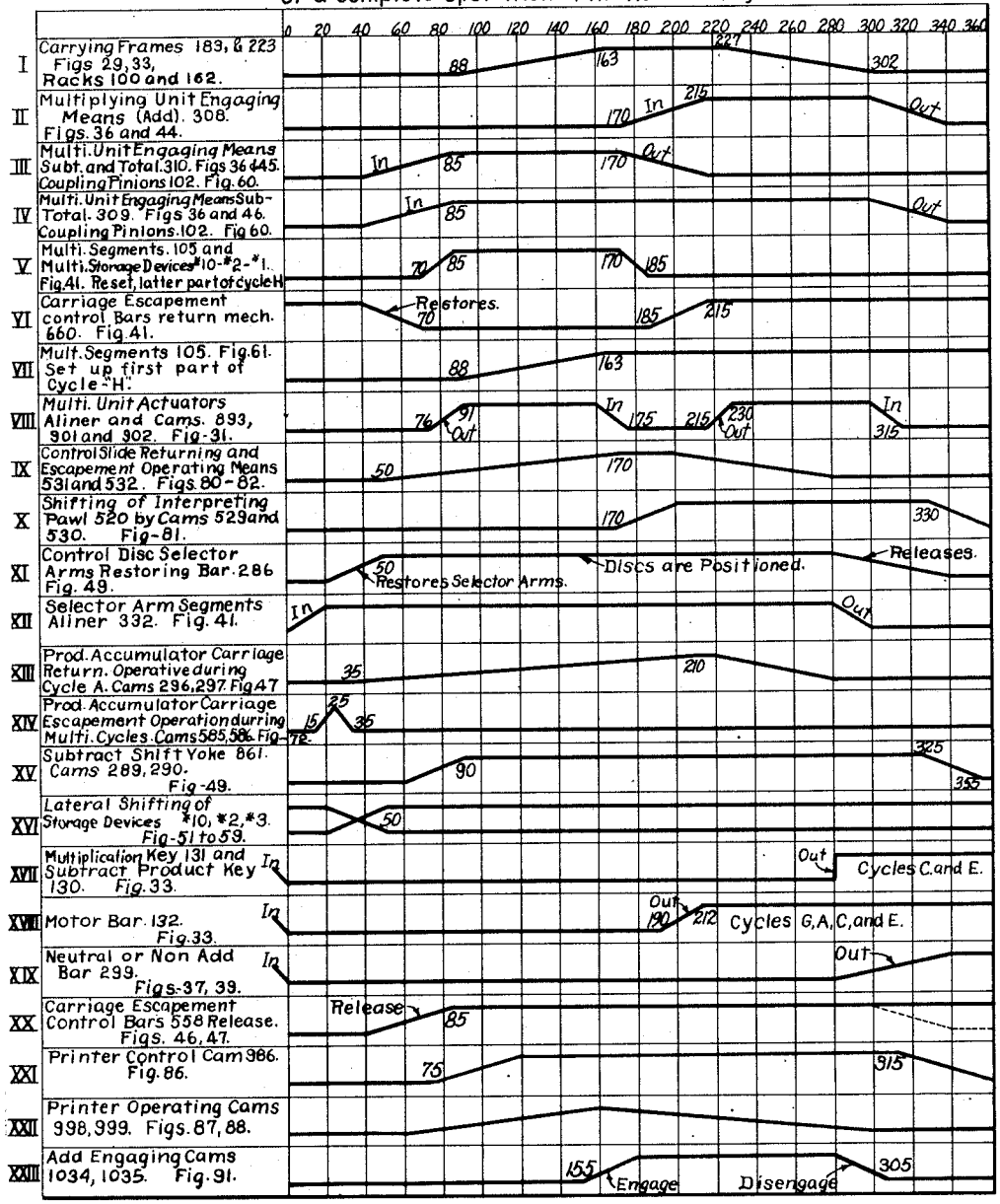

Fig. 26 is a time chart graphically illustrating the movement of the different mechanisms of the machine.

Figure 27:
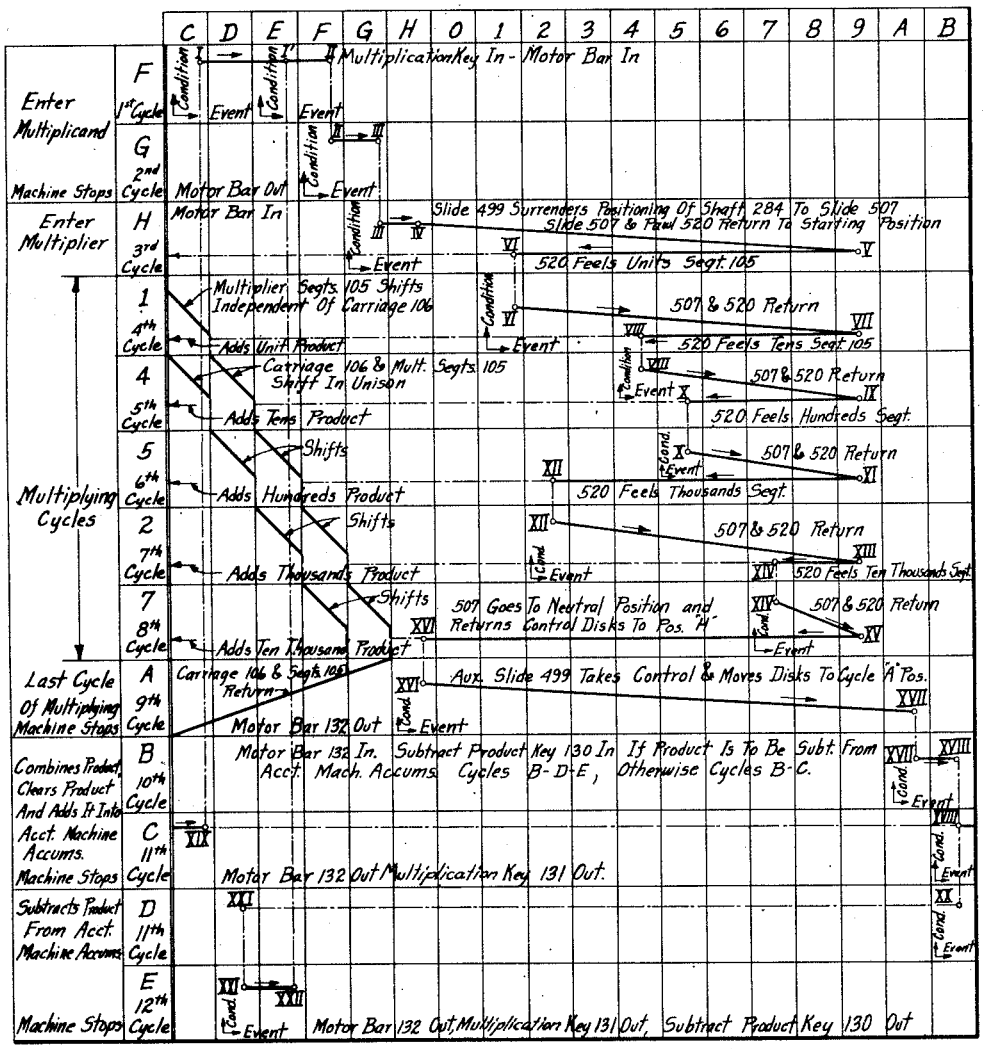

Fig. 27 is a chart showing in graphic form the functioning of the multiplier unit.

Fig. 28 is a chart graphically showing the contours of the different control disks for the multiplying unit.

Fig. 29 is a cross sectional side view of the accounting machine taken just to the right of an amount bank.

Fig. 30 is a detail view of a part of the mechanism for controlling the accounting machine zero latches in multiplying operations.

Figure 31:
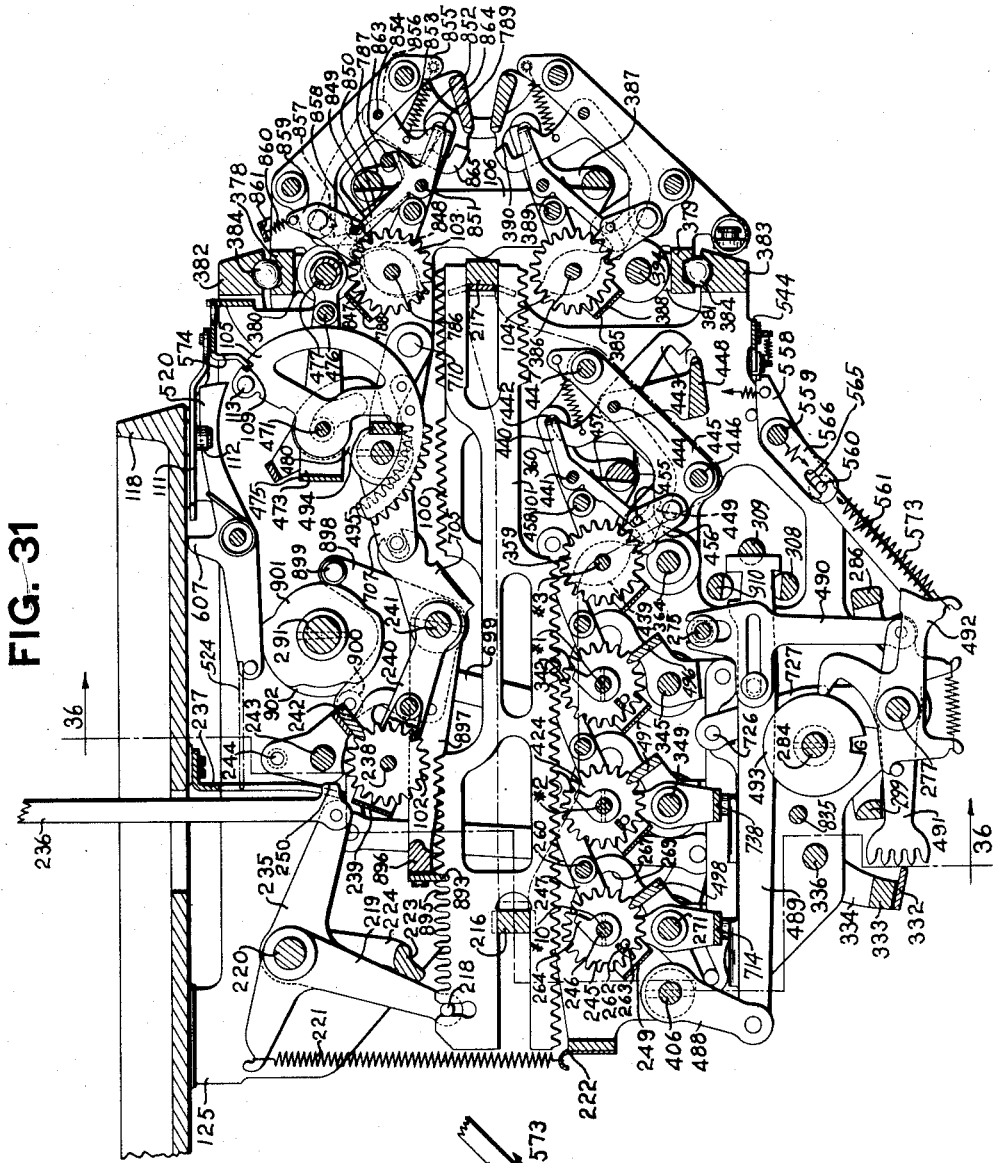

Fig. 31 is a cross sectional side view of the multiplying unit taken along line 31—31 (Fig. 36), looking in the direction the arrows point.

Figure 32:
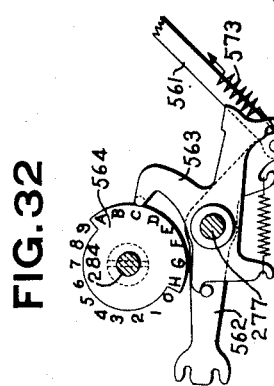

Fig. 32 is a detail view of the disk and associated mechanism for controlling the release of the multiplier segments for lateral shifting.

Fig. 33 is a right side elevation of the machine showing the multiplying unit operating mechanism and the machine releasing mechanism.

Fig. 34 is a detail view of the cam and lever for operating the leading frame for the multiplying unit actuating mechanism.

Fig. 35 illustrates in detail a part of the mechanism for controlling the accounting machine zero latches in multiplying operations.

Figure 36:
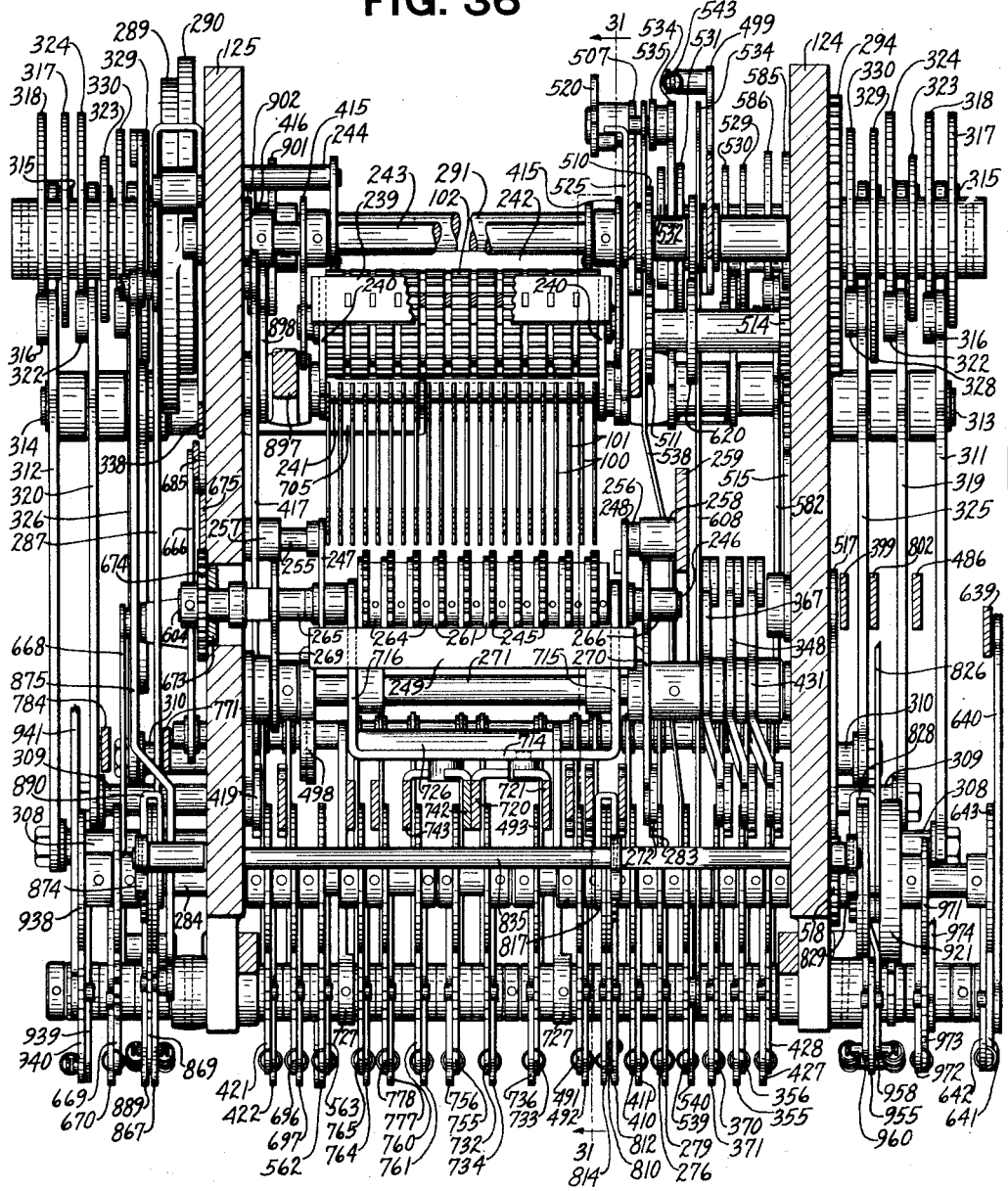

Fig. 36 is a sectional view of the multiplying unit taken along line 36—36 Fig. 31, looking in the direction indicated by the arrows.

Figure 37:
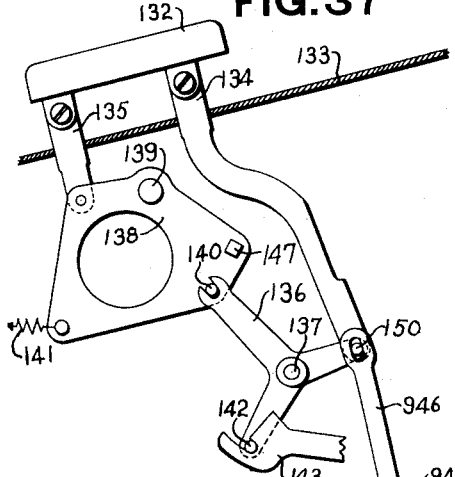

Fig. 37 is a detail of the starting bar and the controlling mechanism therefor.

Figure 38:
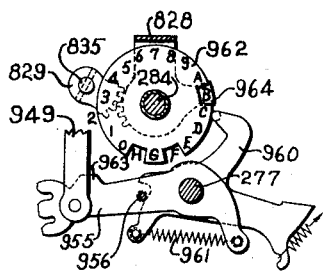

Fig. 38 is a detail view of one of the motor bar control disks and associated feeler mechanism.

Figure 39:
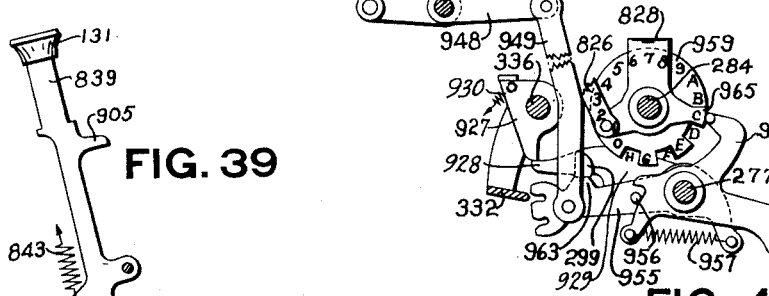

Fig. 39 illustrates in detail the multiplication key and associated mechanism.

Figure 40:
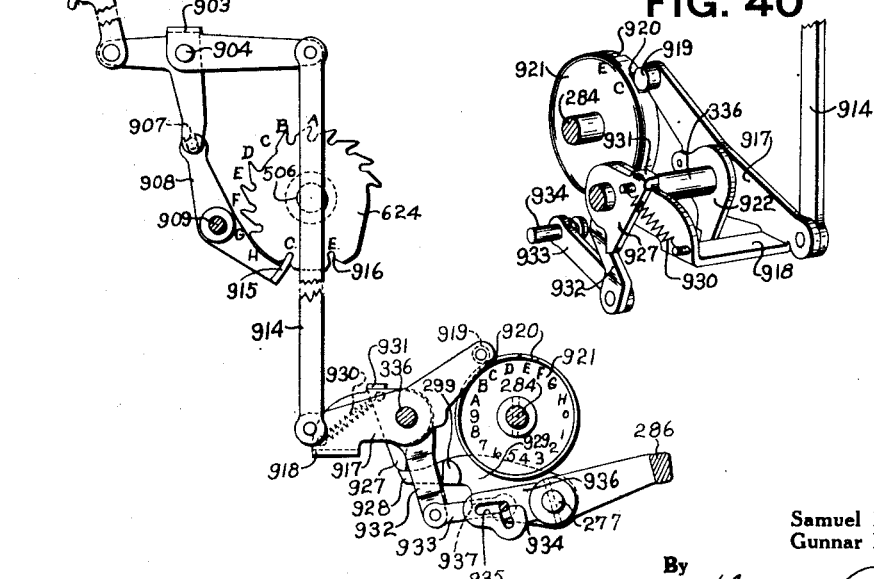

Fig. 40 is a perspective view of the drum and associated mechanism that controls the depressing and the releasing of the multiplication key.

Fig. 41 is a detail view of the mechanism for alining the selector arm segments, and of the resetting mechanism for three of the multiplicand storage devices and the multiplier segments.

Fig. 42 is a sectional view illustrating the manner in which the multiplicand storage device reset shafts are connected to their respective reset segments.

Fig. 43 is a detail view of the alining mechanism for the three multiplicand storage devices illustrated in Fig. 41 and the alining mechanism for the multiplier segments.

Figure 44:
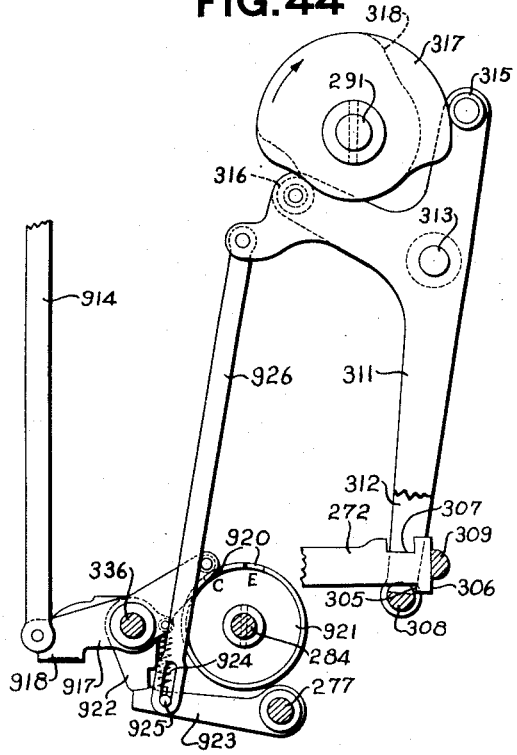

Fig. 44 is a detail view of a part of the add engaging mechanism for the multiplying unit.

Figure 45:
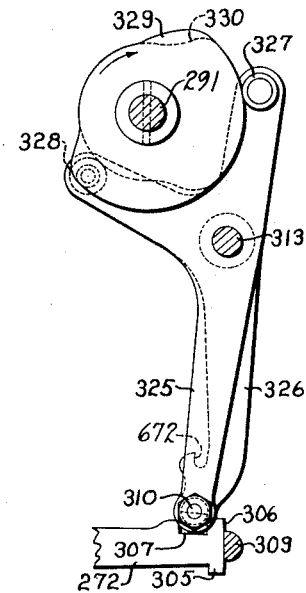

Fig. 45 is a detail of a part of the total and subtract engaging and disengaging mechanism for the multiplying unit.

Figure 46:
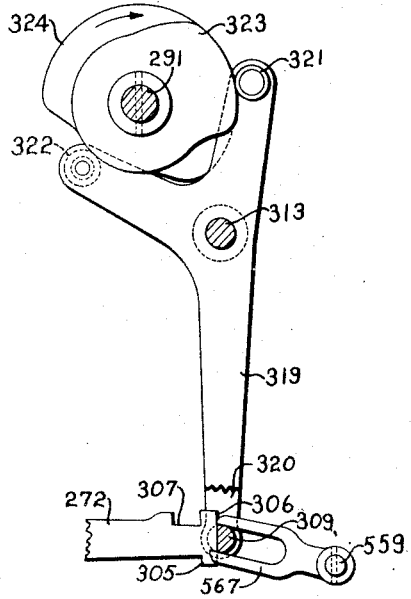

Fig. 46 shows in detail a part of the sub-total engaging mechanism for the multiplying unit.

Fig. 47 is a right side elevation of the multiplying unit illustrating in particular the product accumulator carriage mechanism.

Fig. 48 is a fragmentary detail view of the lower end of the subtract product key and associated mechanism.

Fig. 49 is a left side elevation of the multiplying unit showing the product accumulator carriage and a portion of the controlling mechanism associated with the product accumulators.

Fig. 50 is a detail view of the subtract control disk for the add-subtract product accumulator and the selector arm mechanism therefor.

Figure 51:
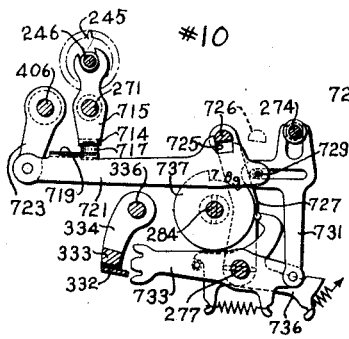
Figure 52:
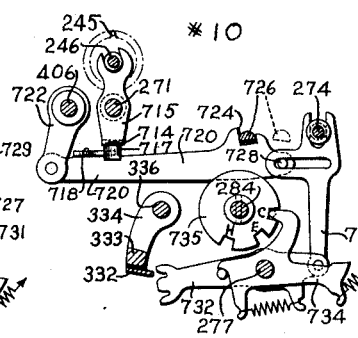
Figure 53:
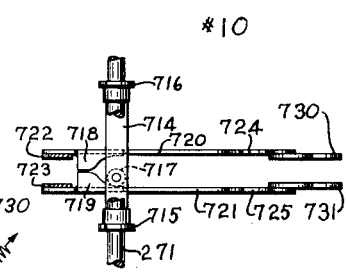

Figs. 51, 52 and 53 show in detail the mechanism for controlling the lateral shifting of the No. 10 multiplicand storage device.

Figure 54:
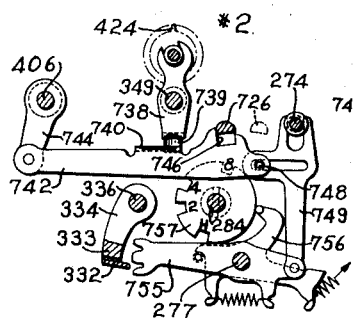
Figure 55:
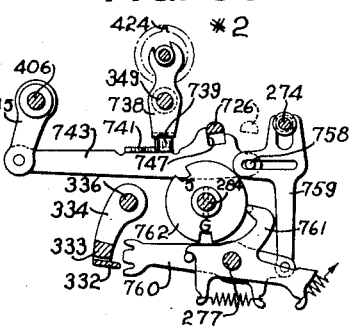
Figure 56:
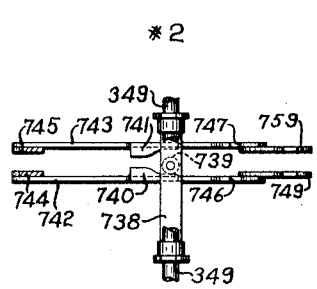

Figs. 54, 55 and 56 show in detail the mechanism for controlling the lateral shifting of the No. 2 multiplicand storage device.

Figure 57:
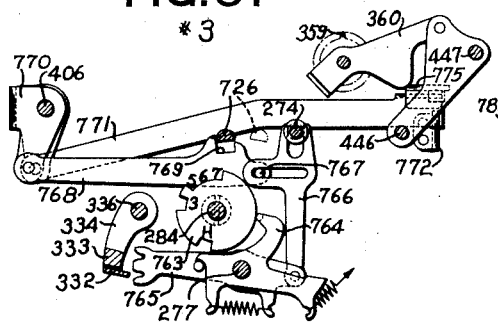
Figure 58:
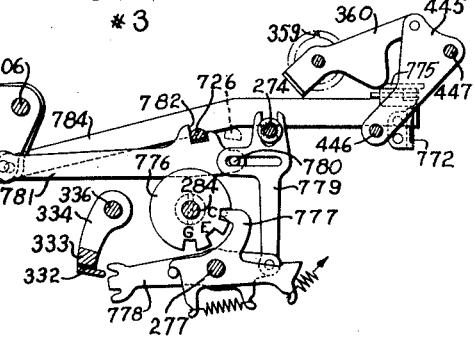
Figure 59:
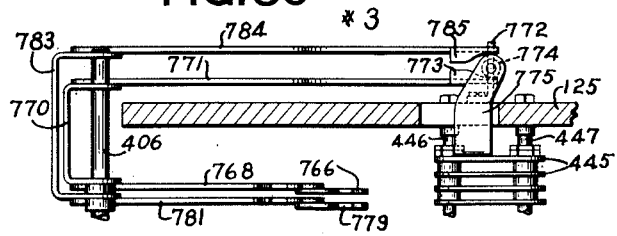

Figs. 57, 58 and 59 are details of the mechanism for controlling the lateral shifting of the No. 3 multiplicand storage device.

Fig. 60 is a detail view of the mechanism for controlling the engagement of the coupling pinions for the multiplying unit actuators.

Fig. 61 illustrates in detail the mechanism for controlling the engagement of the multiplier segments with the main actuator racks.

Fig. 62 is a detail of the mechanism for engaging the No. 10 multiplicand storage device with the actuators.

Fig. 63 shows in detail the mechanism for engaging the No. 2 multiplicand storage device with the actuator racks.

Fig. 64 is a detail view of the mechanism for engaging the No. 1 multiplicand storage device with the actuator racks.

Fig. 65 shows in detail the mechanism for engaging the No. 3 multiplicand storage device with the actuator racks.

Fig. 66 is a detail view of the mechanism for governing the engagement of the add product accumulator with the actuator racks.

Fig. 67 is a perspective view as observed from the front righthand corner of the multiplying unit illustrating the product accumulator carriage, the multiplier segments and a portion of the controlling mechanism therefor.

Fig. 68 is a fragmentary sectional view showing the wheels of the two product accumulators and their corresponding actuator racks.

Fig. 69 is a plan view of the product accumulator carriage.

Fig. 70 is a detail of a portion of the mechanism that governs the engaging of the add-subtract product accumulator with the actuators.

Fig. 71 shows in detail the mechanism for engaging the add-subtract product accumulator with the actuators.

Figure 72:
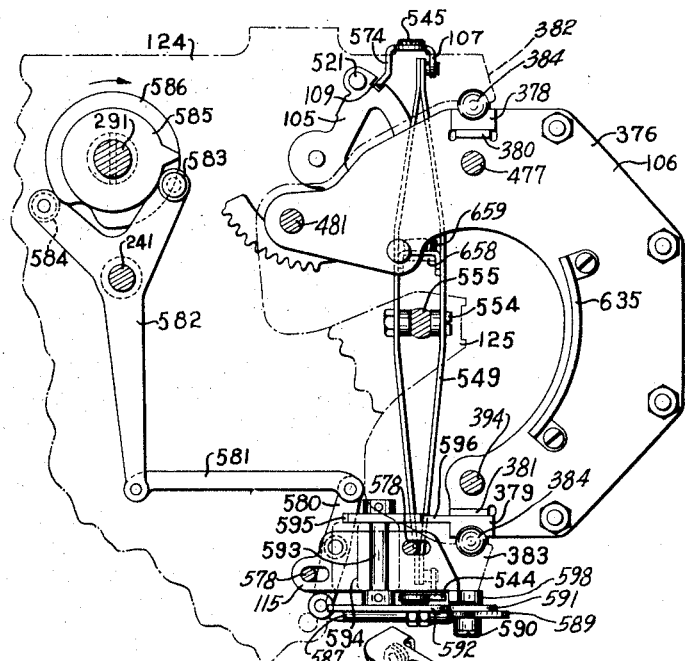

Fig. 72 is a right end view of the product accumulator carriage and a portion of the controlling mechanism therefor.

Figure 73:
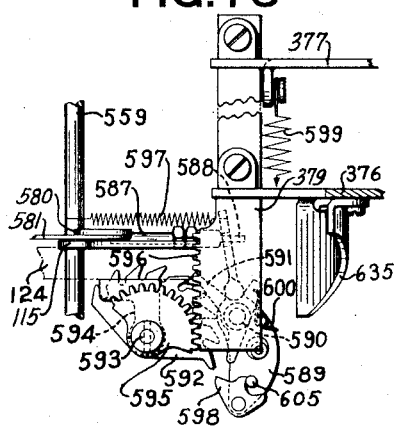

Fig. 73 illustrates in detail the escapement mechanism for controlling the lateral shifting of the product accumulator carriage.

Figure 74:
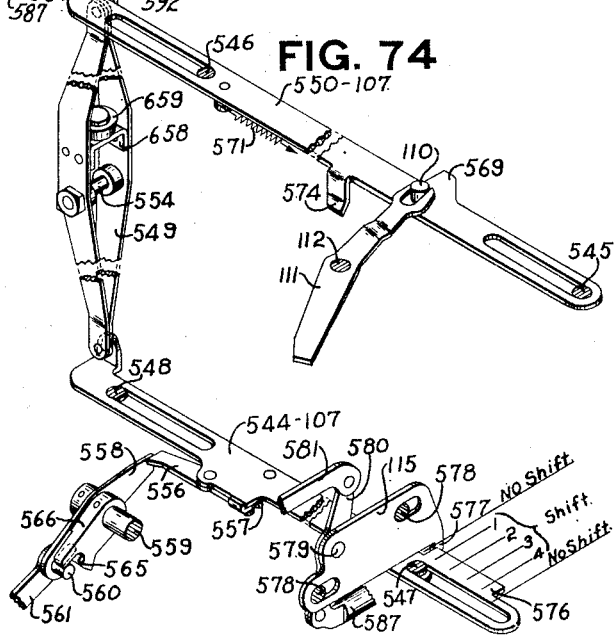

Fig. 74 is a fragmentary perspective view of the mechanism that controls the lateral shift of the product accumulator carriage.

Fig. 75 is a detail of the main slide for positioning the control disk shaft.

Fig. 76 is a detail view of the auxiliary slide and its associated escapement mechanism for positioning the control disk shaft.

Fig. 77 is a front elevation of the mechanism shown in Figs. 75, 76 and 78.

Fig. 78 is a detail view showing the mechanism for connecting the main and auxiliary slides to the control disk shaft.

Fig. 79 is a detail of the add escapement ratchet associated with the escapement mechanism shown in Fig. 76.

Fig. 80 is a right side elevation of the mechanism that operates the main slide and the controlling mechanism for said operating mechanism.

Fig. 81 shows in detail the mechanism for shifting the multiplier segment feeler pawl.

Fig. 82 is a side elevation of the mechanism that operates and controls the auxiliary slide.

Fig. 83 is a detail view of the mechanism that operates the escapement mechanism for the auxiliary slide during certain parts of a multiplying operation.

Fig. 84 is a side elevation, as observed from the left of the machine, showing the mechanism for operating and controlling the zero latches during multiplying operations.

Figure 85:
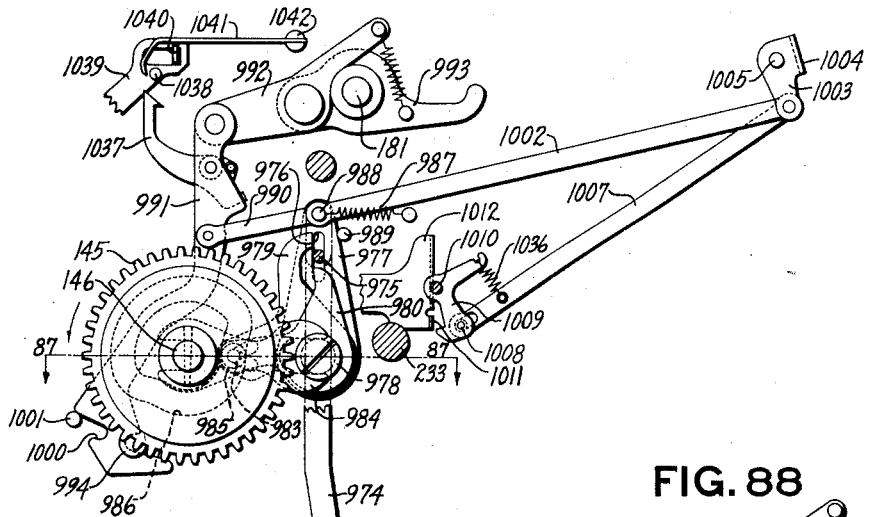

Fig. 85 is a side elevation of the mechanism for controlling the printer and the accumulator engaging mechanism.

Figure 86:
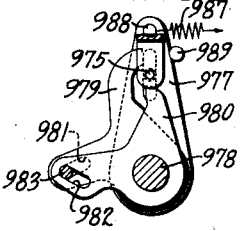

Fig. 86 is a detail of the scissors levers that shift the mechanism shown in Fig. 85, to and from effective positions.

Figure 87:
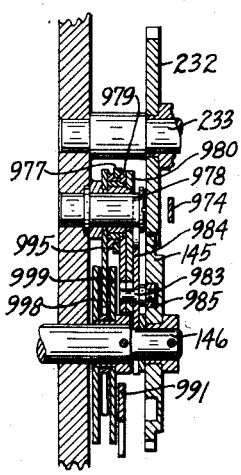

Fig. 87 is a cross section of a part of the mechanism shown in Fig. 85.

Figure 88:
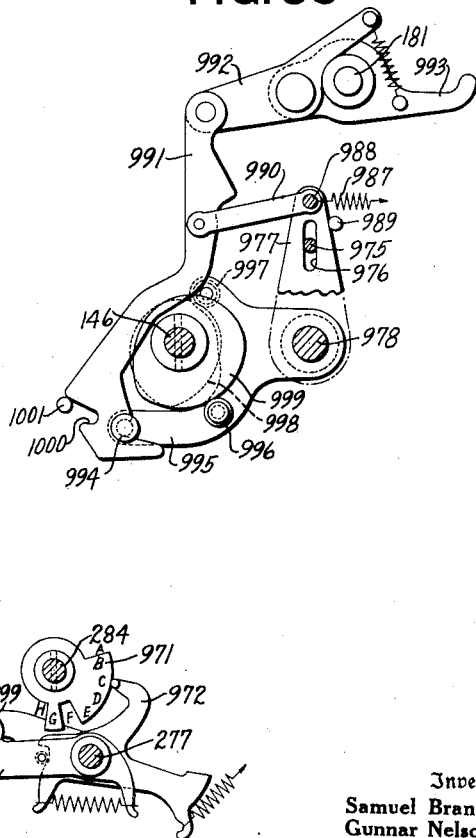

Fig. 88 shows in detail the printer operating mechanism.

Fig. 89 is an elevation of the mechanism shown in Fig. 85, as observed from the rear of the machine.

Fig. 90 illustrates in detail the mechanism that shifts the accumulator engaging link.

Fig. 91 shows the add engaging mechanism for one of the accumulators.

Figure 92:
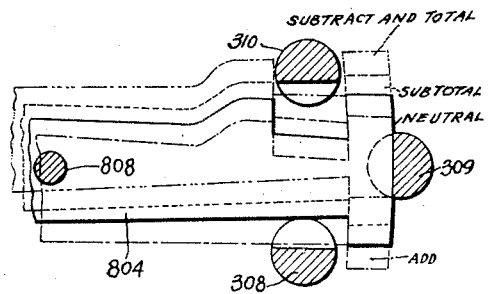

Fig. 92 is an enlarged end view of the engaging link for the No. 3 multiplicand storage device, showing the four possible positions to which it may be set.

In the figures showing portions of the frame work in phantom by dot and dash lines. Where the dot and dash lines do not show behind the parts it indicates that such parts are in front of the frames, but where the dot and dash lines are shown crossing the full line parts it indicates that such parts are behind the frames.

*General description*

Speaking in general terms, the crux of this invention resides in a multiplying unit attached to and working in conjunction with an accounting machine, such, for example, as the Ellis type of machine disclosed in the patents listed at the beginning of this specification. In its present embodiment the accounting machine of this invention has ten amount key banks and one overflow bank making a total of eleven denominational banks. Each of the amount banks has a reciprocating actuator rack adapted to actuate the wheels of a series of accumulators located at the rear of the machine. Likewise the actuator racks are adapted to position type carriers, which imprint the result of transactions on record material carried by a platen roll carried by a traveling carriage, similar to a typewriter carriage, and mounted for lateral movement on the top of the accounting machine case. Adjustable control elements or tappets on the traveling carriage are effective to determine columnar positioning of said carriage, and to select the different accumulators for adding operations and the balance accumulator for subtracting operations.

Other functions of the accounting machine, including total-taking, non-adding, repeating and subtracting, are controlled by means of a row of control keys located on the left of the keyboard. The usual starting bar, located at the right of the keyboard, is provided for initiating operation of the machine.

This machine is also provided with a typewriter attachment for typing various data on the record material.

Various instrumentalities are provided for controlling the tabulating of the traveling carriage and for returning the traveling carriage from any tabulated position to predetermined positions.

The multiplying unit or attachment, is a separate unit from the accounting machine and is attached preferably to the base of said accounting machine. The multiplying unit does not restrict or limit in any way the use of the accounting machine independently of said multiplying unit. Each of the accounting machine actuators is operatively connected to a corresponding denominational main actuator of the multiplying unit, which causes the differential positioning of the accounting machine actuators to be transmitted to the main actuators of the multiplying unit. For each of the main actuators of the multiplying unit there is a corresponding auxiliary actuator which, depending upon certain conditions, operates independently of said main actuators or is coupled to said main actuators and works in unison therewith.

The main and auxiliary multiplying actuators are adapted to cooperate with the wheels of four multiplicand storage devices having ten denominational wheels each. The main multiplying actuators are adapted to cooperate with the eleven denominational wheels of an add-subtract product accumulator and the auxiliary actuators are adapted to cooperate with the eleven wheels of an add product accumulator. The main multiplying actuators are also adapted to cooperate with the five segments of a multiplier storage device. The product accumulators and the multiplier storage segments are mounted in a slidable carriage which moves step by step from lower to higher denominations during multiplication. A plurality of control disks mounted upon a single shaft in the multiplier unit, in cooperation with their respective sensing or selector mechanisms, control all the functions of the multiplier unit and also control the operation of the accounting machine in multiplying operations.

In its present form, the machine of this invention is limited to five digits in the multiplier, ten digits in the multiplicand, and eleven digits in the product. The combined multiplicand and multiplier is restricted to a total of ten digits. For example, as the machine is herein shown and described, there may be nine digits in the multiplicand and one digit in the multiplier, or seven digits in the multiplicand and three digits in the multiplier, but never more than five digits in the multiplier. However, the number of digits in the multiplier and multiplicand may be readily increased by increasing the denominational capacity of the various units of the accounting machine and the multiplying unit.

Figs. 3 to 20 inclusive illustrate in diagrammatic form one denominational unit of the different storage devices and accumulators of the multiplying unit and their associated actuators. In these views the main actuator is numbered 100, the corresponding auxiliary actuator 101, the coupling pinion for the two actuators 102, and the add-subtract product accumulator 103. The add-product accumulator, which cooperates with the auxiliary actuators 101, is numbered 104, and the multiplier segment for this particular denomination is numbered 105. The shiftable carriage that carries the product accumulators 103 and 104 and the multiplier segments 105 is numbered 106 and is shown only in Fig. 3. The four multiplicand storage devices are numbered 10, 2, 1 and 3, respectively in agreement with the multiples of the multiplicand stored therein.

It is probably advisable to explain at this time that the Nos. 10, 2 and 1 multiplicand storage devices are merely storage devices in which only a single amount, representing a multiple of the multiplicand, is entered. The wheels of these three multiplicand storage devices have no carrying mechanisms and are read and reset by being reversely rotated into contact with fixed stops that locate said wheels in zero positions. The #3 multiplicand storage device is truly an accumulator, so to prevent confusion it is deemed advisable to designate all of these devices as multiplicand storage devices. It should be noted, however, that accumulators may be used to store the #1, #2, and #10 multiples of the multiplicand without departing from the instant invention.

Figure 3:
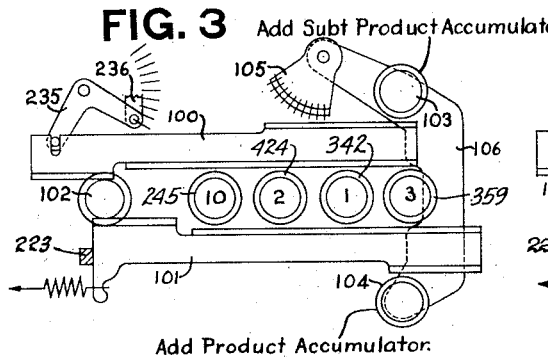

As a matter of convenience and to facilitate an understanding of the machine of this invention, the cycles of operation of said machine are divided into three groups, namely, preliminary cycles, actual multiplying cycles and final cycles. There are three preliminary cycles designated alphabetically F, G and H, and during these cycles the multiplicand and the multiplier are entered in the accounting machine accumulators and in the storage devices of the multiplying unit. The number of actual multiplying cycles may vary from 1 to 5, depending upon the number of digits in the multiplier. The final cycles of a multiplying operation vary according to whether the product is to be added in the accounting machine accumulators or subtracted therefrom. In the first case there are three final cycles designated alphabetically A, B and C, and in the second case there are four final cycles designated A, B, D and E. It will be noted that the A and B cycles are performed in both cases. Fig. 3 shows the mechanism of the multiplying unit at rest or in home position.

Figure 4:
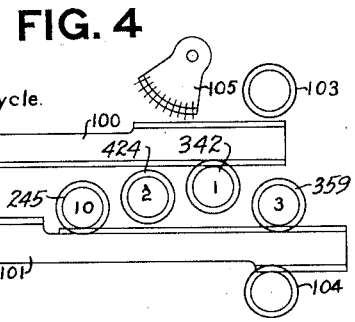

To initiate a multiplying operation the operator first enters the multiplicand upon the accounting machine keyboard, depresses a multiplication key and releases the machine for operation by means of the usual starting bar. The machine automatically completes two cycles (F and G) of movement before coming to rest. Fig. 4 depicts diagrammatically the first or F cycle of a multiplying operation and shows the main actuator 100 and its associated auxiliary actuator 101 coupled together by the pinion 102 for unitary movement. This view also shows the #1 multiplicand storage device in engagement with the teeth of the main actuator 100 and the #10 and #3 multiplicand storage devices and the add-product accumulator 104 in mesh with the auxiliary rack 101. Therefore, in the first or F cycle, one times the multiplicand will be entered in the #10, #1 and #3 multiplicand storage devices and in the add-product accumulator. In the second or G cycle of a multiplying operation (Fig. 5) one times the multiplicand is again entered into the add-product accumulator 104, making a total of two times the multiplicand accumulated therein.

At the end of the second or G cycle, the machine ceases operation to permit the setting up of the multiplier on the keyboard. The machine is again set in motion by depressing the starting bar. In the third or H cycle of a multiplying operation (Fig. 6) the add-product accumulator 104 is cleared and the amount contained therein, two times the multiplicand, is transferred to the #2 and #3 multiplicand storage devices. The #2 and #3 multiplicand storage devices now contain respectively two and three times the multiplicand and the #10 and #1 multiplicand storage devices contain one times the multiplicand. In a manner later to be described the #10 multiplicand accumulator is shifted laterally to the next higher order so that one times the multiplicand stored therein will be equal to ten times the multiplicand. It will be noted that in this H cycle of operation the main and auxiliary racks are not coupled together and that the multiplier segment 105 for this particular denominational unit is in mesh with the main rack 100 so that the amount of the multiplier set up on the accounting machine keyboard will be entered in said multiplier segment.

In the third or H cycle, mechanism illustrated in Figs. 21 to 25A inclusive, determines the number of multiplying cycles to be performed by the machine. In actual multiplying operations, the machine operates through one cycle of movement for each digit in the multiplier. Fig. 21 shows the cycle-determining mechanism in home or zero position. The cycle-determining mechanism includes a pair of bars, later described, but shown in the diagrammatic views as a single bar 107, mounted for horizontal sliding movement on the main frames of the multiplier unit. This bar 107 is shown with a projection 108 adapted to pass through notches 109 in the multiplier segments 105 when said segments are in zero positions. The bar 107 diagrammatically represents the bars 544 and 550 shown in Fig. 74 and combines all the features of these two bars. The bars 544 and 550 and associated mechanism will be explained in detail later in this specification.

The bar 107 carries a stud 110 engaged by the bifurcated end of a lever 111 pivoted at 112. Each of the segments 105 carries a stud 113 adapted to cooperate with an interpreting mechanism to select the multiplicand storage device or devices corresponding to the digits of the multiplier stored in the respective segments 105. In the third or H cycle, after the multiplier has been entered in the segments 105, the bar 107 is released to the action of a spring which urges said bar downwardly, as here viewed, until the projection 108 contacts a segment 105 that has been moved out of zero position. This positions a shoulder 114 of the bar 107 in relation to the nose of a slide 115. The slide 115 controls the escapement mechanism that governs the lateral shifting of the carriage 106.

As multiplying progresses, the bar 107 moves step by step in unison with the carriage 106 which, it will be recalled, carries the product accumulators 103 and 104 and the multiplier segments 105. After all the digits of the multiplier have been interpreted, the shoulder 114 moves out of the path of the nose of the slide 115. Said slide is then free to move toward the right, as here viewed, to render the escapement mechanism that controls the movement of the carriage 106 inoperative. When the bar 107 (Figs. 22, 23 and 25A) reaches its extreme downward position, the forward end of the lever 111 is positioned in the path of the multiplier interpreting mechanism and rocks said interpreting mechanism out of the path of the studs 113 on the segments 105 thereby allowing the controlling mechanism to return to a former position (cycle H) which conditions the machine for the final cycles of a multiplying operation.

In the present machine, the operations performed in any particular cycle are always set up in the preceding cycle. For example, the multiplier interpreting mechanism feels for the position of the units multiplier segment 105 in the third or H cycle and positions the controlling mechanism to select the multiplicand storage device or devices having stored therein the multiple or multiples of the multiplicand necessary to effect multiplication by the units multiplier digit. This is best illustrated in Figs. 24, 25 and 25A, in which the digit 1 has been entered in the units multiplier segment 105 and the digit 2 has been entered in the tens multiplier segment. The multiplier interpreting mechanism, in cooperation with the stud 113 interprets the digit 1 stored in the units multiplier segment 105 during the third or H cycle of operation. Near the beginning of the fourth cycle, which is the first actual multiplying cycle, the bar 107 is released and is spring-urged downwardly until the projection 108 engages the highest order segment 105 which has been moved, in this case the tens segment, that contains a digit. This releasing of the bar 107 allows the segments 105 to shift independently of the carriage 106 to bring the tens segment 105 opposite the multiplier interpreting mechanism. After this the multiplier segments 105 shift in unison with the carriage 106 until all the multiplier digits have been interpretted.

In the fourth cycle of operation the interpreting mechanism, due to its positioning in the preceding cycle, causes the #1 multiplicand storage device (Fig. 7) to engage the rack 100 and to be operated thereby in a sub-total operation and the amount contained therein, 1 times the multiplicand, is entered into the add-subtract product accumulator 103. Also in the fourth cycle of this particular multiplying operation the multiplier interpreting mechanism feels for the position of the stud 113 in the tens segment 105 and sets up the condition that in the fifth cycle, after the product accumulators have been shifted to properly aline the accumulators with the racks (Fig. 8), causes the #2 multiplicand storage device to be engaged with the rack 100 for a sub-total operation thereby, and the amount contained therein entered into the add-subtract product accumulator 103.

When the bar 107 moves to its extreme downward position, as shown in Fig. 25A, the forward or lefthand extension of the lever 111 moves into the path of the multiplier interpreting mechanism and moves said interpreting mechanism to neutral position in preparation for the final cycles of a multiplying operation. The lever 111, in cooperation with the interpreting mechanism, returns the controlling mechanism to the H or third cycle position, which it will be recalled is the position the controlling mechanism occupied just prior to the actual multiplying cycles. This renders the interpreting mechanism ineffective and transfers the positioning of the controlling mechanism from said interpreting mechanism to the escapement mechanism, which it will be recalled positions the controlling mechanism during the preliminary and final cycles of a multiplying operation. Before coming to rest the machine operates through one more cycle, which is termed cycle A (Fig. 16), to clear the multiplicand storage devices and the multiplier segments 105, and the carriage 106 is returned to starting position.

If the product is to be added in one or more of the accounting machine accumulators, the operator tabulates the traveling carriage to aline the proper column of the record material with the accounting machine type carriers and to select a particular accumulator for addition to receive the product when it is cleared from the product accumulator. Next the starting bar is depressed to release the machine for two final cycles of operation, designated cycles B and C.

In cycle B (Fig. 17) the main and auxiliary racks 100 and 101 are coupled for unitary movement by the coupling pinion 102 and the add-subtract product accumulator 103 is cleared and the amount contained therein added in the add-product accumulator 104. In cycle C the main and auxiliary racks remain coupled (Fig. 18), the add-product accumulator 104 is cleared and the amount contained therein added in the selected accounting machine accumulators. Also in cycle C the printing mechanism is rendered effective, in a manner later to be described, to record the product.

Figure 17:
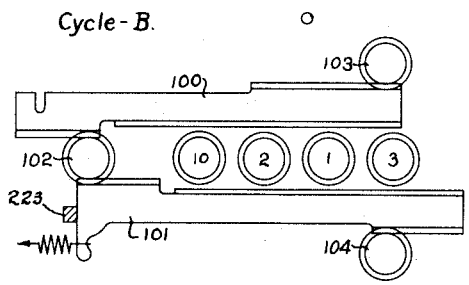
Figure 18:
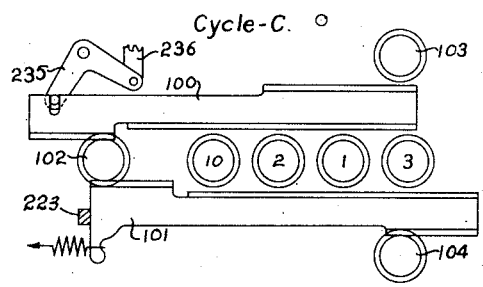
Figure 19:
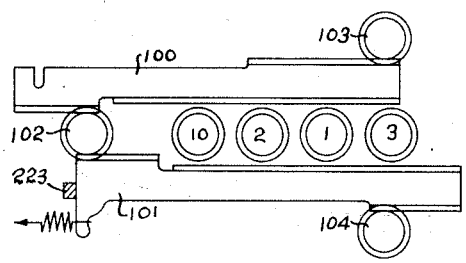
Figure 20:
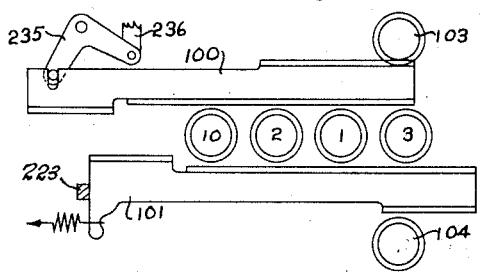

If the product is to be subtracted from one or more of the accounting machine accumulators the operator depresses a subtract product key and releases the machine for three final cycles of operation by means of the starting bar, said three cycles of operation being designated respectively B, D and E (Figs. 17, 19 and 20).

In the B cycle (Fig. 17), as explained above, the add-subtract product accumulator 103 is cleared and the amount therein is added in the add product accumulator 104. In cycle D (Fig. 19) the product contained in the add-product accumulator 104 is cleared therefrom and subtracted from the cleared add-subtract product accumulator 103 which now contains the complementary or negative amount of the product.

Near the end of cycle D the traveling carriage automatically tabulates to a predetermined columnar position to render the printing mechanism ineffective and to select the desired accounting machine accumulator or accumulators for addition to receive the negative product. In the E cycle of operation the add-subtract product accumulator 103 (Fig. 20) is engaged with the main actuator 100 in total-taking time, and it will be noted that at this time said main rack 100 is disconnected from the auxiliary rack 101. This results in the negative or complementary amount of the product being cleared from the add-subtract product accumulator and simultaneously added in the selected accounting machine accumulator or accumulators. This is obviously equivalent to subtracting the positive amount of said product from said accumulators.

While the positive product is being cleared from the add product accumulator in cycle D, said product if desired may be added in a selected accounting machine accumulator and the printing mechanism rendered effective to record said positive product.

Figure 9:
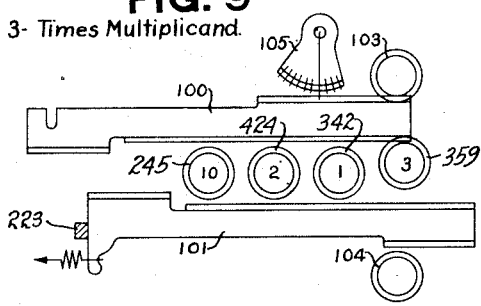

Fig. 9 represents in diagrammatic form the condition when the multiplier digit is 3 and in this case the #3 multiplicand storage device is engaged with the actuator rack 100 and operated in a sub-total operation and the amount contained therein, three times the multiplicand, is simultaneously entered into the add-subtract product accumulator 103.

Figure 10:
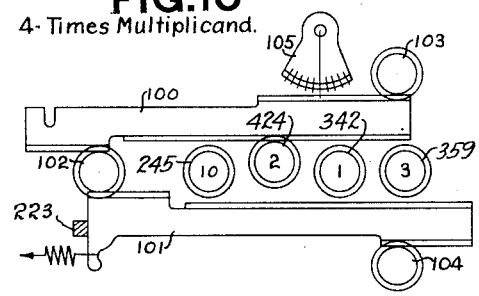

In Fig. 10 the multiplicand is being multiplied by four and in this case the #2 multiplicand storage device is engaged with the main actuator 100, which is coupled by the pinion 102 to the auxiliary rack 101. It will also be noted that the add-subtract product accumulator 103 is engaged with the rack 100 and the add-product accumulator 104 is engaged with the rack 101. In this case the #2 multiplicand storage device is operated in a sub-total operation and the amount therein, two times the multiplicand, is entered once in each of the product accumulators 103 and 104, so that the combined amount entered in the two accumulators is equal to four times the multiplicand.

Figure 11:
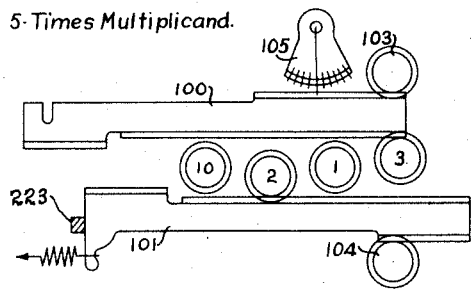

Fig. 11 shows the condition when the multiplicand is multiplied by five. In this case the #3 multiplicand storage device is engaged with the main actuator 100 and operated in a sub-total operation and the #2 multiplicand storage device is engaged with the auxiliary actuator 101. It will be noted that in this case the racks 100 and 101 remain uncoupled and consequently operate independently of each other, which results in three times the multiplicand being entered into the add-substract product accumulator 103 and two times the multiplicand being entered into the add-product accumulator 104. It is, therefore, evident that the combined amounts entered into the two product accumulators at this time is equal to five times the multiplicand.

Figure 12:
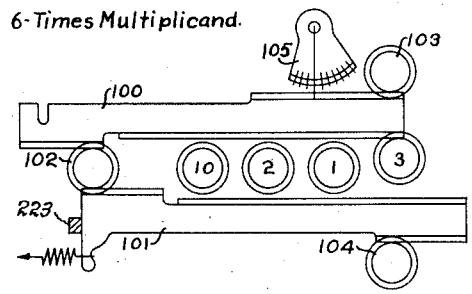

Fig. 12 shows the condition when the mult'plier is six, and in this instance three times the multiplicand is entered in each of the product accumulators 103 and 104 in exactly the same manner as explained above in connection with Fig. 10 whereby the total amount entered into the two accumulators 103 and 104 at this time is equal to six times the multiplicand.

Figure 13:
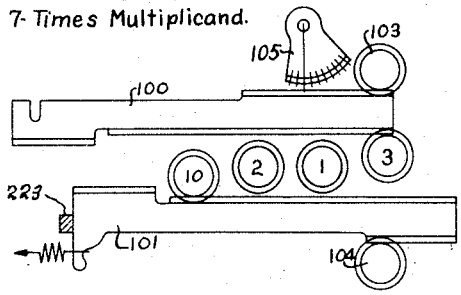

Fig. 13 represents the condition when the multiplicand is to be multiplied by seven. In this case the #10 multiplicand storage device and the add-product accumulator 104 are engaged with the actuator 101 and the #3 multiplicand storage device and the add-subtract product accumulator 103 are engaged with the actuator 100. It will be noted that the actuators 100 and 101 are not coupled for unitary movement by the pinion 102 and consequently in this case function independently of each other. This results in the #10 multiplicand storage device being operated in a sub-total operation and the amount therein, ten times the multiplicand, entered into the add-product accumulator. Simultaneously the #3 multiplicand storage device is operated in a sub-total operation and the amount therein, three times the multiplicand, is entered subtractively into the add-subtract product accumulator. It is therefore obvious that the combined amount in the two product accumulators is equal to seven times the multiplicand.

Figure 14:
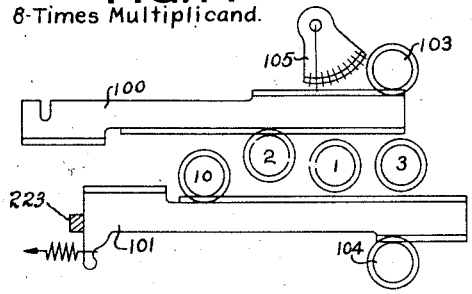
Figure 15:
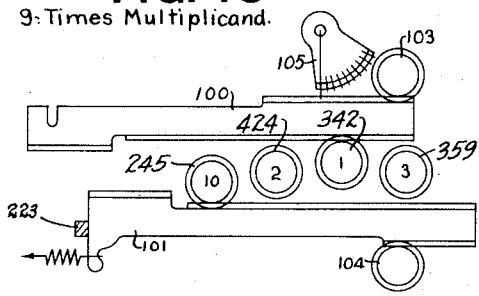
Figure 16:
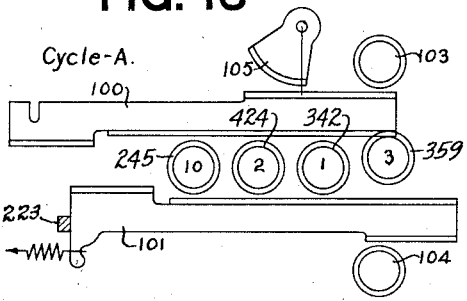

Figs. 14 and 15 represent respectively the condition when the multipliers are 8 and 9, and multiplication is accomplished in a manner similar to that explained for a multiplier of seven in connection with Fig. 13 with the exception that the #2 multiplicand storage device is used in the multiplication by 8 instead of the #3 multicand storage device and the #1 multiplicand storage device is used in the multiplication by 9 instead of the #3 multiplicand storage device.

The multiplication key, which is depressed, at the beginning of a multiplying operation, remains depressed until the last cycle, C or E, of said multiplying operation.

DETAILED DESCRIPTION

*Machine framework*

In the following description, the mechanism for accomplishing the results outlined above will be described in detail.

Directing attention to Figs. 29 and 33, the accounting machine mechanism is contained between and supported by a right main frame 116 and a left main frame 117, said frames being secured to a machine base 118. The main frames 116 and 117 are connected by various cross-frames and bars, including a frame 119 and a frame 120. The accounting machine mechanism is enclosed in a cabinet or case which is secured to the base 118 only a portion of which cabinet is shown at 121, Fig. 29. The cabinet 121 supports a laterally shiftable traveling carriage 122, carrying a platen roll 123, which presents record material to the imprinting mechanism. The mechanism of the multiplying unit is supported by two frames 124 and 125 (Figs. 31, 33, 36 and 47), secured to the lower surface of the machine base 118, and various crossframes, bars and rods extending between the frames 124 and 125.

Keyboard in general

Fig. 1, a diagrammatic view of the keyboard of the machine of this invention, reveals that as disclosed herein, said machine has ten rows of amount keys 126, a plurality of control keys 127, a repeat key 128, an error key 129, a subtract product key 130, a multiplication key 131, and a starting bar 132. The upper ends of the stems of all the keys and the starting bar 132 extend through apertures in a keyboard plate 133, secured to the main frames 116 and 117.

Machine operating mechanism

The starting bar 132 (Figs. 33 and 37) has stems 134 and 135, which extend through guide slots in the keyboard plate 133 and are connected respectively to a stud 150 in a rearward extension of a three-armed lever 136 loose on a stud 137 in the frame 116, and a plate 138 pivoted on a stud 139 secured in the frame 116. The plate 138 carries a stud 140 engaged by a bifurcated upward arm of the lever 136. A spring 141 is tensioned to urge the plate 138 clockwise and the lever 136 counterclockwise, as viewed in Figs. 33 and 37, to normally maintain a stud 142 carried by a downwardly extending arm of said lever 136 in engagement with a notch in a clutch lever 143, pivoted at 144 to the right multiplying unit frame 124. When the lever 143 is in the position shown in Fig. 37, it maintains the driven member of a clutch mechanism, not shown herein, but which is similar to that shown in the United States patent to Bernau, No. 1,601,102, which issued on September 28, 1926, out of engagement with the driving member of said clutch mechanism. The clutch driving member may be connected to any suitable electric motor which may, if desired, be secured beneath the base 118. The clutch driven member is operatively connected by gears (not shown) to a main drive shaft 146 journaled in the main frames 116 and 117.

Counterclockwise releasing movement of the plate 138 is normally blocked by means of a stud 147 (Fig. 33) carried by said plate in cooperation with a step in a locking lever 148 pivoted at 149 to the right frame 116. The lever 148 carries a stud 1501 engaged by the bifurcated end of an arm 155 secured to a shaft 156, opposite ends of which are journaled in the main frames 116 and 117. The shaft 156 is operatively connected to the control keys 127 in the usual manner so that depression of one of these keys imparts counterclockwise movement to said shaft, as viewed in Fig. 33, which, by means of the arm 155, rocks the lever 148 clockwise to move the step of said lever out of the path of the stud 147 and to move a clearance opening in said lever 148 opposite said stud 147 so that the starting bar 132 may be depressed.

A plurality of control elements or tappets 157 (Fig. 29), adjustably mounted on a tappet supporting bar secured to the front of the traveling carriage 122 and located in columnar positions thereof, in cooperation with hanging bar levers 158 select the different accumulators of the accounting machine for adding operations and likewise select the balance accumulators for subtracting operations in the usual manner. The tappets 157 also impart counterclockwise movement to the shaft 156 and arm 155, the same as depressing one of the control keys 127, to rock the locking lever 148 to ineffective position.

Depressing the starting bar 132 rocks the plate 138 counterclockwise and the lever 136 clockwise to disengage the stud 142 from the notch in the lever 143. This allows said lever 143 to be resiliently rotated a slight distance counterclockwise to connect the clutch driven member to the clutch driving member so that the constantly running motor of the usual type will set the machine mechanism in motion. After the clutch driven member has rotated the main drive shaft 146 one complete counterclockwise revolution, the lever 143 is restored upwardly to the position here shown, allowing the stud 142 to reengage the notch in said lever, and causing said lever 142 to disengage the clutch driven member from the clutch driving member to stop operation of the machine.

Located in front of the accounting machine keyboard is a plurality of typewriter keys 151, which, in cooperation with typewriter type (not shown) and an inking ribbon, are used to type various data, such as, description of merchandise, on the record material. The traveling carriage is tabulated by means of a typewriter tabulating lever 152, conveniently located at the right of the typewriter keyboard, and an accounting machine tabulating key 153, located between the starting bar 132 and the first row of amount keys.

Depressing the lever 152 releases the carriage escapement mechanism and moves a stop plunger upwardly in the path of a tappet (not shown) adjustably mounted on the tappet supporting bar, to aline a predetermined column of the record material with the type carriers. Depressing the tabulating key 153 also releases the carriage escapement mechanism and moves another stop plunger upwardly in the path of one of the tappets 157 to aline a particular column of the record material with the type carriers. Automatic tabulation of the carriage is effected by mechanism to be described in connection with the printing mechanism.

A "unit price" return bar 201 and a "credit" return bar 202 are located to the right of the typewriter keyboard and, when depressed, return the traveling carriage from tabulated position to predetermined columnar positions. Use of the carriage tabulating and return mechanisms will be explained more fully in connection with a system of operation to be described later herein.

All of the normal accounting machine operations of which the present accounting machine is capable require one counterclockwise rotation of the main drive shaft 146. However, in multiplying operations it is necessary for the shaft 146 to operate through several revolutions or cycles without stopping, and this is controlled by mechanism later to be described.

Amount keys, totalizers, and differential mechanism

Fig. 29 is a sectional view of the accounting machine taken just to the right of one of the amount banks, and inasmuch as the mechanism is substantially duplicated in each of the amount banks it is felt that the description of the mechanism for one amount bank or denominational unit of the machine will be sufficient for the purpose of this specification.

Each of the amount keys 126 carries a square stud 160 adapted to cooperate with graduated steps 161 in a differential actuator rack 162 mounted for horizontal reciprocating movement on a rod 163 and a bar 164, both supported by the frames 116 and 117. Secured to the rearward end of the rack 162 is an extension 165, the rearward end of which is bifurcated to straddle a slotted bar 166 supported by a rear totalizer frame 167.

In its present embodiment the accounting machine of this invention has four accumulators arranged in vertical pairs at the rear of the machine. The forward upper or No. 1 accumulator is an add-subtract or balance accumulator and has denominational wheels 168, a particular one of which is adapted to be actuated by teeth in the upper edge of the rack 162. The lower forward or #2 accumulator is an adding accumulator and has a plurality of denominational wheels 169, one of which is adapted to be actuated by teeth on the lower edge of the rack 162. The #1 and #2 accumulators are carried by a framework 170 secured to the main frames 116 and 117. A pair of plates 171, only one here shown, connect the frame 170 to the rear accumulator frame 167, and thus form a means of supporting said frame 167. The upper rear or #3 accumulator and the lower rear or #4 accumulator are supported in the frame 167 and have respectively wheels 172 and 173, corresponding denominational wheels of which are adapted to be actuated by teeth on the upper and lower edges of the extension rack 165.

The rack 162 has a vertical slot through which extends a stud 174 secured in a reducer segment 175 loose on a shaft 176 journaled in the main frames 116 and 117. An arm 177 of the segment 175 has pivoted thereto the lower end of a link 178, the upper end of which is loosely connected to a segmental type carrier 179 pivoted to an arm 180, loose on a printer shaft 181, the right end of which is journaled in the frame 116 and the left end in the framework of the printer mechanism. Secured on opposite ends of the shaft 176 are two symmetrical arms 182 of a leading frame, connected by a transverse bail 183. A spring 184 tensioned between said bail 183 and the segment 175 normally maintains a nose 185 of said segment in contact with the forward edge of the bail 183.

Each row of amount keys 126 (Figs. 30 and 35) has a locking plate 188 loose on a rod 189 supported by the key frame. The plate 188 has a bent over edge 187 which cooperates with studs 186 in the keys 126. At the beginning of machine operation the plate 188 is automatically rocked clockwise as viewed in Fig. 30 and moves under the studs 186 when the amount keys are not depressed and over said studs 186 when said amount keys are depressed, thereby locking said amount keys in either position during machine operation. Each row of amount keys has a detent 190 loose on the rod 189 and urged counter-clockwise as viewed in Fig. 30, by a torsion spring 191 (Fig. 35) into communication with the hook-shaped lower end 192 of the keys 126. Depression of one of the amount keys in a particular row rocks the detent 190 clockwise until the angular edge thereof moves beyond the hook 192. The spring 191 then returns said detent sufficiently to lock the key 126 in depressed position. Near the end of a machine operation a release bar 200 is automatically shifted towards the left (Fig. 30). The release bar 200 is notched to receive the forward edges of the detents 190 and rocks said detents clockwise to release all depressed amount keys. Loose on the rod 189 (Figs. 29, 30 and 35) is a zero latch 193, one for each denominational row of keys. A bent-over extension of the latch 193 is normally in the path of a projection 194 of its associated actuator rack 162. A torsion spring 195, weaker than the spring 191 for the detent 190, urges the latch clockwise, as viewed in Fig. 30, to maintain an upward extension 196 thereof in contact with the locking plate 188.

When no key 126 is depressed, the detent 190 remains in the path of the latch 193 and consequently restrains clockwise movement thereof when the locking plate 188 moves clockwise to effective position as explained above. Consequently the latch 193 remains in the path of the projection 194 to retain the actuator rack 162 in zero position during machine operation. Depressing any one of the amount keys 126 in a denominational row rocks the detent 190 clockwise, as viewed in Fig. 30, out of the path of the latch 193. Consequently when the locking plate 188 moves clockwise to effective position, the latch 193 follows in unison therewith under the action of the spring 195 to move the lower extension of said latch out of the path of the projection 194 of the actuator rack 162. The rack 162 (Fig. 29) is then free to make its initial movement rearwardly under influence of the leading frame bail 183 in a manner presently to be described.

During a machine operation, rotation of the shaft 146 (Fig. 33) oscillates the shaft 176 and the leading frame bail 183, in a manner presently to be described, first counterclockwise and then back to normal position as shown in Fig. 29. In adding operations, when an amount key has been depressed in a particular bank, initial movement counterclockwise of the leading frame 183 by means of the spring 184 causes the segment 175 and the rack 162 to move in unison therewith until the proper graduated step 161 encounters the stud 160 in the depressed amount key. This stops the rearward movement of said rack 162 and the segment 175, and thereafter an aligning bar 197 is rocked clockwise into engagement with the teeth of the segment 175 to retain said segment and rack 162 in their set positions. After the rack 162 engages the stud 160, the leading frame bail 183 continues its initial movement counterclockwise, flexing the spring 184. This differential positioning of the segment 175 is transmitted by means of the link 178 (Fig. 29) to the type carrier 179. The printer shaft 181 is oscillated first clockwise and back to normal position in each cycle of operation by mechanism to be described later in connection with the printer control mechanism (Fig. 85) for the multiplying unit. The time of operation of the shaft 181 is given in space XXII, Fig. 26. After the leading frame 183 reaches the end of its initial movement, initial movement of the shaft 181 (Fig. 29), through well-known mechanism, rocks a printer release trigger 198 counterclockwise out of engagement with a projection on an anti-rebound plate 199 connected to the arm 180. A spring 205 connected between a bail 206 secured to the shaft 181 and an anti-rebound pawl 207 connected to the arm 180, urges said arm and the type carrier 179 clockwise to cause said type carrier to carry an inking ribbon into contact with the record material and the record material into contact with the platen roll 123 to record the value of the depressed amount key.

Initial movement counterclockwise of the segment 175 (Fig. 29) causes a stud 208 in an extending arm of said segment in cooperation with an arcuate extension 209 of a zero elimination pawl 210 to rock said zero elimination pawl counterclockwise on a pivot 211 in the printer frame and against the tension of a spring 212 to disengage a tooth on the upper end of said pawl 210 from a projection on the plate 199. It is therefore obvious that when no amount key is depressed and the rack 162 and its associated segment 175 are retained in zero position, the pawl 210 remains effective and prevents printing movement of the plate 199, arm 180 and type carrier 179 when the trigger 198 is released.

Each of the zero elimination pawls 210 has a bent ear 213 that overlies its higher order neighbor, consequently when one of the pawls 210 is rocked counterclockwise by the segment 175, all the lower order pawls are rocked in unison therewith, thus allowing the zeros of the lower denominations to be recorded.

In adding operations, after the leading frame bail 183 (Fig. 29) completes its initial movement counterclockwise and the rack 162 has been differentially positioned, the corresponding denominational wheel of the selected accumulator or accumulators engages the teeth of the rack 162 or its extension 165. The alining bar 197 is then disengaged from the teeth of the segment 175 and the bail 183 starts its return movement clockwise in which it picks up the segment 175 and returns it and its associated rack 162 forwardly to home or zero position. The rack 162 in its return movement rotates the wheel of the selected accumulator to add therein an amount corresponding to the value of the depressed amount key. After the rack 162 reaches its home position, the accumulator wheel is disengaged therefrom.

Subtract operations are exactly like adding operations with the exception that the the corresponding denominational wheel of the #1 or balance accumulator is engaged with the upper teeth of the rack 162 prior to its initial movement rearwardly and consequently is rotated reversely thereby to substract an amount commensurate with the value of the depressed key 126 from said accumulator wheel.

In total and sub-total taking operations, the wheel of the selected accumulator is engaged with the rack 162 prior to its initial movement rearwardly, which movement rotates said wheel reversely until it is stopped in zero position by means of one of the teeth on its transfer tripping cam coming in contact with the tooth on its associated transfer pawl. This differentially positions the rack 162, the segment 175 and the type carrier 179 to record the amount standing on said accumulator wheel.

In total taking operations the wheel of the accumulator is disengaged from the rack 162 prior to return movement forwardly of said rack and consequently remains in a cleared condition. In sub-total taking operations the accumulator wheel remains engaged with the rack 162 during its return movement forwardly and is consequently returned to its original position.

The usual and well known carrying mechanism is used to transfer amounts from lower to higher denominations during adding or subtracting operations.

*Multiplying unit actuating mechanism*

Referring to Figs. 31 and 43, each denominational unit of the multiplying unit has one of the main actuator racks 100 and its associated auxiliary actuator rack 101 mounted for horizontal reciprocating movement by means of slots in each end of said racks in cooperation with bars 216 and 217 supported by the frames 124 and 125 (see also Fig. 36). The rack 101 has in its forward end a vertical slot which loosely engages a stud 218 in an arm 219 loose on a shaft 220 supported by the frames 124 and 125. A spring 221 stretched between an extension of the arm 219 and a bracket 222 urges the arm 219 counterclockwise and the rack 101 rearwardly to normally maintain said arm 219 in contact with the bail 223 of a multiplying unit leading frame 224. The bail 223 extends between two symmetrical arms of the leading frame 224, said symmetrical arms being secured to the shaft 220. Also secured to the shaft 220 (Figs. 33) is a crank 225 operatively connected by a link 226 to cam lever 228 (see also Fig. 34) secured to the accounting machine leading frame shaft 176 (see also Fig. 29). The lever 228 carries rollers 229 which cooperate respectively with the peripheries of companion cams 230 and 231, which combined with a gear 232 form an integral cluster loose on a stud 233 fast in the main frame 116. The gear 232 meshes with a gear 145, secured on the shaft 146, and is rotated thereby one clockwise revolution each machine operation. This, by means of the cams 230 and 231 and the lever 228, rocks the shaft 176 first counterclockwise and then back to normal position to cause the accounting machine leading frame 182 (Fig. 29) to oscillate to control the actuator rack 162 in the manner explained earlier herein. Oscillating movement of the shaft 176 by means of the lever 228, link 226, and crank 225, (Fig. 33) is transmitted to the shaft 220 and the leading frame 224 for the multiplying unit. This, by means of the arm 219 (Fig. 31) and spring 221, causes the auxiliary rack 101 to be reciprocated in the same manner as the accounting machine rack 162.

Each main multiplying rack 100 (Fig. 43) has a vertical slot which straddles a stud 234 in a lever 235 loose on the shaft 220 and each lever 235 is connected by a link 236 (Figs. 29 and 31) which extends through an opening in the base 118, to the arm 177 of the corresponding reducer segment 175. Each link 236 has on its lower end an extension 250 which, in cooperation with slots in a guide bracket 237 secured to the base 118, guides said links 236 and maintains them connected to their respective levers 235. By the above train of mechanism the differential positioning of the actuator racks 162 is transmitted to the actuator racks 100 of the multiplying unit and vice versa.

*Coupling pinions for the multiplying actuators*

As previously stated, there are eleven pairs of the actuators 100 and 101 (Fig. 36), one pair for each denominational bank of the accounting machine. It is sometimes necessary to couple the different pairs of actuators 100 and 101 together for unitary movement, and this is accomplished by means of the wide coupling pinions 102 (Figs. 31 and 36) the faces of which are wide enough to mesh simultaneously with corresponding denominational actuators 100 and 101. The pinions 102 are loose on a rod 238 supported in a rockable frame composed of a bail 239 terminating in symmetrical right-angled arms 240 loose on a shaft 241 extending between the frames 124 and 125.

Mechanism is provided to engage the coupling pinions 102 with the racks 100 and 101 in adding, sub-total taking or total taking operations, and such mechanism will be explained later in connection with the multiplicand storage devices. A stationary aliner 242 (Figs. 31 and 36) maintains the coupling pinions 102 in alinement when they are disengaged from the racks 100 and 101. The aliner 242 is loose on a shaft 243 journaled in the frames 124 and 125, but is retained stationary by means of a fixed stud 244 in the frame 125 in cooperation with a hole in an extension of said aliner 242. This insures the proper meshing of said coupling pinions 102 with the teeth of the racks 100 and 101.

Multiplicand Storage Devices

The machine of this invention has four multiplicand storage devices (Fig. 31) numbered according to the multiples of the multiplicand stored therein. For example, ten times the multiplicand is stored in the #10 storage device, two times the multiplicand in the #2 storage device, one times the multiplicand in the #1 storage device, and three times the multiplicand in the #3 storage device. In the #10, #2 and #1 storage devices there is no necessity for transferring amounts from lower to higher denominations, consequently these storage devices have no tens transferring mechanism. However, the #3 multiplicand storage device has a transferring device similar to that used in the well-known Ellis accounting machine disclosed in the patents referred to at the beginning of this specification.

The wheels of the #2 and #3 multiplicand storage devices are shiftable laterally, so that they may be actuated either by the racks 100 or 101. The wheels of the #1 multiplicand storage device are always actuated by the main racks 100, consequently it is unnecessary to shift these wheels laterally. The wheels of the #10 multiplicand and storage device always cooperate with the auxiliary racks 101. Consequently this storage device is not shiftable laterally for the purpose described for storage devices #2 and #3 but for the following reason. In the case of the #10 storage device, one times the multiplicand is entered therein, the same as in the #1 storage device. However, the first time the #10 storage device is selected for engagement with the actuators, the entire storage device is shifted laterally to the next higher denomination, which is equivalent to adding ten times the multiplicand therein. The #10 storage device remains in shifted position until near the end of the multiplying operation, when it is returned to its initial position.

The general construction of the #10, #2 and #1 multiplicand storage devices is similar, and for that reason it is thought that a detailed description of the #10 storage device will be sufficient. However, the various features peculiar to these three multiplicand storage devices will be fully described.

The denominational wheels 245 (Figs. 31 and 36) of the #10 multiplicand storage device are loose on a shaft 246 supported in a rockable frame composed of arms 247 and 248 connected by a transverse bail 249. The arms 247 and 248 carry respectively studs 255 and 256 in axial alinement and fitting loosely respectively in a hub 257 secured in the frame 125 and a hub 258 secured in a plate 259 rigidly connected to the frame 124 by means of various studs and shafts. The arms 247 and 248 (Fig. 31) are further strengthened by a rod 260 extending therebetween. Between each of the wheels 245 is a spacing plate 261 extending between the shaft 246 and the rod 260. The arm 248 and the plates 261 each have a right angled lug 262 (Figs. 31 and 36) which in cooperation with studs 263 in each of the wheels 245 provide a means of locating said wheels in zero position when they are reset. Secured on the shaft 246, adjacent each of the wheels 245, are arms 264 which in cooperation with the studs 263 restore the wheels of the #10 storage device to zero near the end of a multiplying operation in a manner presently to be described.

*Multiplicand storage device engaging mechanism*

Loose on opposite ends of the shaft 246 are rollers 265 and 266 (Figs. 31, 36, 62) adapted to cooperate respectively with identical camming slots 267 and 268 in cam arms 269 and 270 secured on a shaft 271 journaled in the frames 124 and 125. The arm 270 has a downward extension which is pivoted to the forward end of a link 272 carrying a stud 273 which extends within a horizontal slot in a pitman 274, the upper end of which is bifurcated to fit an annular groove in a spacing collar loose on a shaft 275 supported by the frames 124 and 125. The downward end of the pitman 274 is loosely connected to a selector arm segment 276 loose on a shaft 277 extending between the frames 124 and 125. A spring 278 flexibly connects the segment 276 to a selector arm 279 and said spring causes a stud 280 in the segment 276 to contact a projection of said selector arm at the proper time. A spring 281 is tensioned to urge a nose 282 of the selector arm 279 into engagement with the multilated periphery of a control disk 283 secured on a shaft 284 journaled in the frames 124 and 125 (see also Fig. 36).

The selector arm 279 (Fig. 62) has a projection 285 which cooperates with a selector arm restoring bar 286 having symmetrical arms which are secured to opposite ends of the shaft 277. The lower end of a pitman 287 (Fig. 49) is pivotally connected to the left hand arm of the restoring bar 286 and the upper end of said pitman 287 is bifurcated to straddle a hub 288 of a plate cam 289 which in cooperation with its companion cam 290 shifts the carrying mechanism for the add-subtract product accumulator to subtract position. The pitman 287 has a roller 292 cooperating with the raceway 293 in cam 289. The cams 289 and 290 are secured to a multiplying unit cam shaft 291 journaled in the frames 124 and 125. The shaft 291 (Figs. 33, 36 and 47) has secured on its righthand end a gear 294 which meshes with a similar gear 295 assembled in a fixed cluster with companion plate cams 296 and 297 which, in cooperation with mechanism later to be described, controls the return of the multiplying unit carriage. The gear 295 and the cams 296 and 297 are loose on a stud 298 secured in an upward extension of the frame 124.

During an operation of the accounting machine (Figs. 33 and 47), which it will be understood constitutes one cycle of a multiplying operation, the gears 145 and 232 rotate the gear 295 and the cams 296 and 297 one counterclockwise revolution. The gear 295 in turn rotates the gear 294, the shaft 291 and the cams 289 and 290 one clockwise revolution as viewed in Fig. 33, and one counterclockwise revolution as viewed in Fig. 49. The raceway 293 in cooperation with the roller 292 moves the pitman 287 and the restoring bar 286 first downwardly (see also Fig. 62 and space XI Fig. 26) to disengage the nose 282 of the arm 279 from the periphery of the disk 283. While the selector arms are thus disengaged from the disks, the control disks are positioned, in a manner later to be described, after which the bar 286 is returned upwardly to normal position to allow the selector arms to engage the edge of the control disks and be positioned thereby.

It will be noted that a non-add bail 299 overlies the segment 276. This bail is loosely mounted by symmetrical arms on the shaft 277 and it is deemed sufficient for the time being to state that depression of the multiplication key 231 (Fig. 1) renders the non-add bail 299 ineffective during multiplying operations.

The link 272 (Fig. 62) has on its rearward end a lug 305, an arcuate surface 306 and a notch 307, which cooperate respectively with an add-engaging rod 308, an add and sub-total disengaging rod 309, and a total and subtract engaging and disengaging rod 310. The add rod 308 (Figs. 36 and 44) is secured between the lower ends of symmetrical levers 311 and 312, rotatably supported respectively by studs 313 and 314 in the frames 124 and 125. Each of the levers 311 and 312 carries rollers 315 and 316 adapted to cooperate respectively with a pair of plate cams 317 and 318, secured on each end of the shaft 291. The add and sub-total disengaging rod 309 (Figs. 36 and 46) extends between symmetrical cam levers 319 and 320 turnably supported by the studs 313 and 314. Y-shaped extensions of the levers 319 and 320 each carry a roller 321 or a roller 322 adapted to cooperate respectively with the peripheries of a pair of plate cams 323 and 324 secured at opposite ends of the shaft 291.

The total and subtract engaging and disengaging rod 310 (Figs. 36 and 45) is secured between cam levers 325 and 326 pivoted respectively on the studs 313 and 314. The levers 325 and 326 have Y-shaped extensions, carrying respectively a roller 327 and a roller 328 adapted to cooperate with a pair of cams 329 and 330 secured on each end of the shaft 291. The movements of the mechanism illustrated in Figs. 44, 45 and 46 are shown graphically in spaces II, III and IV of the time chart (Fig. 26).

The control disk 283 (Fig. 62) has eighteen radial positions, which in cooperation with the nose 282 of the selector arm 279 selects the #10 multiplicand storage device for engagement with the actuators 101 in different types of operations.

The functions of the machine are controlled in multiplying operations by means of twenty-four disks similar to the disk 283 (Figs. 36 and 62) on the shaft 284. The contours of these disks and what they accomplish during multiplying operations are charted diagrammatically in Fig. 28. For example, the control disk 283 for the #10 multiplicand storage device is represented by space 8. The eighteen radial locations of the control disks which correspond to the different cycles of a multiplying operation are represented by the letters A to H inclusive, which represent the preliminary and final cycles of a multiplying operation, and by the denominational multiplier digits 1 to 9 inclusive, and zero. These letters and figures may be found opposite the vertical columns they represent at the top and bottom of the chart.

It will be recalled that the final cycles of a multiplying operation may be either A, B, C, or A, B, D, and E, depending upon whether the product is added in the accounting machine accumulators or subtracted therefrom. Referring to space 8 of the chart (Fig. 28) in cycles C or E the disk 283 conditions the #10 multiplicand storage device for adding which takes place in cycle F, and conditions the #10 multiplicand storage device for sub-total operations when the digits of the multiplier are 7, 8 or 9. In all other cycles of a multiplying operation, this disk, and its associated mechanism, retains the #10 multiplicand storage device in neutral or ineffective position.

The segment 276 (Fig. 62) has a plurality of teeth 331 adapted to cooperate with an alining bar 332 secured to a transverse bar 333, terminating in arms 334 and 335 (see also Fig. 49) which are secured to a shaft 336, journaled in the frames 124 and 125. Secured on the lefthand end of the shaft 336 (Fig. 41) is a crank 337 to which is operatively connected the lower end of a pitman 338, the upper end of which is bifurcated to be guided by a bushing 339 loose on the shaft 291 (see also Fig. 36). The pitman 338 carries a roller 340 which extends within a cam groove 341 in the righthand face of the cam 290. The configuration of the groove 341 is such that it causes the aliner 332 to engage the teeth 331 (Fig. 62) of the segment 276 near the beginning of each cycle of a multiplying operation. The aliner 332 remains engaged with the teeth during the greater part of the cycle to retain the segment 276 in the position in which it was located in the preceding cycle. The movement of the aliner 332 in each cycle of a multiplying operation is illustrated graphically in space XII of the time chart (Fig. 26).

It should be remembered that in multiplying operations the control disks, their associated selector arms and the selector arm segments control all the functions of the machine. Also that the control disks, the selector arms and their associated selector arm segments are positioned and set up the conditions for the present cycle of operation in the preceding cycle. The flexible connections between the selector arms and their respective segments permit the moving of the selector arms out of engaging relation with the disks by the bar 286 (see spaces XI and XII Fig. 26) and the positioning of the control disks while the aliner 332 retains the selector arm segments in the positions they were moved to in the preceding cycle to control the functioning of the machine. Near the end of a cycle of operation, after all functions have been completed, the aliner 332 is disengaged from the selector arm segments and said segments are then allowed to be positioned for the following cycle under the control of the selector arms in cooperation with their respective disks.

Again directing attention to Fig. 62, the disk 283 is here shown in the position in which it was left in the last cycle of the preceding multiplying operation. It will be noted that in this position, a lug of said disk 283 corresponding to cycle C is opposite the nose 282 of the selector arm 279 and by referring to space 8 of the chart (Fig. 28) it will be seen that this selects the #10 multiplicand storage device for adding. It will also be noted in Fig. 62 that the non-add bar 299 retains the segment 276 in neutral or non-add position when the machine is at rest, thus separating the stud 280 from the projection of the selector 279 and flexing the spring 278. Depressing the multiplication key 231 frees the ball 299 and allows the spring 278 to move the segment 276 clockwise until the stud 280 engages the selector arm 279. This locates said segment 276 in adding position and immediately thereafter when the machine is released for a multiplying operation the aliner 332 engages the proper teeth 331 to retain said segment in adding position during the remainder of the first or F cycle of a multiplying operation. This movement of the segment 276 moves the pitman 274 downwardly, which, by means of the slot therein in cooperation with the stud 273, rocks the link 272 downwardly to move the lug 305 of said link in the path of the add-engaging rod 308.

It will be recalled by referring to Fig. 4 that the main multiplying actuator rack 100 and the auxiliary multiplying rack 101 are coupled together in the first or F cycle of a multiplying operation by the coupling pinions 102 (see also Fig. 31). It is therefore obvious that the differential positioning of the accounting machine actuator rack 162 (Fig. 29), which corresponds to the multiplicand digit set-up on the amount key 126 for that bank, will, by means of the link 236 and lever 235, be transmitted to the main and auxiliary racks 100 and 101 of the multiplying unit. For the time of movement of the actuators and their leading frames see space I of the chart Fig. 26.

After the actuator racks have thus been differentially positioned, the add-engaging rod 308 (Figs. 31, 44 and 62) receives rearward movement according to the time shown in space II of the chart (Fig. 26). The rod 308 in its initial movement carries the link 272 therewith to rotate the cam plate 270, the shaft 271 and the cam plate 269 counterclockwise. The cam slot 268 in the plate 270 and the cam slot 267 in the plate 269 in cooperation with their respective rollers rock the wheels of the #10 multiplicand storage device into mesh with the auxiliary racks 101. Return movement forwardly of said racks rotates the wheels of the #10 multiplicand storage device counterclockwise, commensurate with the value of the depressed amount keys to enter one times the multiplicand therein. Return movement of the sub-total and add-disengaging rod 309 (Figs. 36, 46 and 62 and space IV of the time chart Fig. 26) returns the link 272 and connected mechanism to normal position to disengage the wheels of the #10 multiplicand storage device from the auxiliary rack 101.

*No. 1 multiplicand storage device*

One times the multiplicand is also entered in the #1 multiplicand storage device in the first or F cycle of a multiplying operation. The mechanism and the manner in which it functions is similar to that used in connection with the #10 multiplicand storage device, and for that reason will be but briefly described hereinafter.

The wheels 342 of the #1 multiplicand storage device (Figs. 31 and 64) are mounted in a rockable frame 350 similar to that which supports the wheels of the #10 multiplicand storage device. Rollers 351 at either end of the rockable frame cooperate with identical cam slots 343 in two symmetrical cam plates 344 secured on a shaft 345 journaled in the frame 124 and 125. Also secured on the shaft 345 is a crank 346 connected by a link 347 to the upper arm of a lever 348 loose on the shaft 271.

The lower arm of the lever 348 is pivotally connected to the forward end of a control link 349, which is similar to and cooperates with the engagement and disengagement control rods 308, 309 and 310, in exactly the same manner as the link 272 (Fig. 62). A selector mechanism composed of a selector arm 355 and a cooperating selector arm segment 356, which is connected to the link 349 by a pitman 357, is controlled by a #1 multiplicand storage device selector disk 358 secured on the shaft 284. This mechanism is similar to the mechanism illustrated in Fig. 62 and shifts the link 349 relative to the rods 308, 309 and 310, to control the engagement and disengagement of the wheels of the #1 multiplicand storage device with the actuator racks 100. By referring to the fifth space of the chart (Fig. 28) it will be observed that the contour of the periphery of the disk 358 is exactly the same as that of the disk 283 for cycles C and E. Consequently in either of these cycles the condition will be set up that causes the wheels of the #1 multiplicand storage device to be engaged with the main actuators 100 in adding time in the first or F cycle of a multiplying operation.

*No. 3 multiplicand storage device*

One times the multiplicand is also entered in the #3 multiplicand storage device at the same time it is entered in the No. 10 and No. 1 storage devices. The engaging mechanism for the #3 multiplicand storage device is almost identical with that of the #1 multiplicand storage device (Figs. 64 and 65). The #3 multiplicand storage device differs from the other multiplicand storage devices in that it has a transferring device, the need of which will later be revealed.

The wheels 359 of the #3 multiplicand storage device are mounted in a rockable frame 360 similar to those for the #10 and #1 storage devices. The frame 360 carries rollers 361 which cooperate with identical camming slots 362 in symmetrical camming plates 363 secured on a shaft 364 (see also Fig. 31) journaled in the frames 124 and 125. Also secured on the shaft 364 is a crank 365 connected by a link 366 to the upper arm of a lever 367 loose on the shaft 271. The lower arm of the lever 367 has pivoted thereto the forward end of an engaging link 368 similar to the link 272 (Figs. 62 and 92) and adapted to cooperate with the bars 308, 309 and 310 in exactly the same manner as said link 272 cooperates with said bars 308, 309 and 310. The link 368 is connected by a pitman 369 to a selector arm segment 370 loose on the shaft 277 and adapted to be positioned by a selector arm 371 in cooperation with the periphery of a selector disk 372 secured on the shaft 284. It will be noted by referring to Fig. 65 and space 7 of the control disk chart (Fig. 28) that in either of the final cycles C or E of a multiplying operation the disk 372, in cooperation with the selector mechanism, sets up the condition that causes one times the multiplicand to be entered in the wheels of the #3 multiplicand storage device when they are engaged with the auxiliary actuator racks 101 during the first cycle of a multiplying operation.

*Add product accumulator and carriage therefor*

By referring to Fig. 4 it will be seen that one times the multiplicand is also entered in the add product accumulator 104 in the first cycle of a multiplying operation. The add product accumulator 104 and the add-subtract product accumulator 103 are located in vertical alinement in the laterally shiftable carriage 106 supported at the rear of the multiplying unit (Fig. 31). The frame of the carriage 106 is composed of main plates 376 and 377 (Figs. 67, 69 and 72) each of which is notched at the top and the bottom to receive respectively transverse rails 378 and 379. Bent-over ears 380 extending from the top notches and ears 381 extending from the bottom notches of the plates 376 and 377 provide a means of securing the rails 378 and 379 to the plates 376 and 377. The rails 378 and 379 have cut therein raceways which match with similar raceways cut in rails 382 and 383 secured respectively to the top rear edges and bottom rear edges of the frames 124 and 125. The raceways in cooperation with ball bearings 384 provide a satisfactory means for shiftably supporting the product accumulator carriage.

The product accumulator carriage 106 is shifted automatically from left to right in a manner later to be described when actual multiplying is taking place. However, when multiples of the multiplicand are being entered in the multiplicand storage devices and in the add product accumulator, the carriage 106 is retained in its extreme lefthand or home position. The wheels 385 (Figs. 31 and 66) of the add product accumulator 104 are supported on a shaft 386 extending between symmetrical arms 387 which are connected by a cross bar 388 and a rod 389. The wheels 385 are spaced by means of a series of symmetrical plates (not shown) extending between the rod 389 and the bar 388. The two arms 387 are pivoted on studs 390 secured in the plate 377 (Fig. 69) and an accumulator end plate 398. The assembly just described forms a rockable frame for the add product accumulator so that the wheels 385 thereof may be engaged with and disengaged from the auxiliary actuator racks 101. The arms 387 (Fig. 66) each carries a roller 391 which extends within an identical cam groove 392 (see also Fig. 67) in symmetrical cam plates 393 secured on a shaft 394 journaled in the plates 376 and 377 of the carriages 106. Also secured on the shaft 394 is a pair of uniform cranks 395 which support a rod 396 adapted to cooperate with a slot in a plate 397 (see also Fig. 47) fulcrumed on a stud 485 secured in the frame 124.

The plate 397 is pivotally connected by a link 399 to an upwardly extending arm of a yoke 405 loose on a shaft 406 journaled in the frames 124 and 125. The yoke 405 has a downwardly extending arm 407 to which is pivoted the forward end of an engaging link 408 similar to the link 272 (Fig. 62) and which cooperates with the bars 308, 309 and 310 in exactly the same manner as explained for link 272. The link 408 has connected thereto a pitman 409 the lower end of which is connected to a selector segment 410 loose on the shaft 277, said segment being controlled and positioned by a selector arm 411 in exactly the same manner as explained for the segment 276 and selector arm 279 (Fig. 62). The position of the selector arm 411 is controlled by means of a nose thereon in cooperation with the periphery of a selector disk 412, the contour of which is outlined diagrammatically in space 3 of the control disk chart (Fig. 28).

By consulting the chart (Fig. 28) it will be seen that the condition is set up in either of the final cycles C or E of a multiplying operation to cause the add product accumulator 104 to be engaged with the auxiliary actuators 101 in adding time in the first or F cycle of a multiplying operation. It is, therefore, evident that one times the multiplicand will be simultaneously entered into the #10, #1 and #3 multiplicand storage devices and in the add product accumulator 104 during the first or F cycle of a multiplying operation.

*Coupling pinion engaging mechanism*

It will be recalled by referring to Figs. 31, 36 and 60 that the coupling pinions 102 are contained in a rockable frame composed of two symmetrical arms 240 connected by a cross bar and cross rod. Each of the arms 240 carries a roller 413 which extends within identical camming grooves 414 in each of the symmetrical arms 415 secured on the shaft 243. Also secured on the shaft 243 is a crank 416 pivotally connected by a link 417 to one arm of a bell crank 418 loose on the shaft 271. The other arm of the bell crank 418 has pivoted thereto a link 419 similar to the link 272 and adapted to cooperate with the engaging and disengaging rods 308, 309 and 310 in the same manner as said link 272. The link 419 is connected by a pitman 420 to a selector segment 421 loose on the shaft 277 and controlled by a selector arm 422 which is positioned under control of a control disk 423 secured on the shaft 284.

By referring to the first space of the control disk chart (Fig. 28) it will be seen that in either of the final cycles C or E the condition will be set up that will cause the link 419 to be moved in the path of the rod 310 so that said rod will shift the cams 415 clockwise (Fig. 60) to engage the coupling pinions 102 with the racks 100 and 101 prior to their initial movement rearwardly in the first cycle of a multiplying operation. It will also be observed that the forward edge of the notch in the link 419 clears the flattened surface of the rod 310. Consequently the link will not be returned by the rod 310 but will be returned according to the time of the sub-total rod 309. Consequently the coupling pinions 102 remain engaged with the racks 100 and 101 until they have completed their return movement forwardly.

In the second or G cycle of a multiplying operation one times the multiplicand is again entered in the add product accumulator 104 (Fig. 31). It will be recalled that the condition for the present cycle is set up in the preceding cycle. By consulting horizontal columns 1 and 3 and vertical column F of the chart (Fig. 28) it will be seen that the condition is set up in cycle F to cause the coupling pinions to be effective and to cause the add product accumulator to cooperate with the auxiliary actuator 101 in adding time.

The machine ceases operation at the end of cycle G to permit the multiplier to be set upon the accounting machine keyboard. After this the machine is again placed in operation by depressing the motor bar 132. The multiplication key 131 (Fig. 1) remains depressed until the end of a multiplying operation. By referring to spaces 1, 3, 6 and 7 of the control disk chart (Fig. 28) it will be seen that in cycle G the condition is set up that will cause the coupling pinions 102 (Fig. 31) to be uncoupled from the racks 100 and 101 and that the disk 412 (Fig. 66) will be positioned to cause the wheels 385 of the add product accumulator to cooperate with the auxiliary rack 101 in total taking time in the succeeding cycle H. It will also be observed that the wheels 359 of the #3 multiplicand storage device (Fig. 6), under control of the disk 372, will be engaged with the auxiliary rack 101 in adding time and that wheels 424 (Fig. 63) of the #2 multiplicand storage device under the influence of a control disk 425, will be engaged with the auxiliary actuators 101 (Fig. 63) in adding time. It is therefore obvious that in cycle H the add product accumulator, containing two times the multiplicand, will be cleared and the amount therein, 2 times the multiplicand, will be entered in the #2 and #3 multiplicand storage devices and inasmuch as the #3 multiplicand storage device previously had one times the multiplicand entered therein it now contains three times the multiplicand.

The periphery of the disk 425 (Fig. 63) cooperates with the nose of a selector arm 427 loose on the shaft 277. The selector arm 427 controls a selector segment 428, also loose on the shaft 277, in exactly the same manner as explained for the #10 multiplicand storage device (Fig. 62). The segment 428 is conencted by a pitman 429 to an engaging link 430 similar to the link 272. The forward end of the link 430 is conencted to the downwardly extending arm of a lever 431 loose on the shaft 271 and connected by a link 432 to a crank 433 secured to the shaft 349. Also secured on the shaft 349 are symmetrical cam plates 434 with identical camming slots 435 which cooperate with a pair of rollers 436 secured respectively on two symmetrical arms 437, pivoted on studs 438 in the frames 124 and 125. The arms 437 together with other parts provide a rockable frame for the wheels 424 of the #2 multiplicand storage device.

Transfer mechanism for #3 multiplicand storage device

As mentioned previously, as only one amount is entered in the #1, #2 and #10 multiplicand storage devices it is unnecessary for these accumulators to have a tens transferring mechanism. However, as more than one amount is entered in the #3 multiplicand storage device, it is necessary to provide this storage device with a transferring mechanism to transfer amounts from lower to higher denomination. As previously stated, the transferring mechanisms for the #3 multiplicand storage device of the multiplying unit is similar to that of the well known Ellis accounting machine and is fully disclosed in the patents referred to at the beginning of this specification. For this reason only a brief description of the #3 multiplicand storage device tens transferring mechanism will be given in order to point out the slight mechanical difference between this and the conventional mechanism.

Directing attention to Fig. 31, each of the wheels 359 of the #3 multiplicand storage device, except the highest order wheel, has secured thereto a transfer tripping cam 439 with diametrically opposed teeth adapted to cooperate with the teeth of a transfer tripping pawl 440 loose on a rod 441 supported in the rockable frame 360 for the #3 multiplicand storage device. The pawl 440 has a bent-over ear 442 adapted to cooperate with the nose of a transfer lever 443 loose on a rod 444, supported by a series of plates 445, one for each denominational order except the lowest order. The plates 445 are assembled in an integral unit shiftably mounted on stationary rods 446 and 447 extending between the frames 124 and 125 for a purpose later to be described. The transfer lever 443 has a hook-shaped nose adapted to cooperate with a restoring bar 448 extending between righthand and lefthand symmetrical arms supported on pivots in the frames 124 and 125, said pivots being in axial alinement with the rod 444. The transfer lever 443 has therein a camming slot 449 adapted to cooperate with a stud 455 in a transfer gear segment 456 adapted to mesh with the teeth of the wheel 359 for the next higher denomination. A spring 457 urges the pawl 440 clockwise to normally maintain said pawl in contact with a collar on a rod 458 extending between the arms of the rockable frame 360.

The left arm of the restoring bar 448 (Fig. 49) has secured thereto a plate 459 to which is pivoted a restoring link 460 the hook shaped forward end of which is spring-urged into communication with a stud 461 in an arm 462 secured to the shaft 364, which, it will be recalled by referring to Fig. 65, is rocked back and forth by the rods 308, 309 and 310, according to the type of operation being performed, to engage the wheels of the #3 multiplicand storage device with the actuators 100 or 101.

In adding operations, after the racks 100 and 101 (Fig. 31) have completed their initial movement rearwardly, the shaft 364 is rocked counterclockwise as viewed in Fig. 31, to disengage the wheels 359 of the #3 multiplicand storage device from the segments 456 and to engage said wheels with said actuators 100 or 101. This movement of the shaft 364, which is clockwise, as observed in Fig. 49, is imparted to the arm 462, which by means of the stud 461 moves the link 460 forwardly to rock the plate 459 and the restoring bar 448 clockwise as viewed in Fig. 49, and counterclockwise as viewed in Fig. 31, to restore all the levers 443 and their associated segments 456, which were tripped in the previous operation, to untripped positions as here shown. After the lever 443 (Fig. 31) is restored, the spring 457 returns the pawl 440 clockwise to cause the bent-over ear 442 thereof to move in the path of the nose of said lever 443 to retain said lever in untripped position.

It will be noted by referring to Fig. 49 that when the arm 462 moves initially, a stud 463 therein moves away from a tail 464 of a pawl 465, allowing said pawl to be spring urged counterclockwise so that a hook 467 thereof moves in the path of a stud 468 in the plate 459. The arm 462 has more movement than is necessary to restore the transfer mechanism. Consequently, when said mechanism is restored, a tail 469 of the link 460 engages the stud 466 to disengage said link from the stud 461. The restoring bar 448 is then spring-returned a slight distance counterclockwise until the stud 468 engages the hook 467. This retains the restoring bar 448 in an intermediate position as indicated by dot and dash lines in Fig. 31. Immediately thereafter, the racks 100 and 101 start their return movement forwardly to actuate the wheels of the #3 multiplicand storage device. When the wheels 359 of the storage device are rotated from nine to zero, one of the teeth on the tripping plate 439 (Fig. 31) engages the tooth of the tripping pawl 440 and rocks said pawl counterclockwise to free the tripping lever 443 to the action of its spring, which rocks said lever a slight distance clockwise until the hook-shaped downward etxension thereof contacts the restoring bar 448. This slight movement of the cam arm 443 is sufficient to move the nose thereof under the ear 442 to retain the pawl 440 in tripped position.

After the actuator racks complete their return movement forwardly and the wheels 359 of the #3 multiplicand storage device have been disengaged therefrom and reengaged with their respective transfer segments 456, the arm 462 (Fig. 49) near the completion of its return movement counter clockwise causes the stud 463 carried thereby to engage the tail 464 to rock the pawl 465 clockwise to disengage the hook 467 thereof from the stud 468. The restoring bar 448 is immediately spring-returned to normal position as here shown, allowing the transfer levers 443 (Fig. 31) under tension of their respective springs to move in unison therewith, which, by means of the cam slot 449 therein in cooperation with the stud 455, imparts sufficient movement to the segment 456 to advance the next higher order wheel one step of movement in order to effect a transfer. The segments 456 in addition to carrying amounts from lower to higher denominations also provide means for retaining the wheels 359 of the #3 multiplicand storage device in alinement when they are disengaged from the actuators 100 or 101.

In total and sub-total taking operations the wheels of the storage device are engaged with the actuator racks 100 or 101 prior to their initial movement rearwardly and as it is the engaging mechanism that operates the restoring bar 448, it is therefore evident that the transfer mechanism will be restored to untripped position prior to initial movement of the racks 100 and 101. This moves the teeth of the tripping pawl 440 (Fig. 31) into the path of the teeth of the tripping cam 439. In total and sub-total taking operations, rearward movement of the actuator rack rotates the wheels of the #3 multiplicand storage device reversely until one of the diametrically opposed teeth of the tripping cams 439 comes in contact with the teeth of the tripping pawls 440 to locate said wheels in zero positions. Reverse rotation of the wheels in turn differentially positions the actuator racks commensurate with the amount on said wheels. In a total taking operation, the wheels of the #3 multiplicand storage device are disengaged from the actuators before said actuators start their return movements, thus said wheels are left in zero positions. In sub-total operations the wheels of the #3 multiplicand storage device remain engaged with the racks during their return movements and are returned by said racks to their original positions.

The transfer or carrying mechanism for the add product accumulator 104 (Fig. 31) is substantially the same as that for the #3 multiplicand storage device, and as it works in exactly the same manner it is felt that a description of this mechanism is unnecessary.

The transfer or carrying mechanism for the add-subtract product accumulator 103 (Fig. 31) is substantially the same as that of the #3 multiplicand storage device with the exception that this carrying mechanism is also adapted to transfer negative amounts. The part of the transfer mechanism for the add-subtract product accumulator 103 that varies from the transfer mechanism of the #3 multiplicand storage device and that has a particular bearing upon this invention, will be described later in this specification in connection with the controlling mechanism for the add-subtract product accumulator.

*Multiplier storage mechanism*

It will be recalled that prior to the third or H cycle of a multiplying operation, the amount of the multiplier is set up on the keyboard. By consulting Fig. 6 it will be seen that, as in the H cycle of a multiplying operation, the main actuator racks 100 and the auxiliary actuator racks 101 are not coupled together. It is therefore possible to use the main actuators for entering the multiplier in the multiplier storage segments 105 (Fig. 31) while the auxiliary racks 101 are being used to clear the add product accumulators 104 and add the amount therein in the #2 and #3 multiplicand storage devices.

The multiplier segments 105 (Figs. 31, 61, 67 and 69) are loosely mounted on a rod 471 supported in a rockable and shiftable frame composed of a right arm 472 and a left arm 473 and a series of spacing plates 474 connected at their forward ends by a cross bar 475 and near their rearward ends by a rod 476. The symmetrical arms 472 and 473 are loosely mounted on a shaft 477 journaled in the plates 376 and 377 of the carriage 106. Mounted on each end of the rod 471 is a roller 478 which extends within identical cam slots 479 in symmetrical cam plates 480 secured on a shaft 481 journaled in the plates 376 and 377 of the carriage 106. Secured on the righthand end of the shaft 481 are symmetrical arms 482 connected by a cross rod 483, which cooperates with the bifurcated upper end of a bell crank 484 (see also Fig. 47) loose on a stud 485 in the frame 124. The bell crank 484 is pivotally connected by a link 486 (see also Fig. 61) to a crank 487 secured to the shaft 406. Also secured to the shaft 406 is an arm 488 to which is connected the forward end of an engaging link 489 similar to the link 272 (Fig. 62). A pitman 490 connects the link 489 to a selector segment 491 loose on the shaft 277 and adapted to be controlled by its associated selector arm 492 also loose on the shaft 277. The selector arm 492 has a nose which cooperates with the periphery of a selector disk 493 to control the positioning of the segment 491, which in turn positions the link 489 relative to the engaging rod 310 so that the multiplier segments 105 will be engaged with and disengaged from the actuators 100 at the proper time.

It will be noted by referring to Fig. 61 and to space 4 of the chart (Fig. 28) that in the second or G cycle of a multiplying operation, the disk 493, in cooperation with the selector arm 492 and associated mechanism, causes the link 489 to be shifted full distance upwardly so that it is controlled or operated solely by the total engaging and disengaging rod 310, the time of operation of which is given in space III (Fig. 26). It is therefore evident that the multiplier segments 105 are engaged with the actuators 100 in the third or H cycle of a multiplying operation prior to the initial movement rearwardly of said actuator racks and that initial movement of said racks differentially adjusts the segments 105 commensurate with the value of the multiplier set up on the keyboard of the accounting machine. Prior to the return movement forwardly of the actuators 100, the segments 105 are disengaged therefrom and reengaged with an aliner 494 (Figs. 31 and 43) which cooperates with internal teeth in a curved plate 495, one of which is secured to each segment 105. The aliner 494 is mechanically connected to aliners 496, 497 and 498, adapted to aline respectively the wheels of the #1, #2 and #10 multiplicand storage devices when they are out of engagement with the actuator racks 100 and 101.

Entering the multiplier in the segments 105 during the initial movement of the actuators 100 permits the multiplier interpreting mechanism to interpret the units multiplier digit in the same cycle (H) that the multiplier was entered in the segments 105.

Inasmuch as when the wheels of the #1, #2 and #10 multiplicand storage devices and the multiplier segments 105 are reset to zero they are out of engagement with the racks 100 and 101 and in engagement with their aliners, it is necessary to move their respective aliners to ineffective positions while said storage devices and the multiplier segments are being reset. However, the resetting of these storage devices and multiplier segments does not take place until after the actual multiplying is completed, and for that reason the mechanism that operates the aliner 494 will not be explained until later on in this specification. Nevertheless it is well to remember that these aliners when stationary serve to aline the multiplier segments and the wheels of the multiplicand storage devices when they are out of engagement with the actuators 100 and 101.

*Mechanism to position the control disk shaft*

The positioning of the control disk shaft 284 (Fig. 78) is accomplished in the preliminary and final cycles A, B, C, D, E, F and G by means of an auxiliary slide 499 (Figs. 76 and 77). The slide 499 is mounted for horizontal reciprocating movement by means of parallel slots in said slide cooperating with annular grooves in collars carried by the shaft 243 and a shaft 506 journaled in the frames 124 and 125. An escapement mechanism allows a progressive step by step movement of the slide 499 from right to left as viewed in Fig. 76 to position the disk shaft 284 in a manner to be described later.

After the condition set up in cycle G has been performed in the cycle H or third cycle, as shown in Fig. 27, and before the control by the disks in H position becomes effective, the control of the shaft 284 is transferred from the auxiliary slide 499 to the main slide 507, which immediately positions the shaft 284 in accordance with the digit value of the lowest order of the multiplier. Thus the condition set up in the third cycle to control the operation of the fourth cycle is in accordance with the value of the units digit of the multiplier and not the condition corresponding to the position H of the shaft. See points IV, V, and VI in the third cycle on the chart, Fig. 27. During the successive multiplying cycles, the main slide 507 positions the control shaft 284 in accordance with the various digit values of the multiplier. See points VI to XIV in the fourth to eighth cycles on the chart, Fig. 27. In the last multiplying cycle, the main slide 507 is returned to starting position and sets the shaft 284 to the H cycle controlling position to set up a condition for the A cycle, and restores the positioning of the control shaft to the auxiliary slide 499. See points XVI in the eighth and ninth cycles on the chart, Fig. 27.

The means which control the operation of the main slide 507 and the manner in which this slide controls the positioning of the control disk shaft 284 will now be described.

The slide 507 has secured thereto a gear rack 508 which meshes with a partial gear 509 secured to a gear segment 510 loose on the shaft 243. The segment 510 meshes with a partial gear 511 secured to a sleeve 512 (see also Figs. 77 and 78) loose on a stud 513 secured in the right frame 124. Secured on the sleeve 512 is a gear 514 which meshes with a segment 515 secured to a short shaft 516 journaled in the frame 124. A segment 517 is also secured to the shaft 516 and meshes with a gear 518 secured to the righthand end of the control disk shaft 284. Pivoted to an extension 519 of the slide 507 is an interpreting pawl 520 (Fig. 75), the rearwardly disposed end of which is adapted to cooperate with the studs 113 in the multiplier segments 105. A spring 522 urges the pawl 520 clockwise to maintain a stud 523 in a tail thereof in communication with a bent-ove edge 524 of a pitman 525 (Figs. 75 and 81) bifurcated to fit a grooved collar on the shaft 243. A downward extension of the pitman 525 is pivotally connected to one arm of a yoke 527 loose on the shaft 241. Another arm of the yoke 527 carries a pair of rollers 528 adapted to cooperate with the peripheries of companion plate cams 529 and 530 secured to the cam shaft 291.

Companion plate cams 531 and 532 (Figs. 80 and 82) secured on the shaft 291 are adapted to cooperate with a pair of rollers 533 on a cam lever 534 loose on the shaft 241. An upward extension of the lever 534 has connected thereto a link 535 with a stud 536 which fits loosely in a horizontal slot 537 in a pitman 538. The pitman 538 is bifurcated to cooperate with a grooved collar on the shaft 243 and the downwardly extending end of said pitman is pivotally connected to a selector segment 539 loose on the shaft 277 and flexibly connected to a selector arm 540 also loose on the shaft 277. A nose of the selector arm 540 cooperates with the periphery of a mutilated selector disk 541 secured to the shaft 284.

In cycle G (Figs. 80 and 81 and space 23 Fig. 28) the disk 541 positions the selector arm 540 and the segment 539 to lower the pitman 538 so that the stud 536 is in the path of a step 542 on the upper edge of the main slide 507. It will be noted that the radius of the disk 541 between the points H and A is uniform and retains the pitman 538 in its downward position during the actual multiplying cycles. Clockwise movement of the shaft 291 and the cams 531 and 532 rocks the lever 534 (space IX Fig. 26) first counterclockwise to cause the stud 536 in cooperation with the step 542 to move the main slide 507 forwardly or toward the left, as here viewed, against the tension of a spring 543, tensioned between upward extensions of said main slide 507 and the auxiliary slide 499.

After the slide 507 reaches the end of its forward movement, the cams 529 and 530 (Fig. 81 and space X Fig. 26) rock the yoke 527 clockwise to raise the pitman 525 to allow the spring 522 to urge the pawl 520 clockwise so that the rearward end thereof is in the path of the studs 113 in the segments 105. The cams 531 and 532 (Fig. 80) then return the lever 534 clockwise. The spring 543 urges the slide 507 to move in unison with the lever 534 until such movement of said slide 507 is terminated by the pawl 520 engaging the stud 113 in the units multiplier segment 105. The above positioning of the slide 507 is transmitted by means of the gearing illustrated in Figs. 75 and 78 to the control disk shaft 284. This positioning of the shaft 284 and the control disks assembled thereon selects the multiplicand storage device or devices containing the multiple of the multiplier, corresponding to the position of the units segment 105, for engagement with the racks 100 and 101 in sub-total time. The control disks also select one or both of the product accumulators for engagement with the actuators and determine the time of engagement of said product accumulators.

Prior to the return movement forwardly of the slide 507, the cams 529 and 530 (Fig. 81) lower the pitman 525 to rock the pawl 520 counterclockwise out of the path of the studs 113 so that said pawl 520 will not stumble on the stud 113 of the next higher order denominational segment 105 during return movement of the slide, and to permit lateral shifting of the carriage 106.

*Mechanism to shift the multiplier segments*

It will be recalled that the multiplier segments 105 (Fig. 31) and the product accumulators 103 and 104 are mounted in the shiftable carriage 106. This is necessary in order to bring the different denominational segments 105 into alinement with the pawl 520 and to shift the product accumulators in relation to the actuators 100 and 101, one denomination at a time, as multiplying progresses. Inasmuch as the pawl 520 feels for the stud 113 in the units segment 105 in the cycle preceding the actual multiplication by the digit in that particular denomination, it is necessary to shift the multiplier segments 105 independently of the carriage 106 during the multiplication by the units order digit so that the control by the tens order digit may be set up during this operation. Thereafter the multiplier segments shift in unison with the product accumulators and the carriage 106. The mechanism for shifting the multiplier segments will now be described.

Referring to Figs. 69, 72 and 74, bars 544 and 550, which are represented diagrammatically by the bar 107 (Figs. 21 to 25A), are mounted for transverse reciprocating movement on the frames 124 and 125 by means of studs 545, 546, 547 and 548, in cooperation with horizontal slots in said bars. The studs 545 and 546 are secured respectively in the top edge of the frames 124 and 125 and the studs 547 and 548 are secured respectively in the lower edge of said frames 124 and 125. The bars 544 and 550 are connected for like reciprocating movement by a beam 549 pivoted on a pin 554 loose in a hole in a stud 555 in the frame 125. The bar 544 carries a by-pass pawl 556, urged by a spring 557 into the path of a stop arm 558 turnably mounted on a shaft 559 journaled in the left multiplying frame 125. The arm 558 is slotted to receive a stud 560 in a link 561 (see also Figs. 31 and 32) the forward end of which is connected to a selector arm segment 562 loose on the shaft 277 and flexibly connected to a selector arm 563 also loose on the shaft 277. A nose of the arm 563 cooperates with the periphery of a control disk 564 secured to the shaft 284. The stud 560 is arranged to be engaged with a notch 565 in an arm 566 secured to the shaft 559. Also secured to the shaft 559 (Figs. 46 and 47) is forked arm 567 which straddles the sub-total disengaging rod 309. A projection 569 of the bar 550 (Figs. 69 and 74) cooperates with an upward extension 570 on a yoke which forms part of the rockable and slidable frame 472 for the multiplier segments 105.

During the preliminary and final or non-multiplying cycles, the arm 558 in cooperation with the pawl 556 retains the bars 544 and 550 in their normal positions, as shown in Fig. 74, against the tension of a spring 571 which urges the bar 550 toward the right. This causes the projection 569 in cooperation with the extension 570 on the frame 472 of the multiplier segment support to maintain the frame 472 in its lefthand position, as shown in Fig. 69, against the tension of a compression spring 572 which is adapted to shift said frame 472 toward the right.

In the first actual multiplying cycle after the pawl 520 (Figs. 31 and 69) has interpreted the position of the stud 113 in the units segment 105, the disk 564 (Fig. 32 and space 19 Fig 28) permits the selector arm 563 and the segment 562 to be moved a slight distance counterclockwise by a spring 573. This by means of the link 561 shifts the stud 560 into the notch 565 in the arm 566. Subsequent movement of the rod 309 towards the rear, or right (Figs. 46 and 47) rocks the arm 567, the shaft 559 and the arm 566 clockwise. Due to the engagement of the stud 560 with the notch in the arm 566, clockwise movement of said arm is imparted to the stop arm 558 to rock said arm out of the path of the by-pass pawl 556. This permits the spring 571 to urge the bar 550 toward the right, thus removing the restraint from the frame 472 (Fig. 69) which is then shifted toward the right by the spring 572, so that the stud 113 in the tens denomination segment 105 is in alinement with the pawl 520.

*Multiplier digit sensing mechanism and carriage escapement mechanism*

The companion bars 544 and 550 also control the number of multiplying cycles to be performed by the machine by determining the number of digits in the multiplier and controlling an escapement mechanism that governs the lateral shifting from left to right of the product accumulator carriage 106. It should be remembered that after the preliminary shifting described above, the frame 472 (Fig. 69) shifts in unison with the carriage 106. The bar 550 (Figs. 72 and 74) has a downward extension 574, represented by the extension 108 on the bar 107 (Figs. 21 to 25A), which registers with the notches 109 in the multiplier segments 105 when said segments are in zero positions, as shown in Fig. 72. The bar 544 has a shoulder 576 represented by the shoulder 114 on the bar 107 which cooperates with a lug 577 of the escapement control plate 115, shiftably supported by means of parallel slots therein in cooperation with two studs 578 secured in the frame 124. Pivoted at 579 to the plate 115 is a lever 580 pivotally connected by a link 581 to a lever 582 fulcrumed on the shaft 241. Y-shaped extensions of the lever 582 carry rollers 583 and 584 which cooperate respectively with the peripheries of companion plate cams 585 and 586 secured to the cam shaft 291.

The lower end of the lever 580 has pivotally connected thereto a plunger 587 (Figs. 72, 73 and 74) the rearward end of which terminates in a tenon 588 which extends within a hole in an escapement operating lever 589 pivoted on a stud 590 secured in the transverse rail 383 which forms the lower stationary raceway for the carriage 106 (Fig. 72). Also pivoted on the stud 590 (Figs. 72 and 73) is an escapement pawl 591 urged counterclockwise by a torsion spring 600 into communication with the teeth of a ratchet 592 secured to the lower end of a vertical shaft 593 journaled in a bracket 594 secured to the frame 124. Secured to the upper end of the shaft 593 is a gear segment 595 which meshes with a rack 596 formed by a projection of the rail 379 of the traveling carriage 106. A spring 597 (Fig. 73) tensioned between the shaft 559 and the lever 589 urges said lever counterclockwise to maintain the escapement pawl 591 normally in engagement with the teeth of the ratchet 592. An escapement stop pawl 598 pivoted on the lever 589 is arranged to engage the ratchet 592 and in cooperation with the pawl 591 and said ratchet 592 allows the carriage 106 under the action of a spring 599 (Figs. 67 and 73) to shift step by step from left to right when the lever 589 is oscillated in a manner presently to be described. A stud 605 in the lever 589 in cooperation with a recess in the pawl 598 limits the movement of said jawl independently of the lever 589.

Directing attention to Figs. 21 to 25A, 31, 69 and 74, when the arm 558 releases the companion bars 544 and 550 to the action of the spring 571, as explained above, the projection 574 feels for the notches 109 in the segments 105, beginning with the highest denomination, or lefthand segment. The highest denomination segment 105 that is out of zero position, due to the notch 109 therein being out of register with the projection 574, stops the progress of the bars 544 and 550 and positions the shoulder 576 on the bar 544 relatively to the lug 577 on the plate 115. Near the beginning of each cycle of operation the cams 585 and 586 (Fig. 72) rock the lever 582 first clockwise and then immediately back to normal position as here shown. This by means of the link 581 rocks the lever 580 first counterclockwise and then back to normal position. When the bars 544 and 550 are in starting position as shown in Fig. 74 the shoulder 576 is to the right of the lug 577 on the plate 115. In this case the spring 597 (Fig. 73) restrains movement of the escapement plunger 587, and as a result, the lever 580 fulcrums where it is connected to said plunger 587 and shifts the plate 115 first forwardly then back to normal position as here shown. It is therefore obvious that the carriage escapement mechanism does not function as long as the companion bars 544 and 550 are in starting position as shown in Fig. 74 (see also Fig. 21).

The number of steps the carriage shifts from left to right depends upon the number of digits in the multiplier and this is determined by the position of the plate 115 in relation to the shoulder 576 (Figs. 21 and 74). The shoulder 576 is of proper length to permit a maximum shift of four steps, and if there are five digits in the multiplier four steps are required in order to bring each of the multiplier segments 105 into cooperative alinement with the pawl 520 so that the proper multiplicand storage devices will be selected and so that the wheels of the product accumulators 103 and 104 (Fig. 68) will be shifted toward the right in relation to the actuators 100 and 101 as multiplication progresses. A fixed aliner 606 (Fig. 68) secured to the bar 217 cooperates with the lower denomination wheels of the product accumulators 103 and 104 when they are shifted out of alinement with the actuators 100 and 101 to retain said wheels against movement when they are rocked out of engagement with their respective transfer segments.

As an illustration, if there are two digits in the multiplier, the lug 574 will contact the tens segment 105 to stop movement of the bars 544 and 550. This positions the shoulder 576 (Fig. 74) with respect to the lug 577 so that the carriage 106 will shift one step. (See also Figs. 24, 25 and 25A.) By referring to sections XIV and XX of the time chart (Fig. 26) it will be seen that the carriage escapement operates prior to the time that the control bars 544 and 550 are released, so that its first operation is an idle operation. The releasing of the bars 544 and 550 during the first multiplying operation, it is recalled, allows the frame supporting the multiplier segments 105 (Fig. 69) to shift independently of the carriage 106. However, in the next cycle of operation the shoulder 576 in cooperation with the lug 577 (Fig. 74) prevents shifting of the plate 115 when the cams 585 and 586 (Fig. 72) function and consequently the lever 580 will be rocked clockwise on its pivot 579 of the plate 115 to force the escapement plunger 587 (see also Fig. 73) rearwardly to cause the escapement mechanism to function to shift the carriage one step toward the right. The control bars 550 and 544, under the action of their spring 571, shift in unison with the carriage to move the shoulder 576 out of the path of the lug 577, thereby disabling the escapement mechanism in the manner explained above.

As previously brought out in the general description of this specification, the bar 550 carries a stud 110 embraced by the end of the pawl 111 pivoted at 112 to the machine base 118 (Fig. 31). The forwardly disposed end of the pawl 111 is adapted to cooperate with an upward extension 607 of the pawl 520 (Figs. 69 and 75). After the carriage 106 shifts the last time in a multiplying operation the slide 550 is in its extreme right-hand position which moves the forward end of the pawl 111 in to the path of the extension 607. The pawl 111 in cooperation with the extension 607 rocks the pawl 520 out of the path of the studs 113 in the segments 105, upon rearward movement of the slide 507, and permits said slide to return full distance rearwardly to its neutral position H as shown in Fig. 75. This returns the control disks to H position, disengages the segment 510 from the gear 511 and shifts the control of the positioning of the control disks to the auxiliary slide 499 by reengaging a gear 620 and a segment 618 (Figs. 76 to 78) in a manner presently to be described.

It will be recalled that the slide 499 is controlled by an escapement mechanism which allows a step by step progressive movement of said slide and the control disk shaft 284. By referring to the control disk chart (Fig. 28) it will be recalled that the conditions set up in cycle G are performed in cycle H. Also in cycle H the positioning of the control disks is shifted from the auxiliary slide to the main slide and the units multiplier digit is interpreted and the control disks positioned accordingly after which the machine goes into the actual multiplying cycles. It will be noted that the control disks do not set up the condition corresponding to position H on said disks but go immediately into multiplying and set up the condition corresponding to the position H only after multiplication is completed, as explained above. In the last actual multiplying cycle the positioning of the disks is shifted from the main slide back to the auxiliary slide 499 and the disks are returned to position H to set up the conditions for the first final cycle A.

*Return of auxiliary control slide to starting position*

By observing Fig. 82 it will be seen that when the control disk shaft 284 is returned to H position in the manner explained above, a deep notch designated H in the disk 541 will be opposite the nose of the selector arm 540. It is therefore obvious that the selector arm 540 will move the selector arm segment 539 counterclockwise to its lowest position and that said segment will be retained in that position by the aliner 332 during the greater part of the following cycle A. Counterclockwise movement of the segment 539 lowers a pitman 608 connected to said segment, and slotted to embrace an annular groove in a collar on the shaft 243. Downward movement of the pitman 608 by means of a horizontal slot 609 in the upper end thereof moves a stud 610 in an arm 611 pivoted at 612 to a cam lever 613, into the path of a step 616 in the slide 499. The lever 613 is pivoted on a stud 614 in the frame 124 and has a stud 615 in a rearward extension thereof, which is embraced by a slot in an extension of the lever 534. Initial movement of the cams 531 and 532 (space IX, Fig. 26) causes the lever 534 to rock the lever 613 clockwise to shift the arm 611 rearwardly to cause the stud 610 in cooperation with the step 616 to return the auxiliary slide rearwardly or toward the right as viewed in Fig. 82, to starting position.

Return movement of the auxiliary slide 499 by means of a rack 617 (Fig. 76) secured thereon, rotates the segment 618 and a partial gear 619, integral with said segment, counterclockwise. This causes the gear 619 to engage the gear 620, secured to the sleeve 512, and rotates said gear 620 and the sleeve clockwise. Clockwise movement of the sleeve 512 by means of the pinion 514 (Figs. 77 and 78) rotates the segments 515 and 517 counterclockwise and the pinion 518 and the control disk shaft 284 clockwise to the position corresponding to cycle A.

It should be noted that the partial gears 510, 511, 619, and 620 have portions of their circumferences without teeth. These disk-like portions are so arranged that when the partial gears 510, 511 are operating the sleeve 512, the disklike portion of partial gear 620 is opposite the disk-like portion of the partial gear 619, and the movement of the sleeve 512 is not transferred to the auxiliary slide 499. In a like manner, the movements imparted to the sleeve 512 by the auxiliary slide 499 are not transferred to the main slide 507.

Return movement toward the right of the slide 499 also causes a rack 621 (Fig. 76) thereon to rotate a segment 622 and an add ratchet 623 and a subtract ratchet 624 counterclockwise. The segment 622 and the ratchets 623 and 624 are secured together in an integral unit and are rotatably supported by the shaft 506. The ratchets 623 and 624, in cooperation with their respective escapement pawls 625 and 626, retain the slide 499 in its righthand position when the arm 611 (Fig. 82) is returned forwardly by the cams 531 and 532. The ratchets 623 and 624 are a part of an escapement mechanism that controls the lefthand movement of the auxiliary slide 499, which movement positions the control disk shaft 284 during the preliminary and final cycles of a multiplying operation. The escapement pawls 625 and 626 are pivotally mounted on a stud 627 secured in the frame 124. A pair of torsion springs 628 urge the pawls 625 and 626 counterclockwise into communication with their respective ratchets 623 and 624.

*Escapement mechanism for auxiliary slide*

At the beginning of a multiplying operation, the ratchet 623 (Figs. 76 and 79) controls the positioning of the auxiliary slide 499. After multiplying is complete and the machine comes to rest at the end of cycle A, if the product is to be added in the accounting machine totalizers, the machine is again placed in operation by depressing the starting bar 132. In this case the ratchet 623, in cooperation with its escapement pawl 625, continues to position the slide 499 and it is evident by observing Fig. 79 that the final cycles will be A, B, C. It will be noted that the add ratchet 623 has no teeth opposite the positions D and E;

consequently said ratchet 623, the slide 499 and the control shaft 284 skip these two positions and move directly to position F, in preparation for the succeeding multiplying operation.

After the machine comes to rest at the end of cycle A, if the product is to be added negatively (subtracted) in the accounting machine accumulators, depressing the subtract product key 130 in a manner presently to be described, disengages the escapement pawl 625 from the ratchet 623 and engages the escapement pawl 626 with the subtract ratchet 624. This shifts the control of the positioning of the auxiliary slide 499 to the subtract ratchet 624 (see also Fig. 39) and it is therefore apparent that in this case the final cycles will be A, B, D and E, due to the fact that the ratchet 624 has no tooth opposite position C. When the subtract product key 130 is released automatically at the end of a multiplying operation, the control is shifted from the subtract ratchet 624 back to the add ratchet 623.

During cycles A, B, C, D, E and F (Figs. 80 and 82) the disk 541 in cooperation with its selector mechanism retains the pitmans 538 and 608 in intermediate positions as here shown. The pitmans 538 and 608 likewise retain the studs 536 and 610 and their respective arms 535 and 611 also in intermediate positions, so that said studs 536 and 610 are out of the paths of the steps 542 and 616 in the slides 507 and 499. It is therefore evident that in these cycles of a multiplying operation, after the auxiliary slide 499 has been returned toward the right to starting position the studs 536 and 610 reciprocate idly in the horizontal slots in their respective pitmans 538 and 608.

When the arm 611 is in intermediate position, as shown in Fig. 82, an ear 629 thereof is in alinement with a stud 630 in a crank 652 secured to a lever 632 loose on the shaft 506; consequently initial movement clockwise of the lever 613 causes the ear 629 to engage the stud 630 to impart clockwise movement to the lever 632, which movement by means of a plunger 631 is transmitted to an escapement lever 633 loose on the stud 627. Clockwise movement of the lever 633 disengages the tooth of the escapement pawl 625 or 626 (see also Fig. 76), whichever happens to be in control at this particular time, from the teeth of its associated ratchet 623 or 624. This permits the slide 499 to be urged a slight distance forwardly or toward the left, by the spring 543 until an escapement stop pawl 634 carried by the lever 633 engages one of the teeth in the ratchet 623 or 624. Return movement counterclockwise of the lever 613 allows the lever 633 to be spring-returned counterclockwise in unison therewith to disengage the stop pawl 634 from the ratchet 623 or 624 and to move the effective pawl 625 or 626 back into the path of its associated ratchet 623 or 624. This permits the auxiliary slide 499 to complete its step of movement forwardly, which movement by means of the gearing shown in Figs. 76, 77 and 78, is transmitted to the control disk shaft 284. The escapement mechanism continues to function in this manner during the preliminary and final cycles A, B, C, D, E and F of a multiplying operation.

Control of the positioning of the disk shaft 284 is transferred from the auxiliary slide 499 to the main slide 507 in the following manner.

During cycle G, the disk 541 (Figs. 80 and 82) in cooperation with its selector arm 540, positions the segment 539 full distance clockwise to lower the pitman 538 to engage the stud 536 with the step 542 so that the main slide 507 will be moved forwardly to starting position in the succeeding cycle in the manner explained above. Clockwise movement of the segment 539 raises the pitman 608 to impart counterclockwise movement to the arm 611 to rock the ear 629 out of the path of the stud 630 to disable the escapement mechanism.

In order to insure that the slide 499 is in its extreme forward or lefthand position before the main slide 507 is returned to starting position, as a safety precaution mechanism shown in Figs. 76 and 83 is provided to operate the escapement mechanism just prior to the movement of the slide 507 by the cams 531 and 532. Clockwise movement of the segment 539 during the latter part of cycle G, and consequent upward movement of the pitman 608 causes a stud 653 in said pitman, in cooperation with a rearward extension of a bell crank 654 loose on the stud 614, to rock said bell crank counterclockwise as viewed in Fig. 83. A forked upward extension of the bell crank 654 engages a stud 655 in the upper end of a link 656, the lower end of which is connected to a crank 667 secured on the aliner shaft 336. Consequently counterclockwise movement of the bell crank 654 shifts the stud 655 forwardly over a rearward extension of the lever 632.

Clockwise movement of the shaft 336 disengages the aliner 332 from the segment 539 in the latter part of cycle G and raises the link 656 to move the stud 655 above the lever 632. This prevents said stud 655 from stumbling upon the end of said lever 632 when the pitman 608 moves upwardly upon disengagement of the aliner 332 from the segment 539. Counterclockwise movement of the shaft 336, at the beginning of the succeeding cycle, to reengage the aliner 332 with the selector arm segment 539 shifts the link 656 downwardly, which by means of the stud 655 imparts clockwise movement to the lever 632 to operate the escapement mechanism prior to the forward movement of the main slide 507 (see space IX Fig. 26). It will be noted that the link 656 operates the escapement mechanism at the beginning of each multiplying cycle, thus insuring that the auxiliary slide 499 is in its extreme forward position when the control is shifted from said slide to the main slide 507 and likewise insuring that said slide 499 is in its extreme forward position in the last actual multiplying cycle when the control of the positioning of the disk shaft 284 is shifted from the slide 507 back to the slide 499.

*Mechanism to return the product accumulator carriage*

Mechanism rendered effective in position H of the control disks restores the carriage 106 (Fig. 69) toward the left to starting position during cycle A, which it will be recalled is the last automatic cycle before the machine comes to rest after multiplication is complete. Mechanism for returning the carriage comprises a spiral cam 635 (Figs. 47, 69, 72 and 73) secured to the right end plate 376 of the carriage 106. The camming edge of the cam 635 is arranged to cooperate with a roller 636 mounted on a yoke 637 pivoted on a stud 638 secured in the right frame 124. The yoke 637 (Fig. 47) has a downwardly extending arm to which is pivoted a pitman 639 connected by a link 640 to a selector arm segment 641 loose on the shaft 277. The segment 641 is flexibly connected to a selector arm 642, a forwardly disposed nose of which cooperates with the periphery of a control disk 643 secured to the shaft 284. The forward end of the pitman 639 has a slot 644 arranged to receive a stud 645 in an arm 646 secured to a hub 67 loose on a stud 648 in the frame 124. Also secured to the hub 647 is an L-shaped lever 649 with rollers 650 and 651 adapted to cooperate respectively with the peripheries of the companion cams 296 and 297. It will be remembered that the cams 296 and 297 are integral with the gear 295, which makes a counterclockwise revolution each operation of the machine.

In the last multiplying cycle the shaft 284 and the disk 643 are positioned to bring the high portion of said disk, represented by the letter H, opposite the end of the selector arm 642. This causes the selector arm segment 641 to be shifted clockwise during the last part of cycle H to lift the link 640 and the pitman 639 to move the notch 644 in said pitman into engagement with the stud 645. Rotation of the cams 296 and 297 in cycle A (Fig. 47) and space XIII Fig. 26 causes the arm 646 to oscillate first clockwise and then back to normal position and this oscillating movement is transmitted to the bell crank 637 by the pitman 639. Movement of the bell crank 637 (see also Figs. 67 and 69) causes the roller 636 in cooperation with the cam 635 to shift the carriage 106 to its extreme lefthand or starting position. The escapement mechanism illustrated in Fig. 73 retains the carriage in its lefthand or starting position until said escapement mechanism is operated during multiplication by the mechanism shown in Fig. 74 and explained earlier herein.

When the shaft 284 (Fig. 47) and the disk 643 are out of H position, the segment 641 is returned counterclockwise to normal position to disengage the notch 644 from the stud 645 and simultaneously lock a notch in the forward end of said pitman 639 over a stationary stud 657 in the frame 124. This retains the yoke 637 and the roller 636 in ineffective positions (as here shown) where there will be no possible interference between said roller and the cam 635.

*Mechanism to restore the carriage escapement control bars to starting position*

Mechanism illustrated in Figs. 41, 69, 72 and 74 is provided to restore the escapement control bars 544 and 550 to starting position during cycle A.

A bracket 658 secured between the side members of the beam 549 carries a roller 659 adapted to cooperate with the spiral camming edge of a cam 660 rotatably supported by the stud 555 secured in the left frame 125, which as previously explained, supports the pivot pin 554 (Fig. 74) for said beam 549. The cam 660 has secured thereto a segment 662 (Fig. 41) which meshes with teeth in a rearwardly disposed arm of a lever 663 loose on the shaft 313. A downward extension of the lever 663 is bifurcated to straddle a stud 664 in a link 665 the upper end of which is pivotally connected to a pitman 666 supported for vertical reciprocating movement on the rod 274. A link 668 connects the pitman 666 to a selector arm segment 669 loose on the shaft 277 and flexibly connected to its companion selector arm 670 also loose on the shaft 277. A nose of the arm 670 is adapted to cooperate with the periphery of a control disk 671 secured on the shaft 284.

In the last multiplying cycle the shaft 284 and the disk 671 are positioned so that a projection of said disk, indicated by the letter H, is opposite the nose of the arm 670. This rocks the segment 669 clockwise (Fig. 41) to lower the pitman 666 to engage the stud 664 with a notch 672 in the lever 326. Subsequent oscillating movement of the lever 326, timed according to column III Fig. 26, rocks the lever 663 first counterclockwise and the restoring cam 660 clockwise. Clockwise movement of the cam 660 (Figs. 69 and 74) imparts counterclockwise movement to the beam 549 to restore the bars 550 and 544 toward the left and right respectively to starting positions as here shown. The pawl 556 on the bar 544 bypasses the retaining arm 558 to retain the escapement control bars in their starting positions.

*Multiplying operation chart*

Fig. 27 shows graphically the movement of the slides 499 and 507 and the movement of the carriage 106 during a multiplying operation. This chart will be self-explanatory to one familiar with the mechanism thus far explained, therefore only a brief description thereof will be given.

This chart clearly illustrates the often mentioned fact that conditions are set up in one cycle and performed in the following cycle. The vertical spaces represent the setting up of the conditions and the horizontal spaces represent the performance of the conditions and the different steps of a multiplying operation are indicated by Roman numerals. Therefore it will be observed that the conditions for cycle F (step II) are set up in either of the final cycles C or E (step I and I'). The step by step movement of the auxiliary slide 499 is also apparent as the machine operates through the preliminary cycles F and G and the first part of cycle H (step IV). In cycle H the positioning of the control disks is shifted from the auxiliary slide 499 to the main slide 507 and said slide 507 is returned to starting position (step V). The movement back and forth of the slide 507 as it interprets each digit of the multiplier, which in this case is 72541, is shown graphically in steps VI to XIV.

The independent shifting of the multiplier segments 105 after the units multiplier digit has been interpreted, is indicated by a heavy angular black line in the first division of the horizontal column representing the fourth cycle of operation. The unitary movement of the multiplier segments 105 and the product accumulator carriage 106 is indicated by the heavy parallel angular line in cycles 5, 6, 7 and 8.

At the end of cycle 8 it will be noted that the main slide 507 goes to neutral position (XVI) to return the control disks to cycle H position, and surrenders the positioning of said control disk to the auxiliary slide 499. In cycle A the auxiliary slide 499 rotates the control disks to cycle A position (XVII) and the carriage return mechanism returns the product accumulator carriage 106 and the multiplier segments 105 to starting position. The machine comes to rest at the end of cycle A and the remaining final cycles may be either B and C or B, D and E, depending upon whether the product is added in the totalizers of the accounting machine or subtracted from said totalizers. The movement of the auxiliary slide 499 in the final cycles of a multiplying operation is continued from the righthand vertical column B to the lefthand vertical columns C, D and E, and is easily traced by following the Roman numerals and the connecting dot and dash lines.

*Mechanism to turn the wheels of the multiplicand storage devices and the multiplier segments to zero*

It will be recalled by observing Fig. 31 that the #10, #2 and #1 multiplicand storage devices do not require a transfer mechanism because there is never more than a single amount entered in said storage devices. It is therefore evident that the wheels of said storage devices never receive more than a half revolution and for that reason it is possible to use a positive stop to locate said wheels in zero positions and it is also possible to reset the wheels of said storage devices to zero positions simultaneously. The mechanism that resets the wheels of the #10, #2 and #1 multiplicand storage devices is also used to reset the multiplier segments 105 to their zero positions. The resetting of these three storage devices and the multiplier segments is conditioned in the last actual multiplying cycle and the resetting is completed in cycle A.

In order to keep from becoming confused it must be remembered that the condition set up in the preliminary cycle G is performed in cycle H and the machine immediately starts the actual multiplying cycles. In the final multiplying cycle the control disks are returned to H position to set up the condition for cycle A, which is performed automatically immediately thereafter and after which the machine comes to rest.

Still referring to Fig. 31, it will be remembered that the shaft 246 that supports the wheels 245 of the #10 multiplicand storage device and the shafts for the #2 and #1 storage devices have secured thereon a series of reset pawls 264, which in cooperation with studs 263 carried by each of the wheels, return said wheels to zero positions, which is determined by said studs 263 engaging the fixed stops 262 on the various sectional support plates 261 (Fig. 36) interspersed between the wheels of said storage devices. The shaft 246 (Figs. 41 and 42) for the #10 multiplicand storage device and the shafts for the #2 and #1 multiplicand storage device have tenons on their left ends which engage clutch cuts in three trunnions 604 journaled in a plate 673 secured in a recess in the left frame 125. Secured on the outer ends of the three trunnions 604 are segmental gears 674 which mesh with the teeth of a rack 675 mounted for horizontal reciprocating movement by means of parallel slots therein in cooperation with screw studs 676 fast in the frame 125. The teeth on the upper edge of the rack 675 mesh with a gear 677 loose on a stud 678 in the frame 125. The gear 677 meshes with a segment 679 secured to a trunnion 680 journaled in the frame 125. Also secured to the trunnion 680 (Fig. 69) is the left arm of a restoring bail 681 the right arm of which is turnably supported by a stud 682 in the frame 124.

The upper end of the pitman 666 (Fig. 41) has a horizontal slot 683 through which extends a stud 684 in a link 685 pivoted to a crank 686 secured to the carrying frame shaft 220. During the last actual multiplying cycle the control disk 671 causes the selector arm segment 669 to be moved to its clockwise position. This lowers the pitman 666 to engage the stud 684 with a notch 687 in the rack 675. Subsequent counterclockwise movement of the shaft 220 and the arm 686 causes the rack 675 to be shifted rearwardly to rotate the segments 674 and the shafts for the #10, #2 and #1 multiplicand storage devices clockwise to cause the reset pawls 264 in cooperation with the studs 263 to return the wheels of these multiplicand storage devices to zero positions, as shown in Fig. 31.

Rearward movement of the rack 675 (Fig. 41), by means of the gear 677, rotates the segment 679 and the bail 681 clockwise, causing said bail in cooperation with a raised surface 688 on the multiplier segments 105 (see also Figs. 67 and 69) to return said multiplier segments clockwise to home or zero positions as here shown. Return movement clockwise of the shaft 220 (see space I Fig. 26) returns the rack 675 and connected mechanism to normal position as shown in Fig. 41.

*Aliner operating mechanism for the #1, #2 and #10 multiplicand storage devices and the multiplier segments*

Before the #1, #2 and #10 multiplicand storage devices and the multiplier segments 105 can be reset to zero it is necessary to disengage their respective aliners therefrom. This is accomplished by means of mechanism shown chiefly in Fig. 43, and will now be described.

The aliners 496, 497 and 498 for the #1, #2 and #10 multiplicand storage devices (Fig. 43) each has two right-angled arms which fit loosely on its respective shaft 345, 349 or 271. Downward extensions of the left arm of the three aliners are connected by a link 689. The left arm of the aliner 498 has a camming slot 690 through which extends a stud 691 in a crank 692 loose on the shaft 406. The forward end of an engaging link 693 is pivoted to the crank 692 and the rearward end of said link has a notch adapted to cooperate with the total and subtract engaging and disengaging bar 310 (see also Fig. 45). The link 693 carries a stud 694 embraced by a horizontal slot in a pitman 695, the upper end of the pitman 695 being bifurcated to fit an annular groove in a bushing on the rod 275. The lower end of the pitman 695 is pivotally connected to a selector arm segment 696 loose on the shaft 277 and which is flexibly connected to a selector arm 697 also loose on said shaft 277. The selector arm 697 has a forwardly disposed nose adapted to cooperate with the periphery of a control disk 698 secured on the shaft 284.

A forward extension of the left arm of the aliner 496 is pivotally connected by a link 699 to the left arm of a yoke 705 loose on the shaft 241. A right arm of the yoke 705 is bifurcated to receive a stud 706 in a lever 707 loose on the shaft 481. The rearwardly disposed end of the lever 707 is slotted to embrace a rod 708 extending between symmetrical arms 709 secured on a shaft 710 journaled in the end plates 376 and 377 (Fig. 69) for the product accumulator carriage 106. The aliner 494 has symmetrical arms 711 which are secured to the shaft 710. The aliner 494 is adapted to cooperate with teeth in a segmental plate 495 one of which is secured to each of the multiplier segments 105. The aliner 494 has notches cut therein to clear the inner arcuate surface of the segments 105. The aliner 494 is assembled in the product accumulator carriage 106 and consequently shifts laterally in unison therewith, the rod 708 sliding in the slot in the lever 707.

During the last multiplying cycle the notch in the disk 698 is positioned opposite the nose of the selector arm 697 and immediately thereafter the aliner 332 is disengaged from the segment 696 to allow a spring 713 to urge the selector arm 697 and said segment 696 counterclockwise to shift the pitman 695 and the link 693 upwardly to engage the notch in the upper edge of said link 693 with the total and subtract engaging and disengaging bar 310. The bar 310 then shifts the link 693 rearwardly to impart counterclockwise movement to the crank 692 which in turn rocks the aliners 496, 497 and 498 and disengages them from the teeth of the wheels of the #1, #2, and #10 storage device. Clockwise disengaging movement of the aliner 496 by means of the link 699, the yoke 705 and the lever 707 disengages the aliner 494 from the teeth in the plate 495. After the aliners are thus disengaged, the mechanism shown in Fig. 41 and described above functions to return the multiplicand storage devices and the multiplier segments to zero, after which the rod 310 returns the link 693 forwardly to reengage the aliners with their respective wheels and segments. The timing of the arm 686 the rod 310 and the aliner 332 (Figs. 41 and 43) may be ascertained by consulting sections I, III and XII of the time chart (Fig. 26).

It should be here noted that the #3 multiplicand storage device is cleared by being operated in a total taking operation in cycle A. See Fig. 16.

*No. 10 multiplicand storage device lateral shifting mechanism*

It will be recalled that one times the multiplicand is entered in the No. 10 multiplicand storage device and that when this storage device is selected for a sub-total operation, it is shifted one step laterally to the next higher order, so that the amount therein is equivalent to ten times the multiplicand. The mechanism for shifting the #10 multiplicand storage device laterally will now be described.

It will be recalled that the #10 multiplicand storage device is supported in a rockable and shiftable frame composed of side members 247 and 248 (Figs. 31 and 36), the rod 260, the shaft 246, and various denominational separating plates 261. A yoke 714 (Figs. 31, 36, 51, 52 and 53) has upwardly extending arms 715 and 716 by means of which said yoke is slidably supported on the shaft 271. The upper ends of the arms 715 and 716 are bifurcated to fit loosely in annular grooves in collars secured on the shaft 246. The yoke 714 carries a roller 717 which cooperates with camming lugs 718 and 719 on shifting pitmans 720 and 721 the forward ends of which are connected respectively to cranks 722 and 723 loose on the shaft 406. The links 720 and 721 have respectively notches 724 and 725, the rearward edges of said notches being lower than the forward edges. The notches 724 and 725 are adapted to be engaged with a half-round rod 726 supported between two symmetrical arms 727 (Fig. 36), secured to the shaft 277.

The rearward end of the links 720 and 721 carry studs 728 and 729 which extend within horizontal slots in pitmans 730 and 731, the upper ends of which are bifurcated to fit annular grooves in bushings on the shaft 274. The lower end of the pitman 730 is pivotally connected to a selector arm segment 732 loose on the shaft 277 and flexibly connected to its associated selector arm 734 a forwardly disposed nose of which is adapted to cooperate with the periphery of a control disk 735 secured on the shaft 284. The pitman 731 is pivoted at its lower end to a selector arm segment 733 loose on the shaft 277 and flexibly connected to a selector arm 736, which cooperates with the periphery of a control disk 737 secured on the shaft 284.

When any denominational digit of the multiplier is 7, 8 or 9, the disk 737 is positioned so that the undercut portion of its periphery is opposite the nose of the selector arm 736. This allows the selector segment 733 to move counterclockwise to raise the pitman 731 to engage the notch 725 in the link 721 with the rod 726. Initial movement clockwise of the shaft 277 according to section XI of the chart (Fig. 26) shifts said link 721 rearwardly to cause the camming lug 719 thereof in cooperation with the roller 717 to shift the yoke 714 and the #10 multiplicand storage device one step toward the left, as viewed in Fig. 36, so that the wheels of said device will be in alinement with the actuator racks 101 of the next higher order denomination. Return movement of the rod 726 and the link 721 does not disturb the former positioning of the shifting yoke 714.

In the last actual multiplying cycle the disk 735 (Fig. 52), in cooperation with the selector arm 734, allows the selector arm segment 732 to move counterclockwise to engage the notch 724 in the link 720 with the rod 726. Initial movement clockwise of said rod shifts the link 720 rearwardly, causing the camming lug 718 thereon in cooperation with the roller 717 to shift the yoke 714 and the #10 multiplicand storage device toward the right (Fig. 36) to its lower order position.

It will be noted that there are shifting notches in the disk 735 (Fig. 52) opposite the positions of said disk, corresponding to cycles C and E. This is a safety precaution to make sure that the #10 multiplicand storage device is in its lower order position prior to the entering of the multiplicand therein in cycle F. It will be noted also that the wheels of the #10 multiplicand storage device always engage the auxiliary actuator rack 101 and that the lateral shifting of this storage device is solely for the purpose of increasing the amount entered therein one denomination.

*Shifting mechanism for the #2 multiplicand storage device*

Figure 6:
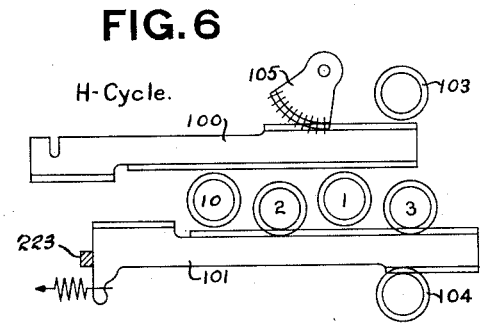
Figure 8:
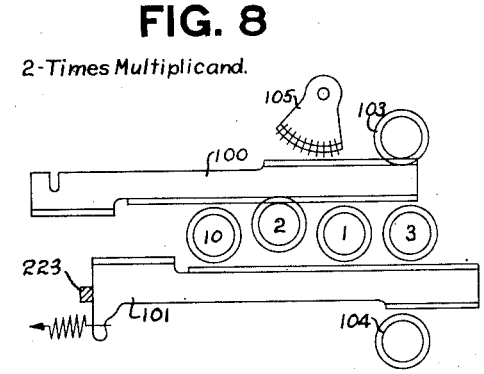

Referring to Figs. 6 and 8, it will be observed that the wheels of the #2 multiplicand storage device are sometimes engaged with the auxiliary racks 101 and sometimes with the main racks 100. The mechanism for shifting the wheels of the #2 multiplicand storage device from one set of actuators to the other will now be described.

A shifting yoke 738 (Figs. 31, 36, 54, 55 and 56) similar to the yoke 714, has two upwardly extending arms which are shiftably mounted on the shaft 349. The arms of the yoke 738 straddle the wheels 424 of the #2 multiplicand storage device and said arms are bifurcated to fit annular grooves in collars secured on the shaft for the #2 multiplicand storage device. The #2 multiplicand storage device it will be remembered, is mounted in a rockable and shiftable frame 437 similar to the frame for the #10 multiplicand storage device. The yoke 738 carries a roller 739 which cooperates with camming lugs 740 and 741 on shifting links 742 and 743. The forward ends of the links 742 and 743 are connected respectively to cranks 744 and 745 loose on the shaft 406. The links 742 and 743 have respective notches 746 and 747 arranged to engage the shifting rod 726. The link 742 has in its rearward end a stud 748 which extends within a horizontal slot in a pitman 749, the upper end of which fits in an annular groove in a collar on the shaft 274. The lower end of the pitman 749 is pivotally connected to a selector arm segment 755 loose on the shaft 277 and flexibly connected to a selector arm 756. The selector arm 756 has a nose which in cooperation with the mutilated edge of a control disk 757 controls the position of the segment 755. The forward end of the link 743 carries a stud 758 embraced by a horizontal slot in a pitman 759 the forked upper end of which fits in a groove in a collar on the shaft 274. The lower end of the pitman 759 is pivotally connected to a selector arm segment 760 which is flexibly connected to its associated selector arm 761, a nose of which cooperates with the periphery of a control disk 762 secured on the shaft 284.

When any denominational digit of the multiplier is 2, 4 or 8, and in the last multiplying cycle, the disk 757 (Fig. 54) is positioned so that one of the notches therein is opposite the nose of the selector arm 756. This permits the selector arm segment 755 to rock counterclockwise to lift the pitman 749 to engage the notch 746 with the rod 726. Oscillation of the rod 726, as explained above, shifts the link 742 first rearwardly to cause the camming lug 740 thereon in cooperation with the roller 739 to shift the yoke 738 and the #2 multiplicand storage device toward the left, as viewed in Fig. 36, to move the wheels of said multiplicand storage device out of alignment with the auxiliary racks 101 and into operative alinement with the main racks 100. When any denomination digit of the multiplier is five, or during cycle G, the disk 762 (Figs. 55 and 56) is positioned so that notches therein are opposite the nose of the selector arm 761. This permits the selector arm segment 760 to rock counterclockwise to move the pitman 759 upwardly to engage the notch 747 in the link 743 with the rod 726. Subsequent movement of said rod shifts the link 743 rearwardly to cause the camming lug 741 thereon, in cooperation with the roller 739, to shift the yoke 738 toward the right, as viewed in Fig. 36, to move the wheels of the #2 multiplicand storage device into operative alinement with the auxiliary actuator racks 101.

It will be noted that the rearward edges of the notches 724 and 725 (Figs. 51 and 52) in the links 720 and 721 and the rearward edges of the notches 746 and 747 in the links 742 and 743 (Figs. 54 and 55) are lower than the forward edges of said notches. This permits the lower flattened surface of the rod 726 to pass over said rearward edges of said notches when said links are in their downward or normal positions. The high forward edges of said notches insure that the links 720, 721, 742 and 743 will be returned forwardly by the rod 726 whether or not said notches are engaged with said rods 726. By referring to sections XI and XII of the time chart (Fig. 26) it will be seen that the aliner 332 allows the segments 732, 733, 755 and 760 to be positioned by their respective selector arms before return movement counterclockwise of the rod 726 is completed. When the links 720, 721, 742 and 743 are shifted upwardly by their respective segments and selector arms, the rod 726 in its return movement counterclockwise bypasses the lower rearward edges of the notches in said links.

*Lateral shifting mechanism for the #3 multiplicand storage device*

By referring to Figs. 4 and 6 it will be seen that when three times the multiplicand is being entered in the #3 multiplicand storage device, this device is actuated by the auxiliary racks 101. It will be further observed, however, that at all other times the #3 multiplicand storage device is actuated by means of the main actuators 100 (see Figs. 9 to 16 inclusive). The mechanism for shifting the #3 multiplicand storage device from one set of actuators to the other will now be described in detail.

Directing attention particularly to Figs. 57 and 59, when a denominational digit of the multiplier is either 3, 5, 6 or 7, or during the last multiplying cycle, a control disk 763 secured on the shaft 284 is positioned so that one of a series of notches in the peripheries thereof is opposite the nose of a selector arm 764 loose on the shaft 277. This allows a selector arm segment 765, flexibly connected to the selector arm 764, to rock counterclockwise under the influence of a spring when the aliner 332 is disengaged from said segment 765. Counterclockwise movement of the segment 765 lifts a pitman 766, the lower end of which is pivotally connected to said segment and the upper end of which is bifurcated to fit in a slotted collar on the shaft 274. Upward movement of the pitman 766 causes a horizontal slot therein in cooperation with a stud 767 in a shifting link 768 to rock said link counterclockwise to engage a notch 769 therein with the rod 726. The forward end of the link 768 is pivotally connected to the righthand arm of a yoke 770 rotatably mounted on the rod 406. In the succeeding cycle of operation, clockwise movement of the rod 726 shifts the link 768 rearwardly to rock the yoke 770 counterclockwise to shift a link 771 rearwardly. The forward end of the link 771 is pivotally connected to a lefthand arm of the yoke 770 and the rearward end of said link is supported in a vertical slot in a bracket 772, secured to the frame 125. The link 771 has a right-angled camming lug 773 which cooperates with a roller 774 mounted on a bracket 775, which extends through an opening in the left frame 125 and is secured to the left end plate 445 of the laterally shiftable frame, which, it will be recalled, supports the rockable frame 360 for the #3 multiplicand storage device (see also Fig. 31). When the link 771 is shifted rearwardly by initial movement clockwise of the rod 726, the camming lug 773 in cooperation with the roller 774 shifts the frame composed of the plates 445 and the #3 multiplicand storage device toward the left, as viewed in Fig. 36, to move the wheels 359 of said storage device out of alinement with the auxiliary actuators 101 and into alinement with the main actuators 100. Return movement counterclockwise of the rod 726 restores the links 768 and 771 forwardly to normal positions as here shown.

During cycle C, E or G, a disk 776 (Figs. 58 and 59) secured on the shaft 284 is positioned in the manner previously described so that one of a series of notches therein, corresponding to the cycles C, E and G, is opposite the nose of a selector arm 777 loose on the shaft 277. This permits a selector arm segment 778, loose on the shaft 277 and flexibly connected to the selector arm 777, to be spring-urged counterclockwise when the aliner 332 is disengaged therefrom. Counterclockwise movement of the segment 778 lifts a pitman 779, the lower end of which is pivotally connected to said segment and the upper end of which is slotted to fit an annular groove in a collar on the shaft 274. Upward movement of the pitman 779 causes a horizontal slot therein in cooperation with a stud 780 to shift a link 781 counterclockwise or upwardly so that a notch 782 in said link is moved into engagement with the rod 726. The forward end of the link 781 is pivotally connected to the right arm of a yoke 783 which straddles the yoke 770 and is turnably supported by the shaft 406. The yoke 783 has a left arm to which is pivoted the forward end of a link 784, the rearward end of which is supported in a vertical slot in the bracket 772.

When the notch in the link 781 is engaged with the rod 726 as explained above, and as illustrated in Fig. 58, initial movement clockwise of said rod 726 shifts said link 781 rearwardly to rock the yoke 783 counterclockwise to also shift the link 784 rearwardly. This rearward shifting of the link 784 causes a camming lug 785 thereon to engage the roller 774 and shift the frame composed of the plates 445 joined together by tubing in cooperation with various spacing washers and nuts, said tubing loosely fitting the rods 446 and 447, toward the right, as viewed in Fig. 36, to move the wheels of the #3 multiplicand storage device into alinement with the auxiliary racks 101. Return movement counterclockwise of the rod 726 shifts the links 781 and 784 forwardly to their normal positions, as here shown. When the links 768 and 781 are shifted back and forth, the studs 767 and 780 reciprocate in the horizontal slots in the pitmans 766 and 779. It will be remembered that the links 768 and 781, like the links 720 and 721 (Figs. 51 and 52), are positioned in relation to the rod 726 before said rod is fully returned counterclockwise. Consequently when said links are positioned upwardly by spring means in cooperation with the selector arms 764 and 777, the rod 726 rides over the rounded rearward edges of the notches in said links and into engagement with said notches.

*Add-subtract product accumulator engaging mechanism*

Figure 7:
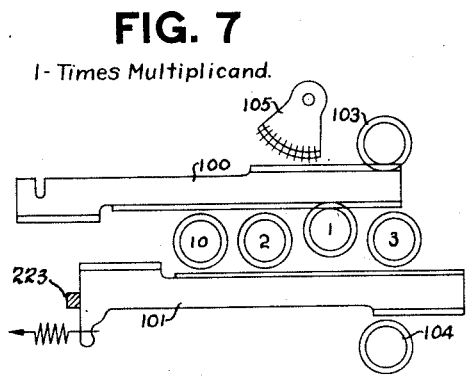

By referring to Figs. 7, 8 and 9, it will be seen that when any denominational digit of the multiplier is 1, 2 or 3, the multiplicand storage device containing the multiple of the multiplicand corresponding to any one of these digits is engaged with the main rack 100. It will also be noted that the add-subtract product accumulator 103 is engaged with the main actuators 100. The actuators 100 then reciprocate to take a sub-total from the multiplicand storage device engaged therewith and enter the amounts contained in the storage device into the wheels of the add-subtract product accumulator 103. Figs. 10 and 12 reveal that when a denominational digit of the multiplier is either 4 or 6, either the #2 or #3 multiplicand storage device, respectively, is engaged with the main actuators 100. Said actuators are coupled to the auxiliary actuators 101 by the coupling pinions 102 and the add-subtract product accumulator 103 is engaged with the actuators 100 and the add-product accumulator 104 is engaged with the actuators 101. Movement of the actuators 100 and 101 takes a sub-total from the engaged multiplicand storage device and enters the amount contained in the storage device in the product accumulators 103 and 104. It is therefore evident that the combined amounts entered into the product accumulators at this time is equal to the product of the multiplier digit times the multiplicand. When any denominational digit of the multiplier is 5 (Fig. 11), the #2 and #3 multiplicand storage devices are operated in a sub-total operation and the amounts or multiples of the multiplicand contained therein are entered respectively in the add-product accumulator 104 and the add-subtract product accumulator 103. In this operation, the coupling pinions 102 are inactive.

When any digit of the multiplier is 7, 8 or 9, the #10 multiplicand storage device and the add-product accumulator (Figs. 13, 14 and 15) are engaged with the auxiliary racks 101. Simultaneously the multiplicand storage device containing the difference between ten times the multiplicand and the digit of the multiplier (7, 8 or 9) and the add-subtract product accumulator 103 are engaged with the main actuators 100. It will be noted that in this case the main and auxiliary actuators are not coupled together. Subsequent movement of the actuators takes a sub-total from the multiplicand storage devices engaged therewith and enters ten times the multiplicand in the add-product accumulator 104 and enters subtractively the multiple of the difference between the digit of the multiplier and ten times the multiplicand into the add-subtract product accumulator 103. The combined amount entered in the two product accumulators at this time equals the digit 7, 8 or 9 of the multiplier times the multiplicand. It will be recalled that the product accumulators are mounted in the carriage 106 (Fig. 31) so that they may be shifted as multiplying progresses.

The mechanism for engaging the add-subtract product accumulator 103 with the main actuators 100 will now be described. The wheels of the add-subtract product accumulator 103 are rotatably mounted on a rod 786 (Figs. 31 and 71) supported by a rockable frame composed of right and left end plates 787 connected by a cross bar 788 and various sectional support plates, one between each of the denominational wheels of said accumulator. The right and left plates 787 are pivoted on identical studs 789, one in the plate 398 (Fig. 69) and the other in the plate 377, which plates it will be recalled are a part of the product accumulator carriage 106. Each of the plates 787 (Fig. 71) carries a roller 795, axially aligned with the rod 786. The rollers 795 cooperate with identical slots 796 in a pair of engaging arms 797 secured on the shaft 477 (see also Figs. 67 and 69). Also secured on the shaft 477 are symmetrical cranks 798 which support a rod 799 engaged by the bifurcated upper end of a gear segment 800 rotatably mounted on the stud 638. The segment 800 meshes with a gear segment 801 loose on the stud 485. The segment 801 is connected by a link 802 to the righthand arm of a yoke 803 loose on the shaft 406. A downward extension of a lefthand arm of the yoke 803 has pivoted thereto the forward end of an engaging link 804 with a slot 805 which coacts with the total and subtract engaging and disengaging rod 310. The link 804 has an arcuate surface 806 which cooperates with the subtotal rod 309 and a projection 807 arranged to coact with the add-engaging rod 308. The link 804 carries a stud 808 which extends within a horizontal slot in a pitman 809, the upper end of which is slotted to fit an annular groove in a collar on the shaft 275. The lower end of the pitman 809 is connected to a selector arm segment 810 loose on the shaft 277 and carrying a stud 811 which cooperates with a projection of a selector arm 812 also loose on the shaft 277 and flexibly connected to said segment 810 by a spring 830 tensioned between extensions of said segment and said selector arm. A forwardly disposed nose of the selector arm 812 cooperates with a control disk 813 secured on the shaft 284.

The stud 811 in the segment 810 (Fig. 70) also cooperates with a forward extension on a subtract control selector arm 814, loose on the shaft 272 and flexibly connected to said segment 810 by a spring 815. A nose of the selector arm 814 is spring-urged into communication with the periphery of a subtract control disk 816 secured to the shaft 284. The disks 813 and 816 are mounted adjacent each other, the former controlling the engaging of the add-subtract product accumulator 103 with its actuators when the product is to be added in the accounting machine accumulators and the latter controlling the engaging of the product accumulator 103 when the product is to be subtracted from the accounting machine accumulators. The control is shifted from one disk to the other by means of a control yoke 817 which straddles said control disks 813 and 816, and has symmetrical projections 818 and 819 which cooperate respectively with the noses of the selector arms 812 and 814. Normally the yoke 817 is in the position shown in Figs. 70 and 71, in which position the projection 819 in cooperation with the nose of the selector arm 814 maintains said selector arm out of engagement with the periphery of the control disk 816. In this case the add-control disk 813, in cooperation with the add-selector arm 812, controls the positioning of the link 804 relative to the accumulator engaging rods 308, 309 and 310.

Depressing the subtract-product key 130 (Fig. 1) rocks the yoke 817 clockwise as viewed in Figs. 70 and 71 to disable the selector arm 812 and simultaneously enable the selector arm 814 to shift the control of the link 804 to the subtract control disk 816 for a purpose later to be described. Horizontal columns 2 and 24 of the chart (Fig. 28) graphically illustrates the contour of the peripheries of the disks 813 and 816 and it will be observed that the disks are identical with the exception of the sections that control the engaging mechanism in the final cycles B and D. Regardless of which of the disks 813 or 816 (Figs. 70 and 71) is in control when any digit of the multiplier is 1, 2, 3, 4, 5, or 6 the selector arms 812 or 814 position the selector arm segment 810 clockwise to lower the pitman 809 to move the projection 807 of the link 804 in the path of the add-engaging rod 308. Initial movement counterclockwise of the add-engaging rod 308 shifts the link 804 rearwardly, which, by means of the yoke 803, link 802, segments 801 and 800, imparts clockwise movement to the shaft 477 and the cams 797 to engage the wheels of the add-subtract product accumulator 103 with the main actuators 100 according to the time shown in section II of the time chart (Fig. 26). The sub-total and add-disengaging rod 309 returns the link 804 and connected mechanism to disengage the add-subtract product accumulator 103 from the actuators 100.

When any digit of the multiplier is 7, 8 or 9, the disks 813 and 816 are positioned relatively to the nose of the selector arms 812 and 814 so that whichever of said arms that is not disabled by the yoke 817 shifts the selector arm segment 810 counterclockwise to lift the pitman 809 and the link 804 full distance upwardly to engage the notch 805 in said link with the total and subtract engaging and disengaging rod 310. Movement of the rod 310 according to section III of the time chart (Fig. 26) causes the add-subtract product accumulator 103 to be engaged with and disengaged from the main actuators 100 in subtract time. As explained hereinbefore in connection with Figs. 13, 14 and 15, when any digit of the multiplier is 7, 8 or 9, ten times the multiplicand is added in the add-product accumulator 104 and the multiple of the difference between ten times the multiplicand (three, two or one times the multiplicand) and the particular digit of the multiplier is subtracted from the add-subtract product accumulator 103.

When any denominational digit of the multiplier is zero and during cycles B, C, D, E, F, G and H, when the disk 813 (Fig. 71) is in control, the link 804 is retained in neutral position as here shown, and consequently will not be affected by the rods 308, 309 and 310. It will be recalled by referring to Figs. 16, 17 and 18 that when the product is to be added in one or more of the accounting machine accumulators the final cycles are A, B and C. In this case the disk 813 controls the engaging and disengaging of the add-subtract product accumulator 103. It will be recalled that in the final actual multiplying cycle the control disks are positioned so that the section of their periphery representing cycle H is positioned opposite the noses of the selector arms. In this case the disk 813, in cooperation with the selector arm 812, positions the segment 810 so that the link 804 remains in neutral position, as here shown, during cycle A. During cycle A the disk 813 causes the selector arm 812 to shift the segment 810 counterclockwise to engage the notch 805 with the total and subtract rod 310 so that the product accumulator 103 will be cleared in cycle B.

It will also be recalled by referring to Fig. 66 and section 3 of the control disk chart (Fig. 28) that in cycle A the add-product accumulator 104 is conditioned for an adding operation to be performed in cycle B, and it will likewise be noted by observing Fig. 17 that the main actuators 100 are coupled for unitary movement with the auxiliary actuators 101. It is therefore obvious that during cycle B the portion of the product contained in the add-subtract product accumulator 103 will be cleared therefrom and simultaneously added in the add product accumulator 104 which thereafter contains the complete product.

During cycle B, the disk 412 (Fig. 66) positions the segment 410 full distance counterclockwise to engage the link 408 with the total and subtract engaging rod 310 and the disk 813 (Fig. 71) positions the segment 810 to retain the link 804 in neutral position as here shown. Consequently during the succeeding cycle C, which in this particular case is the final cycle, the add-product accumulator 104 (Fig. 18) will be cleared and the product cleared therefrom will be added in the desired accounting machine accumulators, which it will be remembered, are selected by means of tappets or control elements located in predetermined columnar positions on the traveling carriage in cooperation with add hanging bar levers when said traveling carriage is automatically tabulated during the preceding cycle. At the end of cycle C the machine comes to rest, and it will be seen by referring to the vertical column C of the chart (Fig. 28) that the control disks are now in position to condition the machine for the first or F cycle of a succeeding multiplying operation.

When the product is added in the accounting machine accumulators the ratchet 623 (Figs. 76 and 79), in cooperation with the escapement mechanism here shown controls the positioning of the auxiliary slide and the control disk shaft 284 (Fig. 78). It is therefore obvious that when the escapement mechanism is operated at the beginning of the succeeding multiplying operation the ratchet 623, under influence of the slide 499 and spring 543, will skip from position C to F, to properly position the shaft 284 and the control disks in the first cycle of a succeeding multiplying operation.

*Subtracting the product from the accounting machine accumulator*

After the machine comes to rest at the end of cycle A, if it is desirable to subtract the product from the accounting machine accumulators, the operator depresses the subtract product key 130 and starts the machine operating by depressing the starting bar 132. This causes the product to be transposed to a complementary amount and this complementary amount added in the selected accumulators of the accounting machine, which is equivalent to subtracting the positive product therefrom. When the product is subtracted from the accounting machine accumulators, the final cycles are A, B, D and E instead of A, B and C, which are the final cycles when the product is added in the accounting machine accumulators. When the product is subtracted, the subtract ratchet 624 (Fig. 39) governs the positioning of the auxiliary slide 499 and the disk shaft 284 and depressing the subtract product key 130 shifts the control of the positioning of the slide 499 and the disk shaft 284 from the add-ratchet 623 (Figs. 76 and 79) to said subtract-ratchet 624.

Depressing the subtract product key 130 (Figs. 33 and 48) causes rack teeth on the lower end of a stem 820 of said key, in cooperation with a segment 821 secured on a shaft 822 journaled in projecting lugs of the base plate 118 (Fig. 47), to rock said shaft 822 and a crank 824 secured thereon counterclockwise to disengage a stud 823 in said crank 824 from the sole of a foot 825 of a link 826, the upper end of which is pivotally connected to a crank 827 loose on the stud 648. The upper end of the stem 820 extends through an aperture in the keyboard plate 133 while the lower end of said stem fits in a groove in the base 118. The lower end of the link 826 is connected to an extension of a yoke 828 turnably mounted on the shaft 284 and having a left arm with gear teeth which mesh with a segment 829 secured on a shaft 835 journaled in the frames 124 and 125 (Fig. 36). Also secured on the shaft 835 (Fig. 71) is a segment 836, which meshes with teeth in the right arm of the yoke 817. A spring 837 (Fig. 48) tensioned between the stud 823 and the link 826 tends to urge said link upwardly when said stud 823 is disengaged from the foot 825. However, upward movement of the link 826 and consequent clockwise movement of the yokes 828 and 817 (Fig. 71) is momentarily prevented by the projection 818 of said yoke 817 engaging the nose of the selector arm 812.

Initial movement clockwise of the restoring bar 286 rocks the selector arm 812 clockwise out of the path of the projection 818. The spring 837 (Fig. 48) then shifts the link 826 upwardly and the yoke 817 clockwise to move the projection 818 in the path of the nose of the selector arm 812 and to simultaneously move the projection 819 out of the path of the nose of the selector arm 814 (Fig. 70) thereby shifting the control of the engaging mechanism for the add-subtract product accumulator 103 from the add control disk 813 to the subtract control disk 816.

The subtract product key 130 (Fig. 33) is retained depressed by means of a latch 838 fulcrumed on an extension of a stem 839 of the multiplication key 131. A spring 840 urges the latch 838 counterclockwise so that the lower end thereof is maintained in communication with a projection 841 of the stem 820 of the subtract product key 130. When the multiplication key is not depressed, a stud 842 in cooperation with an angular shoulder of the latch 838 maintains said latch out of latching relation with the projection 841 thereby preventing retention of the subtract product key 130 in depressed position when the multiplication key is not depressed. When the multiplication key 131 is depressed, depressing the subtract product key 130 moves the projection 841 beyond the lower end of the latch 838. The spring 840 then urges said latch counterclockwise in the path of the projection 841 to retain the subtract product key 130 depressed. When the multiplication key 131 is released at the end of a multiplying operation, a spring 843 restores said key upwardly causing the stud 842 to disengage the latch 838 from the projection 841 to free the subtract product key 130 to the action of a spring 844, which is tensioned to restore said key and connected mechanism to normal position. However, such restoring is prevented by the selector arm 814 the nose of which in cooperation with the projection 819 obstructs return movement counterclockwise of the yoke 817 until in the succeeding operation the restoring bar 286 rocks said selector arm 814 clockwise out of the path of the projection 819.

As stated above, depressing the subtract product key 130 shifts the control from the add disk 813 (Figs. 70 and 71) to the subtract disk 816, which, in cooperation with its associated selector arm 814, positions said arm and the segment 810 counterclockwise, at the end of cycle B, to engage the notch 805 in the link 804 with the total and subtract engaging rod 310. When the product is subtracted from the accounting machine accumulators, the control shaft 284 and the control disks, under influence of the ratchet 624 and the slide 499 (Figs 39 and 76), move directly from position B to position D, thereby skipping position C. This is due to the fact that there is no tooth in the ratchet 624 corresponding to position C. Therefore, in cycle D the add-subtract product accumulator 103 (Figs. 17 and 19), which was cleared during cycle B and the amount contained therein added in the add-product accumulator 104, cooperates with the main actuators 100 in subtract time. Simultaneously the add-product accumulator 104 cooperates with the auxiliary actuators 101 in total-taking time and said auxiliary actuators are coupled to the main actuators 100 for unitary movement therewith. It is therefore evident that in cycle D the add-product accumulator 104 will be cleared and the product cleared therefrom will be subtracted from the previously cleared add-subtract product accumulator 103, leaving the complement of the product in said accumulator 103.

During cycle D the disk 816 (Fig. 70) positions the selector arm 814 and the segment 810 to engage the link 804 (Fig. 71) with the bar 310 so that in the final cycle E the add-subtract product accumulator 103 will be cleared by the main actuators 100 and said main actuators positioned commensurate with the value of the complement of the product cleared therefrom. This positioning of the actuators 100 is transmitted to the accounting machine actuators 162 by means of the connections shown in Figs. 29 and 31, and explained hereinbefore.

Immediately thereafter the accounting machine accumulator or accumulators selected by means of the tappets or control elements 157 on the traveling carriage 122 in cooperation with the add hanging bars 158 are engaged with the actuators 162 and said actuators during their return movement forwardly add the complementary amount of the product in said accounting machine accumulators, which it is understood is equivalent to subtracting the true amount of the product from said accumulators.

The condition for the first cycle (F) of a multiplying operation is set up in either of the final cycles C or E. This condition is effected by the control disks, and it will be observed by consulting the vertical columns C and E of the chart (Fig. 28) that the contour of each individual disk is exactly the same in positions C and E on said disks.

*Positioning of control disks when the product is subtracted from the accounting machine accumulators*

As previously stated, depressing the subtract product key 130 shifts the positioning of the control disk shaft 284 from the add-ratchet 623 (Fig. 76) to the subtract-ratchet 624. These ratchets, it will be remembered, in cooperation with the slide 499, control the positioning of the disk shaft 284 during the preliminary cycles F, G and H and during the final cycles A, B and C or A, B, D and E of the multiplying operation.

Secured on the shaft 822 (Figs. 33 and 76) are symmetrical cams 845 and 846 which cooperate respectively with upward extensions of the add escapement pawl 625 and the subtract escapement pawl 626. When the subtract product key 130 is not depressed, the shaft 822 is so positioned that the cam 846 retains the subtract escapement pawl 626 disengaged from the subtract ratchet 624 (see also Fig. 39) and the cam 845 permits the pawl 625 to cooperate with the ratchet 623. It is obvious therefore that the add product ratchet 623 in this case controls the positioning of the disk shaft 284 (Fig. 78) and that the final cycles will be A, B and C. Depressing the subtract product key 130 rocks the shaft 822 and the cams 845 and 846 counterclockwise to disengage the escapement pawl 625 from the ratchet 623 and to allow the subtract pawl 626 under the influence of the spring 628 to engage the subtract product ratchet 624. It is therefore evident that when the product is to be subtracted from the accounting machine accumulator, the final multiplying cycles will be A, B, D and E.

*Transfer mechanism for the add-subtract product accumulator*

The transfer or carrying mechanism for the add-subtract product accumulator 103 (Figs. 31 and 49) is similar to that of the #3 multiplicand storage device explained herein before, and both of these transferring mechanisms are substantially the same as that used on the conventional Ellis machine, which is disclosed in the Ellis Patent No. 1,203,863, issued November 7, 1916, cited at the beginning of this specification. In the ensuing description the transferring mechanism for the add-subtract product accumulator will be described in detail, giving particular attention to the part thereof that varies from the conventional Ellis transferring mechanism.

Each of the wheels of the add-subtract product accumulator 103 except the highest order wheel have integral therewith similar tripping cams 847 and 848, the tripping teeth of which cooperate respectively with an add transfer pawl 849 and a subtract transfer pawl 850 loose on a rod 851 extending between the right and left end plates 787 of the accumulator frame. The pawl 849 has a bent-over ear which cooperates with a projection 852 of a transfer cam lever 853 pivoted on a rod 854 supported by denominational separating plates 855 for the add-subtract product accumulator, said plates 855 being supported by rods extending between the plates 376 and 377. The subtract trip pawl 850 has a bent-over ear arranged to cooperate with the hook-shaped nose of an arm 856 secured to the transfer cam lever 853. The lever 853 has a Y-shaped slot 857 adapted to cooperate with a stud 858 in a transfer segment 859 which meshes with the next higher order denominational accumulator wheel. The segment 859 is pivoted to one of the separating plates 855 and an upward extension of said segment is connected by a spring 860 to the bail of a subtract shifting yoke 861, right angle arms of which are pivoted on trunnions 862 (Figs. 49 and 69) in the plates 377 and 398 of the product accumulator carriage. The transfer tripping pawls 849 and 850 have angular extensions adapted to cooperate with eccentrics on a shaft 863 journaled in the plates 377 and 398.

As shown in Fig. 31, the bail 861 and the eccentric shaft 863 are positioned for adding operations, in which position the springs 860 are tensioned to urge the transfer segments 859 in a counterclockwise direction. The eccentric shaft 863 is here shown in adding position in which position it retains the subtract trip pawls 850 in their clockwise positions, so that the tripping teeth thereof are out of the path of the tripping cams 848, and so that the bent-over ears on said tripping pawls are out of the path of the arms 856. When the eccentric shaft 863 is in adding position, the add-trip pawls 849 are resiliently maintained counterclockwise in the path of the tripping cams 847 and the right-angled ears of said tripping pawls are urged into communication with the projections 852 of the transfer levers 853.

In adding operations, after the main racks 100 (Fig. 31) have completed their initial movement rearwardly, the wheels of the add-subtract product accumulator 103 are disengaged from the transfer segments 859 and engaged with the teeth of said racks 100. Immediately thereafter a restoring bar 864 in its restoring movement clockwise engages projections 865 of the transfer levers 853 and restores said levers, the segments 859 and the add tripping pawls 849 to untripped positions as here shown. After restoring the transfer mechanism, the bar 864 returns a slight distance counterclockwise to leave sufficient distance between the projections 865 and said bar to allow the pawls 849 and the transfer levers 853 to be tripped without imparting full movement to the transfer segments 859. Return movement forwardly of the racks 100 rotates the wheels of the add-subtract product accumulator clockwise to add amounts therein.

When any one of said wheels passes from 9 to zero, a tooth of the tripping cam 847 engages the tooth of the tripping pawl 849 for that particular denomination and rocks said pawl clockwise to disengage the bent-over ear thereof from the projection 852 of the transfer lever 853. This allows said lever 853 to be spring-urged a slight distance counterclockwise until the projection 865 contacts the restoring bar 864 to allow the projection 852 of said transfer lever to move in the path of the ear of the tripping pawl 849 to retain said pawl tripped. Immediately after the racks 100 reach the end of their return movement forwardly, the wheels of the product accumulator 103 are disengaged therefrom and reengaged with their respective transfer segments 859. After the accumulator wheels are reengaged with the transfer segments 859, the restoring bar 864 is released to the action of a spring which snap-returns it full distance counterclockwise as here shown. This allows all the tripped transfer levers 853 to be spring-urged counterclockwise and the position of the bail 861 causes the springs 860 to direct the studs 858 into the righthand branches of the Y slots 858 so that counterclockwise movement of the levers 853 will rock the segments 859 counterclockwise to advance the next higher order accumulator wheel one step or digit clockwise. The segments 859 also serve to aline the accumulator wheels when they are disengaged from the main racks 100.

During actual multiplying cycles, when any denominational integer of the multiplier is 7, 8 or 9, it will be remembered that 10 times the multiplicand is added in the add-product accumulator 104 and the difference, 3, 2 or 1 times the multiplicand, is entered subtractively in the add-subtract product accumulator 103. In this instance an undercut portion of the periphery of a control disk 866 (Fig. 49) is opposite the nose of a selector arm 867 loose on the shaft 277. The selector arm 867 has a projection which engages a stud 868 in a selector arm segment 869 also loose on the shaft 277 and flexibly connected to said selector arm 867. When the aliner 332 is disengaged from the segment 869, the arm 867 and said segment are resiliently urged clockwise, after which the aliner 332 again engages said segment 869 to retain it in moved position. Clockwise movement of the segment 869 (Fig. 49) by means of a link 875 connecting said segment and one arm of a bell crank 876 rocks said bell crank counterclockwise on its pivot pin 877 in a subtract slide 878 reciprocably mounted on the left frame 125 by means of horizontal slots in said slide in cooperation with two studs 879 secured in said frame 125. Counterclockwise movement of the bell crank 876 is transmitted to a subtract hook 882 by means of a link 883 connecting an upper arm of said bell crank to an upper arm of said hook 882. This latches the hook 882 over a stud 884 in a bell crank 885 secured on the eccentric shaft 863 (see also Fig. 31). A link 886 connects the bell crank 885 to the yoke 861.

Near the beginning of a multiplying cycle, counterclockwise movement of the companion cams 289 and 290 (see section XV of the chart, Fig. 26) in cooperation with rollers 880 and 881 carried by the slide 878 shifts said slide forwardly to cause the hook 882 to impart clockwise movement to the bell crank 885 and the shaft 863, and counterclockwise movement to the subtract yoke 861, as viewed in Fig. 49, and counterclockwise movement of the shaft 863 and clockwise movement to the bail 861 as viewed in Fig. 31. This movement of the eccentric shaft 863 rocks the add-trip pawls 849 clockwise out of communication with the tripping cams 847 and permits the subtract tripping pawls 850 to be resiliently moved counterclockwise into communication with their respective tripping cams 848, and permits the right-angled ears of said tripping pawls to move into the paths of the arms 856 to block counterclockwise transferring movement of the levers 853 until said pawls are tripped.

When the difference between ten times the multiplicand and the integers 7, 8 or 9 of the multiplier is being subtracted from the add-subtract product accumulator 103, as explained in connection with Figs. 13, 14 and 15, the wheels of said accumulator are engaged with the main actuator rack 100 prior to their initial movement rearwardly. This of course disengages said accumulator wheels from their respective transfer segments 859 and at this time the restoring bar 864 restores all released transfer levers 853 and subtract tripping pawls 850. Initial movement rearwardly of the actuators 100 rotates the wheels of the add-subtract product accumulators counterclockwise or reversely to enter subtractively the multiple corresponding to the difference (3, 2 or 1) between ten times the multiplicand, and 7, 8 or 9 times the multiplicand into said accumulator wheels. While the accumulator wheels are being thus reversely rotated, each of said wheels that passes from one to zero, causes the tripping cam 848 for said wheel to engage its corresponding trip pawl 850 and rock it clockwise to disengage the bent-over ear thereof from the arm 856 to allow the transfer lever 853 to move a slight distance until the projection 865 thereof engages the restoring bar 864 in the same manner as explained for adding operations.

After the actuators 100 complete their initial movement rearwardly the wheels of the product accumulator 103 are disengaged therefrom and reengaged with the segments 859. Immediately thereafter, the restoring bar 864 is released to the action of a spring which returns it counterclockwise to the position here shown, thus allowing the transfer levers 853 to be spring-urged counterclockwise in unison therewith. The transfer yoke 861 (Fig. 31) being in its right-hand or clockwise position causes the springs 860 to urge the segments 859 clockwise to direct the studs 858 into the lefthand channel of the Y slots 857, thus causing counterclockwise movement of all the tripped transfer levers 853 to rock said segments 859 clockwise to impart counterclockwise or reverse movement to the accumulator wheels to cause one digit to be borrowed from the next higher denominational order. The cams 289 and 290 (Fig. 49) shift the slide 878 rearwardly near the end of the cycle to allow a spring 887, one end of which is connected to the bell crank 885, to return said bell crank, the shaft 863 and the yoke 861 to adding position, as here shown.

When the product is to be subtracted from the accounting machine accumulators in the manner explained hereinbefore, the condition is set up, during cycle B, that causes the add-subtract product accumulator 103 to be engaged with its actuators 100 in subtract time during cycle D, at which time the product is subtracted from the zeroized add-subtract product accumulator 103. During the latter part of cycle B the subtract hook 882 (Fig. 49) is latched over the stud 884 by means of a subtract control disk 888 (Fig. 50) in cooperation with the nose of its associated selector arm 889 loose on the shaft 277.

Depression of the subtract product key 130 (Figs. 33 and 48) permits the spring 837 to rock the yoke 828 clockwise and the segment 829 and shaft 835 counterclockwise, as here viewed, and said segment and shaft clockwise, as viewed in Fig. 50. Clockwise movement of the shaft 835, by means of a segment 874 secured thereto, imparts counterclockwise movement to a yoke 890 the arms of which straddle the disks 866 and 88 and are turnably supported by the shaft 284. Counterclockwise movement of the yoke 890 moves a projection 891 on the left arm thereof out of contact with the nose of the selector arm 889, thereby allowing said selector arm to become active and to be positioned by the periphery of the disk 888. Counterclockwise movement of the yoke 890 (Fig. 49) causes a projection 892 on the left arm thereof to engage the nose of the selector arm 867, to render said selector arm ineffective when the product is to be subtracted from the accounting machine accumulators. It is therefore evident that in this case the control of the subtracting hook 882 is shifted from the disk 866 to the disk 888.

When the aliner 332 (Fig. 50) is disengaged from the segment 869, near the end of cycle B, the notch in the control disk 888 corresponding to cycle B, is opposite the nose of the selector arm 889 and allows said selector arm to be resiliently urged clockwise, which movement by means of a projection on said selector arm in cooperation with the stud 868 is imparted to the selector arm segment 869. Clockwise movement of the segment 869, by means of the connections shown in Fig. 49, rocks the hook 882 counterclockwise into engagement with the stud 884. Rotation of the cams 289 and 290 during cycle D (see also Fig. 19) then shifts the subtract transfer or borrowing mechanism to effective position in the manner explained above.

It is therefore to be understood that the only time the disk 888 (Fig. 50) becomes effective is when the subtract product key 130 is depressed and that at all other times the disk 866 controls the add-subtract transferring mechanism of the accumulator 103; also that there are only four instances in which the transferring mechanism is shifted to subtracting position: when any denominational integer of the multiplier is 7, 8 or 9, and when the product is subtracted from the accounting machine accumulator. At all other times the add transferring mechanism is effective.

*Add-subtract product accumulator in total taking operations*

By referring to spaces 2, 3 and 24 of the control disk chart (Fig. 28) it will be observed that both of the product accumulators are at times operated in a total taking operation, but neither of them is ever operated in a sub-total taking operation. It will also be observed that the add-subtract product accumulator 103 (see also Fig. 31) is engaged with and disengaged from the main actuators 100 in exactly the same time in total taking operations as it is in subtracting operations. However in total taking operations, the add trip pawls 849 remain in effective positions, and the subtract transfer or borrowing mechanism remains ineffective as here shown. In a total taking operation, initial movement rearwardly of the actuators 100 rotates the wheels of the add-subtract product accumulator 103 reversely until one of the diametrically opposed teeth of the tripping segments 847 engages the inside edge of the tripping tooth of the add pawls 849. This locates the accumulator wheels at zero and positions the actuators 100 commensurate with the amount on said accumulator wheels. This positioning of the actuators 100 is transmitted to the accounting machine actuators and printing mechanism by means of the levers 235 and the links 236 in the manner explained hereinbefore.

Mechanism to aline the multiplying unit actuators 100 and 101

The main actuators 100 and the auxiliary actuators 101 of the multiplying unit are alined in their forward or home positions and in their set positions by means of an aliner 893 (Figs. 31 and 43) in cooperation with teeth 894 and 895 of the actuators 100 and 101, respectively. The aliner 893 is secured to a cross bar 896 extending between two similar arms 897 secured to the shaft 241. Secured to the left arm 897 (see also Fig. 36) is a V-shaped cam lever 898 with rollers 899 and 900 which cooperate respectively with the peripheries of companion plate cams 901 and 902 secured on the multiplying unit cam shaft 291.

When the machine is at rest and the actuators 100 and 101 are in zero or home positions, the aliner 893 is engaged with the teeth 894 and 895 of said actuators. Prior to initial movement rearwardly of the racks 100 and 101 during a multiplying cycle, the cams 901 and 902 disengage the aliner 893 from said actuators 100 and 101. After the actuators 100 and 101 have completed their initial movement rearwardly and have been positioned under control of either the numeral keys of the accounting machine or the wheels of some storage device or accumulator of the multiplying unit, the aliner 893 is reengaged with said actuators and remains engaged therewith until the leading frame 223 starts its return movement forwardly. The aliner 893 is then disengaged from the actuators 100 and 101 and remains disengaged therefrom until said actuators arrive at their extreme forward or zero positions, whereupon said aliner 893 is reengaged with said actuators 100 and 101. The timing of the cams 901 and 902 and the movement of the aliner 893 is shown graphically in section VIII of the time chart (Fig. 26).

Multiplication key mechanism

As stated several times previously, before a multiplying operation can be initiated it is necessary to depress the multiplication key 131 (Figs. 33 and 39). Depressing the multiplication key 131 unlocks the escapement mechanism that controls the positioning of the control disk shaft 284 during the preliminary and final cycles of a multiplying operation and renders the non-add or neutral bail 299 (Fig. 39) ineffective to retain the engaging mechanism for the multiplicand storage devices and the add-product accumulators in neutral position. The multiplication key is locked in depressed position until the multiplying operation is completed.

The upper end of the stem 839 of the multiplication key 131 extends through an aperture in the keyboard plate 133, and the lower end of said stem 839 is pivotally connected to a forwardly disposed arm of a yoke 903 loose on a stud 904 secured in the base 118. The spring 843 urges the multiplication key upwardly to normally maintain a shoulder on the stem thereof in contact with the lower surface of the keyboard plate 133.

Depressing the multiplication key causes a projection 905 (Fig. 33) thereof in cooperation with a stud 906 in the locking plate 148 to rock said locking plate clockwise out of the path of the stud 147 to permit counterclockwise releasing movement of the plate 138 upon depression of the starting bar 132. Depressing the multiplication key 131 rocks the yoke 903, (Fig. 39) counterclockwise to cause a stud 907 in a downward extension thereof in cooperation with the bifurcated upper end of a locking pawl 908, loose on a stud 909 secured in the right multiplying frame 124, to rock said pawl 908 clockwise to disengage a tooth 915 thereof from either of two locking notches 916 in the subtract escapement ratchet 624, said notches being located in positions corresponding to the final cycles C or E of a multiplying operation. Counterclockwise movement of the yoke 903 caused by depressing the multiplication key, by means of a vertical link 914 connected between a rearwardly disposed arm of said yoke 903 and an arm 917 of a yoke 918 rotatably supported by the shaft 336, rocks said yoke 918 clockwise to cause a stud 919 in an extension of the arm 917 to enter either of two similar notches 920 in the flange of a control drum 921 secured to the control disk shaft 284 (see also Fig. 40). After the machine is set in motion by depressing the starting bar 132 (Fig. 37) the rim of the drum 921, in cooperation with the stud 919, blocks return movement counterclockwise of the yoke 918, which by means of the link 914 and the yoke 903 prevents upward restoring movement of the multiplication key 131 under the influence of the spring 843.

It is obviously necessary to provide means to lock the multiplication key 131 depressed until the shaft 284 and the control drum 921 are rotated in the first cycle of a multiplying operation in order to move the notches C and E in the rim of said drum out of alinement with the stud 919. Clockwise movement of the yoke 918 (Figs. 39 and 44) caused by depressing the multiplication key 131 rocks the lower end of a latch 922 secured to the yoke arm 917 also clockwise out of the path of the end of a retaining pawl 923 loose on the shaft 277. A spring 924 stretched between a stud 925 and the yoke 918 urges the pawl 923 upwardly into contact with a step on the latch 922 and in the path of the lower end of said latch to block return or releasing movement of the yoke 918 and the multiplication key 131. The stud 925 (Fig. 44) extends within a slot in the lower end of a link 926, the upper end of which is connected to an extension of the cam lever 311, and consequently said link 926 reciprocates down and then up, according to the movement of the lever 311 and rod 308, as shown in section II of the time chart (Fig. 26).

When the multiplication key is not depressed and the pawl 923 is in ineffective position, as here shown, the link 926 reciprocates idly without imparting any movement to the pawl 923. However, when the multiplication key is depressed and the pawl 923 is in effective position to block return movement of the latch 922, the upper end of the slot in the link 926 engages the stud 925 and forces said pawl 923 counterclockwise out of the path of the arm 922. Relation of movement between the link 926 and the drum 921 is such that during the first cycle of a multiplying operation the notches 920 have moved out of the path of the stud 919 prior to the time that the link 926 moves the pawl 923 counterclockwise to ineffective position, and it is therefore obvious that the rim of the drum 921 prevents restoring movement counterclockwise of the yoke 918 and the multiplication key is thus retained depressed during an entire multiplying operation.

At the end of a multiplying operation when the shaft 284 and the drum 921 have been positioned so that one of the openings 920 is opposite the stud 919, the link 926 moves the pawl 923 out of the path of the latch 922 and the spring 843 (Fig. 39) restores the multiplication key 131 and associated parts to normal positions as here shown.

When the accounting machine is being used independently of the multiplying unit, the non-add or neutralizing bar 299 (Figs. 37 and 39 and Figs. 62 to 66 inclusive) is retained in effective position as here shown by a latch 927 loose on the shaft 336 in cooperation with a projection 928 an arm 929 which, as explained before, is one of two arms loose on the shaft 277 connected by and supporting the bar 299.

By observing Figs. 62 to 66 inclusive it will be seen that the bar 299 overlies the selector arm segments for the engaging mechanisms for the four multiplicand storage devices and the add-product accumulator. It is therefore evident that when said bar 299 is retained in effective position as here shown, the selector arm segments for the multiplicand storage devices and the add-product accumulator, and connected engaging mechanisms will be retained in non-add or neutral position irrespective of the position of the control disks and the selector arms associated with said segments and said engaging mechanisms.

The disk 493 (Fig. 61) retains the engaging mechanism for the multiplier segments 105 in non-add or neutral position at the end of a multiplying operation, and whichever disk 813 or 816 (Figs. 70 and 71) is in control of the engaging mechanism for the add-subtract product accumulator 103 retains said engaging mechanism in neutral of non-add position, therefore rendering unnecessary the use of the non-add bar 299 in connection with these mechanisms.

A spring 930 (Fig. 39) urges the latch 927 counterclockwise to normally maintain a bent-over ear 931 thereof in contact with the top edge of the left arm of the yoke 918. Depressing the multiplication key 131 rocks the yoke 918 clockwise (Fig. 39) to rock the latch 927 out of the path of the projection 928, thus freeing the bar 299 and permitting it to be rocked upwardly by the selector arm segments for the multiplicand storage devices and the add-product accumulators, while said selector arm segments are being spring-urged to adding position in the manner previously explained.

A downward extension 932 of the left arm of the yoke 918 (Figs. 39 and 40) has pivotally connected thereto a link 933 with a stud 934 which extends within an L-shaped slot 935 in an arm 936 secured to the shaft 277. When the multiplication key is not depressed, the stud 934 engages a notch in the arm 929 and is so positioned that it is in alinement with the downwardly extending portion of the L-shaped slot 935. Consequently at this time oscillating movement of the shaft 277 and the arm 936 does not affect the stud 934, the arm 929, or the bar 299. It is therefore evident that in non-multiplying operations of the machine, the latch 927, in cooperation with the projection 928, retains the bar 299 in neutral or non-add position to prevent the four multiplicand storage devices and the add-product accumulator from being engaged with the actuators 100 and 101 (Figs. 62 to 66).

Depressing the multiplication key 131 (Fig. 39) rocks the yoke 918 clockwise to disengage the pawl 927 from the projection 928 and to move the stud 934 forwardly out of the notch in the arm 929 and into the forwardly extending portion of the slot 935. Initial movement clockwise of the shaft 277, the bar 286 and the arm 936 causes said arm to lift the stud 934 to cause said stud in cooperation with an extension 937 of the notch in the arm 929 to rock said arm and the non-add bar 299 clockwise in unison with the shaft 277. This insures that the bar 299 will be moved to ineffective position while the selector arms are being positioned (see spaces XI, XII and XIX Fig. 26). Return movement counterclockwise of the shaft 277 and the arm 936 has no effect upon the arm 929 or the bar 299, which are retained upwardly by the selector arm segments.

The multiplication key 131 is released in the last cycle of a multiplying operation by the mechanism shown in Fig. 44. This mechanism functions while the shaft 277 and the arm 936 are in their clockwise positions (Fig. 39) thus insuring that the horizontal portion of the slot 935 is alined with the notch in the arm 929. Restoration of the multiplication key 131 upwardly by the spring 843 imparts counterclockwise movement to the yoke 918 to reengage the stud 934 with the notch in the arm 929 and to move said stud in alinement with the downwardly extending branch of the slot 935. The pawl 927 due to its flexible connection to the yoke 918 does not interfere with counterclockwise movement of said yoke upon release of the multiplication key even though said pawl 927 is at this time in the path of the projection 928. Return movement counterclockwise of the shaft 277 and the arm 936 returns the arm 929 and the non-add bar 299 counterclockwise in unison therewith to cause said bar to move the selector arm segments for the multiplicand storage devices and the add-product accumulator to neutral position as shown in Figs. 62 to 66. When the projection 928 of the arm 929 moves beyond the pawl 927, the spring 930 restores said pawl to effective position to retain the non-add bar 299 in effective position.

*Zero latch control mechanism*

As explained earlier herein, each denominational row of amount keys has a zero latch 193 (Figs. 29 and 30) which retain their respective actuators 162 in zero position when no amount key is depressed in their respective rows in adding and subtracting operations. In adding and subtracting operations, depression of an amount key rocks the zero latch for that particular denomination to ineffective position and in sub-total and total taking operations all the zero latches are moved to ineffective positions by the bar 200 in cooperation with the detents 190. It will be recalled that the accounting machine actuators 162 and the main actuators 100 of the multiplying unit (see also Fig. 31) always operate in unison, due to the connecting link 236. In order to prevent the zero latches from interfering with the movement of the actuators 100 and 101 of the multiplying unit during a multiplying operation it is necessary to provide mechanism to control the operation of said zero latches during multiplying operations. Such mechanism will now be described in detail.

Directing attention to Fig. 84 and space 26 Fig. 28, secured near the left end of the control shaft 284 is a mutilated disk 938, the periphery of which, in cooperation with the nose of a selector arm 939 loose on the shaft 277, positions a selector arm segment 940, also loose on the shaft 277 and flexibly connected to the selector arm 939 by a spring. A link 941, connecting the segment 940 and a lever 942 loose on the stud 877 in the slide 878, transmits the positioning of the segment 940 to the lever 942. A forwardly disposed arm of the lever 942 has an arcuate surface 943 which cooperates with a stud 944 in the left arm 950 of a yoke 951 rotatably supported by the shaft 144 which extends between the frames 124 and 125. An upwardly extending right arm 952 of the yoke 951 is connected by a link 953 to a downward extension of a zero latch cam arm 954, loose on a stud 966 secured in the right frame 116 of the accounting machine (see also Fig. 30). A right-angled camming edge 967 of the arm 954 cooperates with one end of a plunger 968, slidably supported in a hole in the right frame 116. The other end of the plunger 968 cooperates with the righthand end of the amount key releasing bar 200. A spring 969, tensioned between the arm 950 of the yoke 951 and a stud in the frame 125, urges said yoke 951 clockwise, as viewed in Fig. 84, to normally maintain the cam arm 954 in contact with a stop stud 970 secured in the frame 116.

In cycles F, G and H, it is necessary that the zero latches be controlled by the amount keys, as in these cycles the amount keys 126 are used to enter the multiplicand and the multiplier in the storage devices and add product accumulator of the multiplying unit. In cycles A, B, C, D and E, and in all the actual multiplying cycles, it is necessary to render the zero stop latches ineffective so that the actuators 100 and 101 of the multiplying unit may control the positioning of the accounting machine actuators 162. In either of the final cycles C or E, high portions of the periphery of the disk 938 (see space 26 Fig. 28) position the selector arm 939 (Fig. 84) and its associated segment 940 counterclockwise, which, by means of the link 941, rocks the lever 942 clockwise so that the arcuate surface 943 is out of the path of the stud 944. It is, therefore, evident that in the first multiplying cycle F, when the slide 878 is reciprocated according to the time shown in space XV (Fig. 26) the lever 942 passes under the stud 944 without imparting movement to the yoke 951. Likewise in cycles F and G the disk 938 and associated mechanism retain the lever 942 in ineffective position during cycles G and H so that the zero stop latches will function in the normal manner.

It will be recalled that after the condition set up in cycle G has been performed in the first part of cycle H, the function of positioning of the control disks is shifted from the auxiliary slide 499 to the main slide 507 (Figs. 75 and 76); consequently the control disks are positioned in accordance with the units digit of the multiplier. In all actual multiplying cycles the undercut portion of the periphery of the disk 938 positions the selector arm 939 and the segment 940 clockwise as viewed in Fig. 84, which, by means of the link 941, rocks the lever 942 counterclockwise so that the surface 943 is in the path of the stud 944. Subsequent initial movement forwardly of the slide 878 causes the lever 942 to rock the yoke 951 counterclockwise, which movement by means of the link 953 rocks the cam arm 954 clockwise, as viewed in Fig. 84 and counterclockwise as viewed in Figs. 33 and 35, to shift the plunger 968 and the bar 200 toward the left (Fig. 30). Lefthand movement of the bar 200 rocks the detent 190 clockwise, as viewed in Fig. 30, to release all depressed amount keys and to move the zero latches 193 clockwise out of the path of the projections 194 of the actuators 162, thus allowing the actuators 162 to be positioned under control of the actuators 100 and 101 of the multiplying unit. Return movement rearwardly of the slide 878 allows the spring 969 to return the yoke 951 and the cam arm 954 to normal ineffective position as shown in Fig. 84.

It will be remembered that in the last actual multiplying cycle the control disks are returned to position H, in which position the condition is set up for cycle A. In cycles H, A, B and D, undercut portions of the periphery of the disk 938 in cooperation with the selector arm 939 and associated mechanism rocks the lever 942 in the path of the stud 944 so that during the final cycles A, B and C or A, B, D and E, the zero latches 193 will be moved to ineffective positions.

It is possible to disable the zero latches in the cycles mentioned above because in these cycles some storage device or accumulator of the multiplying unit is engaged with the multiplying unit actuators 100 in either sub-total or total taking operations (see Figs. 1 to 20 inclusive) and consequently control the positioning of said actuators 100 and the accounting machine actuators 162.

*Mechanism to control release of the starting bar during multiplying operations*

Ordinarily the starting bar 132 (Fig. 33) is released and restored upwardly near the end of each cycle of operation of the machine. In multiplying operations, where the machine cycles automatically, it is necessary to control the releasing of the starting bar 132 and this is accomplished by means of control disks in cooperation with selector arm mechanism.

Directing attention to Figs. 33, 37 and 38, the stud 150 in the releasing lever 136 is embraced by a slot in the upper end of a link 946, the lower end of which is pivotally connected to a crank 947 secured on the shaft 904. Also secured on the shaft 904 is an arm 948 connected by a link 949 to a selector arm segment 955 loose on the shaft 277 and carrying a stud 956 adapted to cooperate with a projection on a motor bar control selector arm 958 also loose on the shaft 277 and flexibly connected to the segment 955 by a spring 957. A forwardly disposed nose of the arm 958 cooperates with the periphery of a subtract product disk 959 secured on the shaft 284, which disk controls the releasing of the motor bar 132 when the product is subtracted from the accounting machine accumulators. The stud 956 (Fig. 38) also cooperates with the projection of a selector arm 960, also flexibly connected to the segment 955 by a spring 961. A nose of the selector arm 960 cooperates with the edge of an add-product control disk 962 secured on the shaft 284 and adapted to control the releasing of the motor bar 132 when the product is added in the accounting machine accumulators. The disks 959 and 962 are straddled by the yoke 828 the arms of which, it will be recalled, are loose on the shaft 284. The selector arm segment 955 has a raised surface 963 which cooperates with an extension of the non-add bar 299.

It will be recalled that depressing the motor bar 132 (Fig. 33) rocks the plate 138 counterclockwise against the tension of a spring 141 to rock the lever 136 clockwise to disengage the stud 142 in an extension of said lever from a notch in the clutch control lever 143. The lever 143 is then spring-urged downwardly to engage the motor clutch mechanism to set the machine in motion. When the multiplication key 131 (Figs. 37 and 38) is not depressed, the extension of the bar 299, in cooperation with the surface 963, retains the selector arm segment 955 in neutral position as here shown. When the segment 955 is in neutral position, the slot in the link 946 is positioned in relation to the stud 150 so that it does not interfere in any way with the normal functioning of the lever 136. In other words, the lever 136 is free to move clockwise to release the machine for operation and is free to be restored counterclockwise by the spring 141 to reengage the stud 142 with the notch in the lever 143 when said lever is restored upwardly during the cycle of operation.

The add-control disk 962 (Figs. 37 and 38) is always in control during the first part of a multiplying operation and this control is shifted to the disk 959 by depressing the subtract product key 130 (Figs. 33 and 48), which by means of the pitman 826 imparts clockwise movement to the yoke 828, causing a projection 964 of said yoke to move in the path of the nose of the add selector arm 960, and causing a projection 965 on the right arm of the yoke 828 to move out of the path of the nose of the subtract selector arm 958. This disables the selector arm 960 and enables the subtract selector arm 958. At the end of multiplying operations, the disks 959 and 962 retain the selector arms 958 and 960 in their clockwise positions, while the selector arm segment 955 is returned counterclockwise by the non-add bar 299.

Depressing the multiplication key 131 (Fig. 39) rocks the latch 927 out of the path of the projection 928, thus freeing the non-add bar 299 to the action of the selector arm segment springs 957 and 961 which immediately urge said bar 299 clockwise. However, the segment 955 does not follow the bar 299 upwardly due to the fact that the springs 957 and 961 are not sufficiently strong to overcome the action of the spring 141, which continues to retain the starting bar 132 in undepressed position. Depressing the starting bar 132 then sets the machine in motion and allows the springs 957 and 961 to rock the segment 955 clockwise until the stud 956 engages the projections of the selector arms 958 and 960. The aliner 332, in cooperation with the lower notch in the segment 955, retains said segment in its clockwise position, thereby causing the link 946 to obstruct restoring movement counterclockwise of the lever 136 when the clutch lever 143 is returned upwardly. This prevents the stud 142 from engaging the notch in said lever 143; consequently said lever immediately moves downwardly and thus keeps the machine operating. Notches in the add-product disk 962 (Fig. 38) corresponding to cycles B, F and H, allow the selector arm 960 to move the segment 955 to its counterclockwise position where the aliner 332 will engage the upper notch therein. This causes the arm 948 and the crank 947 to move the link 946 upwardly to its neutral position, as here shown, where the slot in said link will not interfere with the counterclockwise restoring movement of the lever 136.

This positioning of the segment 955 occurs near the end of the cycle of operation and is timed in relation to the movement of the lever 143 so that it does not allow the lever 136 to interfere with the releasing movement of said lever 143 in the cycle corresponding to the notches in the disk 962, but restrains said lever 143 against releasing movement in the cycle immediately following. For example, in cycle B the notch corresponding to this cycle in the disk 962 sets up the condition to cause the machine to cease operation at the end of cycle C, which, it will be recalled, is the last cycle of operation when the product is added in the accounting machine accumulator. The notch corresponding to cycle F causes the machine to cease operation in cycle G, which, it will be recalled, is the time that the multiplier is entered on the keyboard and the notch in the disk 962, corresponding to cycle H causes the machine to cease operation in cycle A to permit depression of the subtract product key 130 (Fig. 34) in case the product is to be subtracted from the accounting machine accumulators.

Depressing the subtract product key 130 shifts the control from the disk 962 to the disk 959 in the manner explained above. The disk 959 differs from the disk 962 in that it has a notch corresponding to cycle D instead of a notch coresponding to cycle B. The notch D causes the machine to cease operation in cycle E, which it will be recalled is the last cycle of operation when the product is subtracted from the accounting machine accumulators.

*Printing mechanism*

In the present machine it is necesasry to provide means to control the printing mechanism during a multiplying operation to prevent unnecessary and possibly undesirable entries from being made on the record material. The mechanism that controls the printing mechanism likewise controls the add-engaging mechanism for the accounting machine accumulators to prevent said accumulators from being selected for adding operations during certain parts of a multiplying operation, irrespective of whether or not the traveling carriage is in position to select said accumulators. Such mechanism will now be described in detail.

The printer mechanism is controlled in multiplying operations by a disk 971 (Figs. 85, 88, and 89 and space 25 Fig. 28) secured on the shaft 284. The mutilated periphery of said disk 971 is adapted to cooperate with the nose of a selector arm 972 loose on the shaft 277 and flexibly connected to its associated selector arm segment 973, also loose on the shaft 277. The lower end of a link 974 is connected to the segment 973 while the upper end of said link is bent U shaped to clear the gear 232 (Fig. 33) which meshes with gear 145 (Figs. 85 and 89). The bent-over upper end of the link 974 carries a stud 975 which extends within a vertical slot 976 in an arm 977 loose on a stud 978 secured in the right frame 116. The stud 975 is arranged to cooperate with the upper hook shaped end of an arm 979 (see also Figs. 86 and 87) and the upper end of an arm 980, both of said arms being loose on the stud 978. The arms 979 and 980 have respectively, in forward extensions thereof, angular slots 981 and 982 through which extends a stud 983 in a pitman 984 mounted for horizontal sliding movement by means of slots in each end thereof in cooperation with the stud 978 and a reduced portion of the main drive shaft 146. The stud 983 extends through the pitman 984 and carries a roller 985 which cooperates with a camming groove 986 cut in the inside face of the gear 145.

The gear 145 makes one counterclockwise revolution, as viewed in Fig. 85, each cycle of machine operation. Rotation of the gear 145, by means of the cam groove 986 (space XXI Fig. 26), shifts the pitman 984 first rearwardly then back to normal position, as here shown. Movement rearwardly of the pitman 984, by means of the stud 983 in cooperation with the angular slots 981 and 982 rocks the arm 979 counterclockwise and the arm 980 clockwise to cause the upper ends of said arms to move away from each other in scissors fashion. Return movement forwardly of the pitman 983 causes the upper ends of said arms to move toward each other and come to rest in the position in which they are shown in Fig. 85.

The segment 973 (Fig. 85) has three positions, a neutral position, an adding and printing position, and a non-adding and non-printing position, as indicated by the three notches in said segment which cooperate with the aliner 332. During non-multiplying operations the neutral or non-add bar 299 retains the segment 973 in its intermediate or neutral position. This, by means of the link 974, positions the stud 975 midway the hook-shaped upper end of the arm 979 and the upper end of the arm 980, as here shown, and as said stud is not in the path of either of these arms it is therefore not actuated by their scissors movement.

A spring 987 (Figs. 85, 86 and 88), one end of which is connected to a stud 988 in the arm 977, is tensioned to urge said arm clockwise into contact with a stationary stud 989 in the frame 116. A link 990 connects the upper end of the arm 977 to a printer operating link 991, the upper end of which is connected to an arm 992, flexibly connected to an arm 993 secured to the printer drive shaft 181. The lower end of the link 991 has therein a notch which cooperates with a stud 994 in a cam lever 995 loose on the stud 978. The cam lever 995 carries rollers 996 and 997 which cooperate respectively with companion plate cams 998 and 999 secured on the main drive shaft 146 (see also Fig. 87). Each revolution of the main drive shaft 146 causes the cams 998 and 999 to oscillate the cam lever 995 first clockwise and then back to normal position as here shown (see space XXII Fig. 26). When the notch in the lower end of the link 991 is engaged with the stud 994, as here shown, oscillation of the lever 995 causes the printer shaft 181 to rock first clockwise and then back to normal position to operate the printing mechanism.

As is characteristic with the multiplying unit, the disk 971 and associated selector arm 972 and segment 973 are positioned in the preceding cycle and the segment is retained in this position, by the aliner 332, during the greater part of the succeeding cycle to perform the condition set up in the preceding cycle. Low portions of the periphery of the disk 971, in cycles H, A, F and all the multiplying cycles, in cooperation with the selector arm 972, allow the segment 973 (space XII Fig. 26) to shift counterclockwise to shift the link 974 downwardly to move the stud 975 in the path of the upper end of the arm 980. Counterclockwise rotation of the gear 145 shifts the pitman 984 forwardly, near the end of machine operation, to rock the arm 980 counterclockwise, which movement by means of the stud 975 is imparted to the arm 977. Counterclockwise movement of the arm 977 by means of the link 990 rocks the link 991 clockwise to disengage said link from the stud 994 in the lever 995 and to engage a notch 1000 therein with a stationary stud 1001. It is therefore obvious that during cycles A, B and G and during all the actual multiplying cycles, the accounting machine printing mechanism will be disabled.

High portions of the periphery of the disk 971, in cycles B, C, D, E and G, in cooperation with the selector mechanism, locate the segment 973 clockwise in adding and printing position. This lifts the link 974 to move the stud 975 upwardly in the path of the hook-shaped upper end of the arm 979. Clockwise movement of the arm 979, upon movement forwardly of the pitman 984 near the end of machine operation, rocks the arm 977 clockwise to engage the notch in the link 991 with the stud 994 in the printer operating lever 995. After the arm 977 is returned clockwise to printing position it is retained therein by the spring 987. However, said spring 987 is not strong enough to shift said arm 977 from non-printing position to printing position. It is therefore apparent that in cycles C, D, E, F and H the link 991 is engaged with the lever 995 and the accounting machine printing mechanism is therefore operative. The printing mechanism is rendered ineffective in cycle E to prevent the printing of the complement as it is transferred to the accounting machine accumulators. This mechanism will be explained later herein.

The disk 971 and associated mechanism also control the add-engaging mechanism for the accounting machine accumulators. A link 1002 (Figs. 85 and 89) pivotally connects the arm 977 to the right arm 1003 of a yoke 1004 which extends from one side of the machine to the other and is turnably supported by a shaft 1005 journaled in the frames 116 and 117. A left arm 1006 of the yoke 1004 has connected thereto one end of a link 1007, the other end of which is slotted to embrace a stud 1008 in a latch 1009 fulcrumed on a stationary stud 1010 in the frame 117. A tooth on the lower end of the latch 1009 cooperates with a right-angled projection 1011 on an add-engaging control lever 1012 pivoted on a stud 1013 (Fig. 90) in the frame 117. A downward extension of the lever 1012 has a roller 1014 which is urged by a spring 1015 into communication with the periphery of a plate cam 1016 secured on the main drive shaft 146. A right-angled extension of the lever 1012 (Fig. 89) has a plurality of vertical slots 1017 adapted to receive the engaging pitmans for the four accumulators of the accounting machine.

Inasmuch as the selecting and engaging mechanism for each of the four accounting machine accumulators is substantially the same, it is thought sufficient for the purpose of this specification to describe this mechanism in connection with the #2 accumulator. An engaging pitman 1018 for the #2 accumulator (Figs. 89, 90 and 91) is supported in one of the slots 1017 in the lever 1012. The rearward end of the pitman 1018 is pivotally connected to an arm 1019 fulcrumed on a stud 1020 in the left frame 117. The arm 1019 is bifurcated to straddle a stud 1021 in a crank 1022 secured to the #2 accumulator engaging shaft 1023 journaled in the frames 116 and 117. Secured on the engaging shaft 1023 are two symmetrical engaging cams 1024 with identical camming slots adapted to receive rollers mounted on each end of the shaft which supports the #2 accumulator wheels 169.

It will be recalled that the #2 accumulator shaft is supported in a rockable frame and that the wheels of the #2 accumulator are arranged to rock into and out of engagement with teeth in the lower edge of the actuator racks 162.

When the traveling carriage is tabulated to a predetermined columnar position, a lug on one of the tappets or control elements 157 (Figs. 29, 89 and 91) rocks the hanging bar lever 158 for the #2 accumulator counterclockwise, as viewed in Fig. 89. Counterclockwise movement of the lever 158 by means of a link 1025, connected between the lefthand end of said hanging bar lever and a rearward extension of a latch 1026 fulcrumed on a stud 1027 secured in the frame 117, imparts clockwise movement as viewed in Fig. 91, to said latch 1026 to disengage a bent-over ear 1028 thereof from a tooth in an upward extension of the pitman 1018. Initial movement clockwise of the main shaft 146 and the cam 1016 (Fig. 90) allows the spring 1015 to rock the lever 1012 counterclockwise to lower the pitman 1018 (see also Fig. 91) to engage a notch 1029 in the lower edge thereof with a half-round stud 1030 in a cam lever 1031 turnably mounted on a stud 1032 in the left frame 117. The cam lever 1031 carries two rollers 1033, which cooperate with the peripheries of companion plate cams 1034 and 1035 secured on the main drive shaft 146.

The contours of the cams 1034 and 1035 are such that after the actuators 162 have completed their initial movement rearwardly, the plate 1031 is rocked clockwise, which, by means of the stud 1030 in cooperation with the notch 1029, shifts the pitman 1018 forwardly to rock the arm 1019 counterclockwise. As the pitman 1018 moves forwardly it is guided and retained in engagement with the stud 1030 by a notch 1048 in the forward end of said pitman embracing a square stud 1049 in a lever 1050 pivoted on a stud 1051 in the frame 117. A torsion spring 1052 retains the lever 1050 in home position for reasons not pertaining to the present case. Counterclockwise movement of the arm 1019 rocks the crank 1022, the shaft 1023 and the cams 1024 clockwise. Clockwise movement of the cams 1024 by means of the symmetrical cam slots therein rock the wheels 169 of the #2 accumulator upwardly into engagement with the actuators 162. After the actuators 162 complete their forward movement to actuate the wheels of the #2 accumulator, return movement counterclockwise of the lever 1031 (see space 23 of the time chart, Fig. 26) shifts the pitman 1018 rearwardly to rock the cams 1024 counterclockwise to disengage the wheels of the #2 accumulator from the actuators 162.

After the aligner 332 (Fig. 85) has been disengaged from the segment 973 and said segment and its associated selector arm 972 have been located in counterclockwise position by a low portion of the periphery of the disk 971, the cam groove 986 (see space XXI, Fig. 26) shifts the pitman 984 forwardly to rock the scissors arm 980 counterclockwise, which movement by means of the stud 975 imparts counterclockwise movement to the arm 977. Counterclockwise movement of the arm 977 by means of the link 1002 rocks the yoke 1004 clockwise to cause the link 1007 to rock the latch 1009 clockwise to move the tooth thereof in the path of the projection 1011 of the lever 1012 (Figs. 89 and 90).

By observing spaces XII and XXI of the chart Fig. 26 and Figs. 85 and 90, it will be seen that the latch 1009 is moved into the path of the projection 1011 before the lever 1012 is returned upwardly at the end of machine operation. A flexible connection between the latch 1009 and the link 1007 formed by the slot in the lower end of said link in cooperation with the stud 1008 and a spring 1036 stretched between said link and a rearward extension of the latch 1009, allows the projection 1011 to by-pass the tooth of the latch 1009 when the lever 1012 is returned upwardly to normal position.

In the printer controlling mechanism, the condition is set up in the one cycle and performed in the next succeeding cycle, as is the case with the other controlling mechanisms for the multiplying unit. Consequently in the cycle following the one in which the controlling condition is set up, the latch 1009 obstructs downward movement of the lever 1012 to prevent the pitman 1018 (Fig. 91) from engaging the stud 1030 in the lever 1031, when the latch 1026 has been disengaged from the tooth in the upper end of the pitman 1018 in the manner explained above. It is therefore obvious that the add controlling mechanism works in conjunction with the printer controlling mechanism and disables and enables the add-engaging mechanism simultaneously with the disabling and enabling of the printer mechanism.

*Automatic tabulating mechanism*

Pivoted on the upper end of the link 991 (Fig. 85) is a tabulating hook 1037 spring-pulled clockwise to normally maintain a bent-over ear of said hook in contact with a projecting surface of the link 991. When the link 991 moves upwardly the beveled upper end of the hook 1037 rides over a stud 1038 in a tabulating lever 1039 slotted to receive a tabulating lever 1040. Downward movement of the link 991 causes the hook 1037 in cooperation with the stud 1038 to pull the tabulating lever 1039 downwardly, which movement by means of the lever 1040 in cooperation with a beam 1053 (Fig. 89) releases the carriage escapement mechanism and raises a tabulating stop plunger 1054 in the path of a lug on the tappet 157 to tabulate the traveling carriage from one columnar position to the next.

The stud 1038 is normally protected from the hook 1037 by the rounded forward end of a tabulating control bar 1041 fulcrumed in a horizontal slot in a stud 1042 secured in the right frame 116. The bar 1041 is spring-urged inwardly to normally maintain the rounded forward end thereof in the path of the hook 1037. A tabulating control lever 1043 (Fig. 1) is pivoted on a stationary stud (not shown). The upper end of the lever 1043 protrudes through an aperture in the keyboard plate 133 and provides a fingerpiece for shifting said lever to any of its three positions.

Moving the lever 1043 to its #1 or upper position rocks the tabulating control bar 1041 outwardly to move the forward end thereof out of the path of the hook 1037. This permits the hook 1037 in cooperation with the stud 1038 to automatically tabulate the traveling carriage in the manner explained above. Moving the control lever 1043 to its #2 or #3 position moves the forward end of the control bar 1041 inwardly in the path of the hook 1037 to disable the automatic tabulating feature.

The tabulating mechanism described briefly above is fully explained in the co-pending application for Letters Patent of the United States, Serial Number 732,252 filed June 25, 1934 by Raymond A. Christian, and which issued as Patent No. 2,082,098 on June 1, 1937.

OPERATION OF MACHINE

One of the outstanding features of the machine of this invention is that it is adapted to write and compute an invoice or bill in one operation, in comparison with the usual method of first figuring a bill and afterwards copying the bill on a typewriter. This makes for efficiency, as a bill may be written and computed in perhaps less time than it takes to copy a previously figured bill, thus saving the time and cost of figuring.

Fig. 2 shows a facsimile of a typical invoice or bill prepared on the machine of this invention, and a statement of operation will be given, using this bill as an example. In this particular example the John Doe Supply Company, wholesalers of hardware, have sold to Richard Roe, a retail hardware merchant, a bill of goods comprising fourteen dozen shovels at $15.00 a dozen, eight wheelbarrows at $3.50 each and ten dozen pocket knives at $4.50 per dozen. An invoice or bill of these goods is made out, generally in duplicate, and the original copy is forwarded to Richard Roe and the duplicate retained by the John Doe Supply Company.

The bill illustrated in Fig. 2 has six vertical columns headed respectively, Quantity, Description, Unit price, Gross amount, Credit and Net amount. In the column headed Quantity the number of items is entered. In the column headed Description a description of the item is typed by means of the typewriter 151 (Fig. 1). In the column headed Unit price the price per article or per dozen articles, etc., is entered during the computation of the bill. In the Gross amount column the product of the unit price times the quantity is entered, as also is a sub-total of the entire gross amount. In the Credit column all credits in favor of the retail merchant are entered. Such credits may consist of, for example, balance due for goods returned, initial down payment on a bill of goods, and customary discounts for retail merchants. During the computation of the bill these credits are subtracted from the gross amount and the net amount is entered in the Net amount column.

Figure 5:
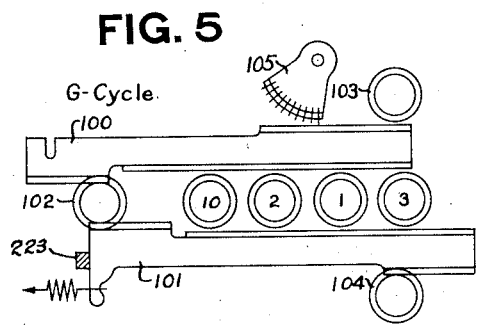

In computing this particuler bill the operator first feeds and adjusts the duplicate bill and its interposed carbon paper around the platen roll and makes sure that the traveling carriage is in its extreme righthand or starting position. First the quantity (14) of the first item is entered on the accounting machine keyboard, and the repeat key 128 and the multiplication key 131 are depressed, after which the machine is set in motion by depressing the motor bar 132. The machine operates through cycles F and G to enter the quantity (14) and the multiples of this amount, which is in this case the multiplicand, in the storage devices and add-product accumulator of the multiplying unit and if desired this amount may be also entered in one or more of the accounting machine accumulators. In this instance the repeat key is used to prevent the amount keys from being released at the end of the first cycle of operation, in order that the quantity or multiplicand may be entered twice in the add-product accumulator 104 (Figs. 4 and 5). At the end of cycle G the machine comes to rest to provide time for the operator to type in the description of the item and set up the price on the amount keys. The operator next tabulates the traveling carriage from the Quantity column of the bill to the Description column by depressing the typewriter tabulating lever 152 (Fig. 1) and types the description ("Doz. shovels") on the bill. After typing the description the operator depresses the return bar 201 to return the traveling carriage toward the right to aline the Unit price column of the bill with the accounting machine type carriers. Next the multiplier or unit price—$15.00—is set up on the accounting machine keyboard and the machine set in motion by depressing the starting bar 132. The machine cycles automatically to multiply the quantity by the unit price.

During the actual multiplying cycles the control disk 971 and associated mechanism (Fig. 85) cripples the accounting machine printing mechanism and the add engaging mechanism for the accounting machine accumulator. This prevents the result of the different steps of multiplication from being entered upon the bill and likewise prevents these amounts from being added in the accounting machine accumulators. The Unit price column of the bill remains alined with the accounting machine type carriers during this stage of the multiplying operation. When multiplication is finished the machine comes to rest and the operator tabulates the traveling carriage by depressing the accounting machine tabulating key 153 to move the Gross amount column of the bill into printing position. The machine is again set in motion by depressing the starting bar, and operates through two cycles (B and C) to print the product or gross amount—$210.00—in the Gross amount column. When the traveling carriage is tabulated to the Gross amount column, one of the tappets 157 (Fig. 29) in cooperation with the No. 2 hanging bar lever 158 selects the #2 accounting machine accumulator for addition, so that the gross amount will be stored in said accumulator.

The operator line spaces the bill and repeats the above procedure until all the items have been listed and computed. After the gross amount of the last item has been printed the operator linespaces the bill and takes a sub-total from the #2 accounting machine accumulator by depressing the #2 total key, the sub-total key and the starting bar 132. This causes the sub-total, $283.00, of the gross amount to be printed in the Gross amount column.

In this case the retail merchant, Richard Roe, is allowed a discount of 25% and this is computed in the following manner:

The operator alines the Description column of the bill with the printing point of the typewriter by depressing the typewriter tabulating lever 152. Next the entry "Less 25%" is typed in the Description column and the amount of the discount—25%—is set up on the accounting machine keyboard, the repeat key 128 and multiplication key 131 depressed, and the machine released for operation by depressing the starting bar 132. When the Description column is alined with the typewriter printing point a non-print tappet (not shown) on the traveling carriage in cooperation with a non-print bail (not shown) disables the accounting machine type carriers to prevent a duplicate printing of the discount.

After the amount of the discount has been entered in the multiplying unit, the machine comes to rest. The operator then sets up the multiplier, or gross amount of the bill, 283, on the accounting machine keyboard and again starts the machine operating by depressing the starting bar. During multiplication the Description column remains alined with the typewriter printing point; consequently the accounting machine printing mechanism remains ineffective, and the gross amount set up on the keys, 283, will not be printed.

After multiplying is complete, the operator returns the traveling carriage by depressing the return bar 202 to aline the Credit column of the bill with the accounting machine type carriers. Next the tabulating control lever 1043 (Fig. 85) is moved to No. 1 or automatic tabulating position, the subtract product key 130 depressed, and the machine placed in operation by depressing the starting bar 132. In this case the machine operates through three cycles, B, D and E, (see also Figs. 17, 19 and 20), to subtract the discount from the gross amount.

In cycle B (Fig. 17) the control disk 971 and associated mechanism continue to disable the accounting machine printing and adding engaging mechanisms to prevent the amount in the product accumulator 103 from being printed and added. In cycle D (Fig. 19) when the positive amount of the discount is subtracted from the zeroized add-subtract product accumulator 103, the control disk mechanism enables the printing and adding engaging mechanisms; consequently during cycle D the positive amount of the discount ($70.75) will be printed in the Credit column and if desired, this amount also may be stored in one of the accounting machine accumulators selected by means of one of the control elements 157 in cooperation with the add hanging bar lever 158 of the desired accumulator.

At the end of cycle D the traveling carriage tabulates automatically to a position intermediate the Credit and Net amount columns. In this position a tappet on the traveling carriage, in cooperation with the non-print bail, disables the accounting machine printing mechanism and another tappet in cooperation with the add hanging bar lever 158 for the #2 accumulator selects said totalizer for addition. It is therefore obvious that in the final cycle E the negative amount of the discount will be added in the #2 accumulator, which it will be recalled contains the gross amount of the bill. The machine comes to rest at the end of cycle E and the operator alines the Net amount column of the bill with the accounting machine type carriers by depressing the accounting machine tabulating key 153. This enables the accounting machine printing mechanism, and the net amount $212.25 is printed in the Net amount column by taking a total or a sub-total, as desired, from the #2 accounting machine accumulator.

The system outlined above is merely one suggestion for the use of the machine of this invention. It is not the desire to limit the use of this machine to any one system or to any particular line of business, as the flexibility of this machine makes it easily adaptable for use in connection with almost any present day business system.

While no cabinet or casing has been shown either in connection with the accounting machine or the multiplier unit, the usual Ellis casing may cover the accounting machine and the same type of casing may be used to cover the multiplier unit.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In an accounting machine, the combination of a plurality of accumulators; recording means; accounting machine actuators for causing differential operation of the accumulators and the recording means; keys to control the positioning of the accounting machine actuators; means to store multiples of a multiplicand; means to store a multiplier; actuators for the two storing means; means connecting the actuators for the storing means to the accounting machine actuators for unitary movement therewith to transmit data from the accounting machine actuators to the storing means and vice versa; means to initiate a multiplying operation; cycle control means rendered operable by the initiating means to control the operation of both actuators and the storing means to cause multiples of a multiplicand previously set up on the keys to be formed in the multiplicand storing means by the storing means actuators and to cause a multiplier later set up on the keys to be entered in the multiplier storing means by said storing means actuators; said multiples being equal to the multiplicand times predetermined digits of a notations; means to successively interpret each denominational digit of the multiplier and select the multiplicand storing means containing the multiples of the multiplicand corresponding to each multiplier digit as it is interpreted; means to accumulate the multiples of the multiplicand corresponding to the digits of the multiplier to obtain a product; and means in said cycle control means to cause the product to be transferred from a part of said product accumulating means to the accumulators of the accounting machine and to be simultaneously recorded.

2. In a machine of the class described, the combination of means to store multiples of a multiplicand; means to store a multiplier; means to interpret each denominational digit of the multiplier and select for a sub-total operation the multiplicand storage means containing the multiplicand multiple which corresponds to or the multiplicand multiples whose sum or difference correspond to the multiplicand times each digit of the multiplier as it is interpreted; two registering devices for accumulating the multiples of the multiplicand as the multiplicand storage means are operated in a sub-total operation; means rendered effective to operatively connect one registering device to the multiplicand storage means; means rendered effective to operatively connect the other registering device to the multiplicand storage means; means to control the operation of the multiplicand storage devices and the connecting means to perform said sub-total operation; means to shift certain of the multiplicand storage means from one connecting means to the other; and means to couple the connecting means for unitary movement.

3. In a machine of the class described, the combination of means to store a multiple of a multiplicand; two accumulators to accumulate multiples of the multiplicand to obtain a complete product; actuating means for one of the accumulators; actuating means for the other accumulator; means to control the operation of the storage means; means to couple the two actuating means for joint operation to cause the multiple contained in the storage means.

4. In a machine of the class described, the combination of means to store ten times a multiplicand; means to store three times a multiplicand; means to store a multiplier; means cooperating with the multiplier storage means to interpret each denominational digit of the multiplier; an adding register to accumulate multiples of the multiplicand; an adding and subtracting register to accumulate multiples of the multiplicand; control means settable by said interpreting means; and automatic means rendered effective by the control means when an interpreted digit of the multiplier is seven to control both the multiplicand storage means to cause ten times the multiplicand to be added in the adding register and three times the multiplicand to be subtracted from the adding and subtracting register so that the combined amounts in the two registers equal seven times the multiplicand.

5. In a machine of the class described, means to store multiples of a multiplicand; means to store a multiplier; means to accumulate multiples of the multiplicand to obtain a complete product; means to transmit multiples of the multiplicand from the multiplicand storage means to the accumulator means; the combination of a shiftable carriage to support the multiplier storage means and the accumulator means; means to shift the carriage step by step as multiplying progresses to move the accumulator means to higher denominations relative to the transmitting means; means to determine the highest order significant digit in the multiplier storage means; and means cooperating with the determining means to control the shifting of the carriage.

6. In a machine of the class described, means to store multiples of a multiplicand; means to store a multiplier; means to accumulate multiples of the multiplicand to obtain a complete product; means to transmit multiples of the multiplicand from the multiplicand storage means to the accumulating means; the combination of a shiftable carriage to support the multiplier storage means and the accumulating means; means to shift the carriage step by step as multiplying progresses to move the accumulating means from lower to higher denomination with respect to the transmitting means; means settable before the first multiplying cycle, to determine the number of multiplying cycles in accordance with the digits in the multiplier storage means; and means whereby the determining means controls the step by step shifting means as multiplication progresses.

7. In a machine of the class described, the combination of means to store a multiplier; means to interpret each denominational digit of the multiplier; means to move the multiplier storage means relatively to the interpreting means to permit interpretation of each denominational digit of the multiplier; and means, including a shiftable member settable to one of a plurality of different positions depending upon the highest denominational order containing a significant digit, cooperating with the multiplier storage means to control the moving means to cause the movement of the moving means to correspond to the number of denominational digits set up in the multiplier storage means.

8. In a machine of the class described, the combination of means to store a multiplier; means cooperating with the multiplier storage means to interpret each denominational digit of the multiplier; means to move the multiplier storage means relatively to the interpreting means to permit successive interpretation of each denominational digit of the multiplier; means cooperating with the multiplier storage means, including a shiftable member settable to one of a plurality of different positions depending upon the location of the highest denominational significant digit, to control the number of operations of the moving means to cause the movement of the moving means to correspond to the number of denominational digits in the multiplier; and means whereby the cooperating means renders the interpreting means ineffective to cooperate with the multiplier storage means after all the digits of the multiplier are interpreted.

9. In a machine of the class described, the combination of means to store a multiplier; a carriage to support the multiplier storage means; means to interpret each denominational digit of the multiplier; means to impart step by step movement to the carriage as multiplying progresses to permit the interpretation of each denominational digit of the multiplier; means cooperating with the multiplier storage means to determine the number of digits in the multiplier; means governed by the determining means to control the imparting means; and means rendered effective by the determining means to move the interpreting means to a neutral position after all the digits of the multiplier are interpreted.

10. In a machine of the class described, the combination of means to store denominational digits of a multiplier; a shiftable carriage to support the multiplier storage means; means to interpret each denominational digit contained in the storage means; means to move the carriage step by step relatively to the interpreting means as multiplication progresses to interpret each denominational digit of the multiplier; means to shift the storage means independently of the carriage after the lowest order denominational digit of the multiplier has been interpreted; and means cooperable with the shifted multiplier storage means to control the operation of the step by step moving means to cause the movement of the carriage to correspond to the number of digits in the multiplier.

11. In a machine of the class described, the combination of means to store the denominational digits of a multiplier; means to accumulate multiples of a multiplicand corresponding to each denominational digit of the multiplier to obtain a complete product; means to interpret each denominational digit of the multiplier; means to actuate the accumulator means; a shiftable carriage to support the storage means and accumulator means; means to shift the carriage step by step to move the storage means and the accumulator means in relation to the interpreting means and the actuating means from lower to higher denomination as multiplication progresses; means cooperating with the multiplier storage means to determine the number of digits in the multiplier; and means controlled by the determining means and cooperating with the shifting means to terminate the step by step movement of the carriage when the interpreting means has interpreted all the digits in the multiplier.

12. In a multiplying machine, the combination of means to control the operation of certain elements of the machine in multiplying operations; means to position the controlling means during a part of a multiplying operation; an escapement device to operate the positioning means; other means to position the controlling means to positions corresponding to the numerical value of the digit in each denomination of the multiplier during another part of a multiplying operation; and means whereby the controlling means governs the effectiveness of the two positioning means and the escapement means.

13. In a machine of the class described, the combination of means including a plurality of mutilated disks to control the functions of the machine in multiplying operations; means to position the disks during a part of a multiplying operation; means including a reciprocating member to position the disks commensurate with the numerical value of each denominational digit of the multiplier during another part of a multiplying operation; and means governed by the controlling means to alternatively render one positioning means effective and the other positioning means ineffective during a multiplying operation.

14. In a multiplying machine, the combination of a control shaft; instrumentalities on said shaft; sensing means cooperating wtih the instrumentalities to control all the functions of the machine in multiplying operation; and means including an escapement device and a sensing mechanism to position the shaft and the instrumentalities.

15. In a machine of the class described, the combination of a control shaft; instrumentalities on said shaft; sensing means cooperating with the instrumentalities to control all the functions of the machine in multiplying operations; means to position the shaft and the instrumentalities during certain parts of a multiplying operation; means to position the shaft and the instrumentalities during another part of a multiplying operation and means cooperating with the instrumentalities on the shaft for selectively rendering one or the other positioning means effective to position the shaft.

16. In a machine of the class described, the combination of a control shaft; instrumentalities on said shaft; sensing means cooperating with the instrumentalities to control all the functions of the machine in multiplying operations; means to store a multiplier; means cooperating with the storage means to interpret each denominational digit of the multiplier; means whereby the interpreting means positions the control shaft and the instrumentalities during interpretation of the multiplier digits; and means to position said shaft and the instrumentalities during the remainder of a multiplying operation.

17. In a machine of the class described, the combination of a control shaft; instrumentalities on said shaft; sensing means cooperating with the instrumentalities to control the functions of the machine in multiplying operations; means to store a multiplier; means cooperating with the storage means to interpret each denominational digit of the multiplier; means connecting the interpreting means to the control shaft to position said shaft and the instrumentalities commensurate with the numerical value of each denominational digit as it is interpreted; means adapted to cooperate with the connecting means to position the shaft and instrumentalities at all other times during a multiplying operation; and means controlled by the shaft and instrumentalities to engage the interpreting means and the positioning means with the connecting means in proper sequence during a multiplying operation.

18. In a machine of the class described, the combination of means to store multiples of a multiplicand; means to store a multiplier; means to accumulate multiples of the multiplicand to obtain a complete product; means to enter amounts in said storage means and accumulating means; means to control the functions of the machine during multiplying operations; means to position the controlling means during part of the multiplying operation to control the operation of the storage means, the accumulators, and the entering means to cause the multiples of the multiplicand to be formed and entered in their storage means and to cause the multiplier to be entered in its storage means; and means including a device cooperating with the multiplier storage means to interpret each denominational digit of the multiplier to position the controlling means during another part of the multiplying operation to control the operation of the multiplicand storage devices, the accumulating means, and the entering means to cause the multiple of the multiplicand corresponding to the denominational digit being interpreted to be entered in the accumulating means.

19. In a machine of the class described, the combination of means to enter multiplicand and multiplier data; means to store multiples of a multiplicand; means to store a multiplier; means to accumulate multiples of the multiplicand to obtain a complete product; differential mechanism cooperable with said storage means and accumulating means; means to control the functions of the machine during a multiplying operation; an escapement device to position the controlling means during part of a multiplying operation to control the operation of the storage means, accumulating means, and differential mechanism to cause multiples of the multiplicand to be formed and entered in the multiplicand storage means and the multiplier to be entered in the multiplier storage means under control of the entry means; means cooperating with the multiplier storage means to interpret each denominational digit of the multiplier to position the controlling means during another part of the multiplying operation to control the operation of the multiplicand storage means, accumulating means, and differential mechanism to cause the multiple of the multiplicand corresponding to the denominational digit of the multiplier being interpreted to be entered in the accumulator means; and means whereby the controlling means shifts the control of the positioning of said controlling means from the escapement device to the means cooperating with the multiplier storage means during a multiplying operation.

20. In a machine of the class described, the combination of means to release the machine for operation; means to restore the releasing means during each machine operation; manipulative means to set the machine to perform a multiplying operation; means including a plurality of mutilated disks and a sensing device to control the restoring means in multiplying operations; and means released by said manipulative means to render the sensing device effective to control the restoring means.

21. In a machine of the class described, capable of various operations requiring one cycle of movement and capable of multiplying operations requiring several cycles of movement, the combination of means to release the machine for all types of operations; means to restore the releasing means during each cycle of operation; means to control the functions of the machine in multiplying operations; means to initiate a multiplying operation and render the controlling means effective; means operated by the controlling means to govern the restoring of the releasing means in multiplying operations to effect automatic cycling of the machine; a member with notches therein said member adapted to be positioned by the controlling means; and means cooperating with the member to retain the initiating means effective during a multiplying operation.

22. In a multiplying unit for an accounting machine, the combination of an add-subtract accumulator for accumulating portions of products; carrying mechanism for said accumulator; means to shift the carrying mechanism from add to subtract position; means including a mutilated disk and sensing means cooperating therewith; and means controlled by the sensing means and effective when the disk is in certain positions to render the shifting means effective.

23. In an accounting machine having a plurality of accumulators and a multiplying attachment, the combination of an add-subtract product accumulator for the multiplying attachment, said accumulator adapted to accumulate portions of a product; means to control the add-subtract product accumulator when the product is to be entered positively in the accounting machine accumulators; means to control said product accumulator when the product is to be entered negatively in the accounting machine accumulators; means to alternatively render one controlling means effective and the other controlling means ineffective; and manipulative means to shift the rendering means.

24. In a multiplying attachment for an accounting machine, the combination of an add-subtract accumulator for accumulating portions of products to obtain a complete product; carrying mechanism for said accumulator; means to shift the carrying mechanism from adding to subtracting position; a mutilated disk; means to position the disk; and means cooperating with the disk to render the shifting means effective when the disk is in certain positions.

25. In an accounting machine having a multiplying attachment, the combination of accumulators for the accounting machine; an adding product accumulator for the multiplying attachment; an adding and subtracting product accumulator for said multiplying attachment, both of said product accumulators adapted to accumulate portions of a product; means to actuate the product accumulators and the accounting machine accumulators, said actuating means also adapted to transmit amounts from the product accumulators to the accounting machine accumulators; means to control the engaging of the adding and subtracting product accumulator with the actuating means when the product is to be entered negatively in the accounting machine accumulators; means to control the engaging of the adding product accumulator with the actuating means said means having one sequence of movement when the product is entered positively in the accounting machine accumulators and another sequence of movement when the product is entered negatively in the accounting machine accumulators; shiftable means to alternately render one controlling means for the adding and subtracting product accumulator effective and the other controlling means for said adding and subtracting product accumulator ineffective; and means to shift the shiftable means and govern the sequence of movement of the controlling means for the adding product accumulator.

26. In an accounting machine having a multiplying unit; the combination of accumulators for the accounting machine; an adding product accumulator for the multiplying unit; an adding and subtracting product accumulator for said multiplying unit, both of said accumulators adapted to accumulate portions of a product; means to actuate the product accumulators and the accounting machine accumulators, said actuating means also adapted to transmit amounts from the product accumulators to the accounting machine accumulators; means to engage the adding and subtracting product accumulator with the actuating means; means to control the engaging means for the adding and subtracting product accumulator when the product is to be entered positively in the accounting machine accumulators; means to control said engaging means when the product is to be entered negatively in the accounting machine accumulators; means to engage the adding product accumulator with the actuating means; means to control the adding product accumulator engaging means, said second means having one sequence of movement when the product is entered positively in the accounting machine accumulators and another sequence of movement when the product is entered negatively in the accounting machine accumulators; shiftable means to alternatively render one controlling means for the add-subtract product accumulator effective and the other controlling means for said product accumulator ineffective; and manipulative means to operate the shiftable means and govern the sequence of movement of the controlling means for the adding product accumulator.

27. In a machine of the class described, the combination of an accumulator; actuators therefor; means to engage the accumulator with and disengage said accumulator from the actuators; means including a plurality of oscillating rods to operate the engaging means; means connecting the operating means to the engaging and disengaging means; a mutilated disk; means to position the disk; and means governed by the disk to cause the connecting means to be moved to any one of a plurality of positions where it can be engaged by one or more of said rods.

28. In a machine of the class described, the combination of an accumulator capable of adding, subtracting, totaltaking and sub-totaltaking operations; actuators for said accumulator; means to engage the accumulator with and disengage said accumulator from the actuators; means to operate the engaging and disengaging means in totaltaking and subtracting operations, said means also adapted to operate the engaging means in sub-totaltaking operations to engage the accumulator with the actuators; means to operate the engaging means in adding operations to engage the accumulator with the actuators; means to operate the engaging means in sub-totaltaking and adding operations to disengage the accumulator from the actuators; means selectively positionable to any one of a plurality of positions to connect the engaging means to one or more of said engaging means operating means depending upon the type of operation being performed.

29. In a machine of the class described, the combination of a plurality of storage devices to store multiples of a multiplicand; a storage device to store a multiplier; means to enter amounts in the several storage devices; means including a member common to all the storage devices to reset said storage devices to zero; means to operate the member; a mutilated disk; means to position the disk during a multiplying operation; and means controlled by the disk to connect the operating means to the member.

30. In a machine of the class described, the combination of a shiftable frame; an accumulator mounted in the shiftable frame; two sets of actuators for the accumulator; a member to shift the accumulator into alinement with one set of actuators; an element to shift the accumulator into alinement with the other set of actuators; means to operate the member and the element; and means including a plurality of mutilated disks and mechanism governed thereby to connect the member and the element to the operating means.

31. In a machine of the class described, the combination of a laterally shiftable frame; an accumulator mounted in the shiftable frame; two sets of actuators for said accumulator; a member to shift the accumulator into alinement with one set of actuators; an element to shift the accumulator into alinement with the other set of actuators; means to operate the element and the member; means to connect the member to the operating means; means to connect the element to the operating means; a mutilated disk for each of the connecting means; means to position the disks in multiplying operations; means controlled by one of the disks to engage the connecting means for the member with the operating means; and means controlled by the other disk to engage the connecting means for the element with the operating means.

32. In a machine of the class described, the combination of a shiftable carriage; resilient means to urge the carriage away from starting position; escapement means to control the movement of the carriage under the influence of the resilient means; a member on the carriage; means cooperating with the member to return the carriage to starting position; means to operate the returning means; means to connect the returning means to the operating means; and means including a mutilated disk and mechanism governed thereby to control the engagement of the connecting means with the operating means.

33. In a machine of the class described, the combination of a shiftable carriage; resilient means to urge the carriage away from starting position; escapement means to control the movement of the carriage under influence of the resilient means; a member on the carriage; means cooperating with the member to return the carriage to starting position; means to operate the returning means; means to connect the returning means to the operating means, said connecting means normally disconnected from said operating means; a mutilated disk; means to position the disk during multiplying operations; and means cooperating with the disk and governed thereby to control the engagement of the connecting means with the operating means.

34. In a machine of the class described, the combination of a shiftable carriage; resilient means to urge the carriage laterally in one direction; escapement means to control the movement of the carriage under influence of the resilient means; a device to store denominational digits of a multiplier, said device mounted in the carriage; means including bars connected for joint movement to determine the number of denominational digits stored in the multiplier storage device; and means whereby the determining means controls the escapement means to cause the movement of the carriage to correspond to the number of digits in the multiplier.

35. In a machine of the class described, the combination of a shiftable carriage; resilient means to urge the carriage laterally in one direction; escapement means to control the movement of the carriage under influence of the resilient means; a device to store denominational digits of a multiplier, said device mounted in the carriage; two bars connected for joint movement, one of said bars arranged to cooperate with the multiplier storage device to determine the number of digits in the multiplier; and means associated with the other bar to control the escapement means to cause the lateral movement of the carriage to correspond to the number of digits in the multiplier.

36. In a machine of the class described, the combination of a shiftable carriage; resilient means to urge the carriage laterally in one direction; escapement means to control the movement of the carriage under influence of the resilient means; a device to store denominational digits of a multiplier, said device mounted in the carriage; means cooperating with the multiplier storage device to interpret each denominational digit of the multiplier; a horizontal shiftable member arranged to cooperate with the storage device to determine the number of digits in the multiplier; a horizontally shiftable element; means connecting the member and the element for joint movement; means associated with the element to control the escapement means to cause the lateral movement of the carriage to correspond to the number of digits in the multiplier; and means whereby the member moves the interpreting means to a neutral position when all the digits of the multiplier have been interpreted.

37. In a machine of the class described, the combination of a shiftable carriage; resilient means to urge the carriage in one direction; an escapement device to control the movement of the carriage under the influence of the resilient means; a horizontally shiftable member; a horizontally shiftable element; means connecting the member and the element for similar movement; means whereby the member determines the extent of movement of the carriage under influence of the resilient means; and means controlled by the element to render the escapement means inoperative when the carriage has completed the determined extent of movement.

38. In a machine of the class described, the combination of a shiftable carriage; resilient means to impel the carriage in one direction; an escapement device to control the movement of the carriage under influence of the resilient means; means to operate the escapement device; means to store the denominational digits of a multiplier, said storing means mounted in the carriage; means to interpret each denominational digit of the multiplier; a horizontally shiftable member; a horizontally shiftable element; means connecting the member and the element for similar movement; and means whereby the member and the element render the operating means for the escapement device inoperative to determine the movement of the carriage when all the digits of the multiplier are interpreted.

39. In a machine of the character described capable of multiplying operations and having printing mechanism, the combination of means to operate the printing mechanism; means including a member to connect the printing mechanism to the operating means; means to shift the member out of and into engagement with the operating mechanism; a device including companion levers with uniform scissors movement to actuate the shifting means; means connected to the shifting means and positionable relatively to the companion levers to operatively connect said shifting means and the companion levers to control the printing means; and means including a mutilated disk and mechanism cooperating therewith effective during multiplying operations to position the positionable means.

40. In a machine of the character described capable of multiplying operations and having printing means, the combination of a printer drive shaft; means to operate the printer drive shaft; means including a shiftable member connected to the drive shaft and adapted to be shifted out of and into engagement with the operating means; means to shift the member out of and into engagement with the printer operating means; companion levers with uniform scissors movement to operate the shifting means; a reciprocating element to drive the companion levers a regular excursion each cycle of operation; means to operatively connect either of the levers to the shifting means; and means effective in multiplying operations to position the connecting means relatively to the two levers to control the printing means.

41. In a machine of the character described capable of multiplying operations and having a printing device, the combination of means to operate the printing device; means including a shiftable member to connect the operating means to the printing device; means to shift the member out of and into engagement with the operating means; a lever to operate the shifting means to move the member out of engagement with the printer operating means; a lever to operate the shifting means to move the member into engagement with the printer operating means; means to impart uniform scissors movement to the levers each cycle of operation; means to transmit movement of the levers to the shifting means; and means to position the transmitting means relatively to the levers to control the printing device during multiplying operations.

42. In a machine of the character described, having a plurality of accumulators, the combination of means to actuate the accumulators; means to engage the accumulators with the actuating means in adding time; shiftable means operable, when shifted, to disable the add-engaging means; means including companion members with a uniform scissors movement to drive the shifting means; means to transmit the movement of the companion members to the shifting means; and means to position the transmitting means relatively to the companion members to control the engaging mechanism.

43. In a machine of the class described, having a plurality of accumulators, the combination of means to drive the accumulators; means to engage the accumulators with the driving means; means to operate the engaging means; means to connect the engaging means to the operating means; means to retain the connecting means in ineffective position; means to shift the retaining means out of and into retaining position; means including companion levers with a uniform scissors movement to actuate the shifting means; means to transmit the movement of the companion levers to the shifting means; and means to position the transmitting means relatively to the companion levers to control the accumulator engaging mechanism.

44. In a machine of the class described, having a plurality of accumulators and a traveling carriage, the combination of means to actuate the accumulators; means to engage the accumulators with the actuating means; means to operate the engaging means; means controlled by columnar positioning of the carriage to connect the engaging means to the operating means; means to retain the engaging means disconnected from the operating means irrespective of the effectiveness of the connecting means; means to shift the retaining means out of and into retaining position; means comprising companion levers with a uniform scissors movement to actuate the shifting means; means to transmit the movement of the companion levers to the shifting means; and means to position the transmitting means relatively to the companion levers to control the accumulator engaging mechanism.

45. In a machine of the class described, having a plurality of accumulators and a traveling carriage, the combination of means to drive the accumulators; means to engage the accumulators with the driving means; means to operate the engaging means; means controlled by columnar positioning of the carriage to connect the engaging means to the operating means; means to retain the engaging means disconnected from the operating means irrespective of the effectiveness of the connecting means; means to shift the retaining means out of and into retaining position; means to actuate the shifting means; means to transmit the movement of the actuating means to the shifting means; and means to control the transmitting means.

46. In a machine of the class described, having a plurality of accumulators and a traveling carriage; the combination of means to drive the accumulators; means to engage the accumulators with the driving means; means to operate the engaging means; means controlled by columnar positioning of the carriage to connect the engaging means to the operating means; means to retain the engaging means disconnected from the operating means irrespective of the effectiveness of the connecting means; means to shift the retaining means out of and into retaining position; means to actuate the shifting means to move the retaining means out of retaining position; means to actuate the shifting means to move the retaining means into retaining position; means to impart uniform scissors movement to both the actuating means; means to transmit movement of both actuating means to the shifting means; and means to position the transmitting means relatively to the both actuating means to control the accumulator engaging mechanism.

47. In a machine of the class described, having recording means, differential actuators, and a plurality of accumulators, the combination of means to operate the recording means; shiftable means connecting the recording means to the operating means; means to engage the accumulators with the actuators; means to retain the engaging means inoperative; means to move the shiftable means into and out of engagement with the recording operating means, said moving means also adapted to move the retaining means into and out of retaining position; means to drive the moving means; means to transmit the movement of the driving means to the moving means; and means to control the transmitting means.

48. In a machine of the class described, the combination of separate means to store respectively 1, 2, 3 and 10 times a multiplicand; means to accumulate positive amounts; means to accumulate positive or negative amounts; means to store a multiplier; means to interpret each denominational digit of the multiplier; a plurality of selecting disks controlled by the interpreting means; means rendered effective by certain of the disks to cause a sub-total to be taken from the storage means having therein 10 times the multiplicand and add the amount in the positive accumulating means; means rendered effective by certain groups of disks to cause a sub-total to be taken from any one of the multiplicand storage means containing respectively 1, 2 or 3 times the multiplicand when an interpreted multiplier digit is respectively 9, 8 or 7 and subtract the amount from the negative accumulating means; and means to transfer the amount in one of the accumulating means to the other accumulating means to obtain a complete product.

49. A multiplying machine for multiplying a multiplicand by a multiplier, comprising means to set up multiplicand and multiplier data; multiple forming mechanism controlled by the first-mentioned means automatically to calculate and register a standard series of multiples of the multiplicand, a plurality of devices upon which said multiples are registered, multiplier receiving means, product receiving means, means controlled by said devices for entering said multiples into the product receiving means additively and certain of them into the product receiving means subtractively, and multiple selecting means controlled by said multiplier receiving means and automatically operable to select in accordance with each digit of the multiplier in turn for control of the entering means, the device or devices on which are registered the multiple which, or the pair of multiples whose sum or difference is equal to the product of the multiplicand and the multiplier digit, and operable to control the entering means to cause the multiples that are selected as the negative term of a difference to be entered subtractively into the product receiving means and the remainder to be entered additively.

50. A multiplying machine for multiplying a multiplicand by a multiplier, comprising means to set up multiplicand and multiplier data, multiple forming mechanism controlled by said first-mentioned means automatically to calculate and register a standard series of multiples of the multiplicand, a plurality of devices upon which said multiples are registered, multiplier receiving means, a pair of product accumulators, means controlled by said devices for entering said multiples into one or the other of said accumulators additively and certain of them into one of the accumulators subtractively, multiple selecting means controlled by said multiplier receiving means and automatically operable to select in accordance with each digit of the multiplier in turn for control of the entering means, the device or devices on which are registered multiple which, or the pair of multiples whose sum or difference is equal to the product of the multiplicand and the multiplier digit, and operable to control the entering means to cause the multiple that is selected as the negative term of a difference to be entered subtractively into one of said accumulators, and operable to further control the entering means to cause the multiple selected as the other term of the difference to be entered concurrently into the other accumulator, and means for transfer in the amount registered on one accumulator to the other.

51. In a machine of the class described comprising an accounting machine and a multiplying unit, the combination of printing mechanism; a plurality of accounting machine accumulators; differential mechanism operable to set the printing means to printing position and to enter values into said accounting machine accumulators; means to store multiples of the multiplicand; means to store multiplier digits; product accumulating means; a second differential mechanism operable to operate the multiplicand and multiplier storage means and the product accumulating means; means connecting the two differential mechanisms for unitary movement; cycle control means operable to control the cooperation of the storage means and the product accumulating means with the second differential mechanism during multiplying operations; and means controlled by said cycle control means to prevent the improper operation of the printing means and the accounting machine accumulators by their differential mechanism during certain multiplying cycles when said differential mechanism is operated with the second differential mechanism as it performs the multiplication.

52. In a machine of the class described having means for entering multiplicand data and multiplier data, the combination of a plurality of means to store multiples of the multiplicand, each multiple equal to the multiplicand times a different predetermined amount, which amounts taken alone or additively or subtractively in combination equal the digits of a notation; means controlled by the entering means for forming said multiples and setting them up in said storage means; multiplier receiving devices; means controlled by said entering means for setting the multiplier receiving devices to represent digits of the multiplier; a pair of product accumulators, at least one of which is an add-subtract accumulator; means to transmit multiples from said storage means to said product accumulators; and means controlled by said multiplier storage devices for selectively rendering said storage means operable to control the transmitting means to cause additive or subtractive entry of said multiples into said add-subtract product accumulator and for selectively rendering said storage means operable to control the transmitting means to cause additive entry of said multiples into the other of said product accumulators depending upon the value of the multiplier digits.

53. In a machine of the class described having product receiving means, the combination of means to enter a multiplicand and a multiplier into the machine; means to store complete multiples of the multiplicand equal to the multiplicand times predetermined digits of a notation and the multiplicand times 10; means to store the multiplier; means controlled by the entering means and operable during a plurality of cycles of operation to form the various multiples of the multiplicand and selectively set them up in the multiplicand storage means; means controlled by the entering means to set up the multiplier in said multiplier storage means; means to sense the setting of the multiplier storage means successively order by order to ascertain the digits of the multiplier; means to cause subtractive entries to be made in said product receiving means; means successively controlled by the sensing means in accordance with the value of the digits in the multiplier for rendering the multiplicand storage means selectively operable to control the transmission of multiples to the product receiving means and to selectively control the subtractive entry causing means to control the product receiving means for selective additive or subtractive entry of the multiples therein; and means to transmit the selected multiples from the storage means to the product receiving means.

54. In a multiplying machine, the combination of means to enter multiplicand and multiplier data; means to store multiples of the multiplicand comprising the multiplicand times predetermined digits of a notation; means to store a multiplier; means controlled by said entering means to set up the multiplicand in certain multiplicand storage means and to form other multiples of said multiplicand and enter them in certain multiplicand storage means, including a two-part actuating means; and means to control the two-part actuating means to enable one part to be controlled by the entering means to set up the multiplier digits in the multiplier storage means when the other part is entering the formed multiples in certain of the multiplicand storage means.

55. In a multiplying machine, the combination of means to enter multiplicand data therein; means for storing a multiple of the multiplicand equal to one times the multiplicand; means for storing a multiple of the multiplicand equal to two times the multiplicand; means for storing a multiple of the multiplicand equal to three times the multiplicand; means for storing a multiple of the multiplicand equal to ten times the multiplicand; an accumulator; differential actuators; and cycle control means operable to control the formation of said multiples in a plurality of cycles of operation of the machine, said cycle control means in the first cycle of operation causing the accumulator and storage means for one, three, and ten times the multiplicand to engage the actuators, which actuators are operated under control of the entering means, to enter the multiplicand therein; said cycle control means in the second cycle causing the accumulator to engage the actuators to receive a second entry of the multiplicand, which actuators are again operated under control of the entering means; and said cycle control means in said third cycle causing the engagement of the accumulator and the storage means for two and three times the multiplicand with the actuators to transfer the amount from said accumulator to said storage devices, whereby the multiples are formed during the plurality of cycles of operation of the machine.

56. In a machine of the class described having a pair of product accumulators at least one of which is an add-subtract accumulator, the combination of a plurality of means each operable to control entries into the product accumulators according to a multiple of the multiplicand equal to the multiplicand times a predetermined selected amount, which amounts when taken alone or additively or subtractively in combination equal the digits of a notation; a multiplier storage means; means to transmit said multiples to said product accumulators under control of said first-mentioned means; and means controlled by said multiplier storage means in accordance with the digits therein, for rendering the first-mentioned means selectively operable to control the transmitting means and to control the product accumulators to receive concurrent positive and negative entries of selected multiples when the multiplier digits have predetermined values.

57. In a machine of the class described, the combination of a pair of accumulators; a plurality of preset means each operable to control the entry of amounts in said accumulators equal to the multiplicand times a different predetermined value, which amounts taken alone or additively or subtractively in combination equal the multiplicand times the several digits of a notation; means to enter amounts positively or negatively into one of said accumulators under control of said first-mentioned means; means to enter amounts positively into the other of said accumulators under control of the first-mentioned means; multiplier means settable according to multiplier digits; and means variously controlled by the multiplier means according to the digits of the multiplier to selectively render effective to control the entering means, the preset means whose multiple equals, or simultaneously the pair of preset means the sum or difference of whose multiples equal the multiplicand times the multiplier digit, and to control the entering means to cause the proper positive or negative entry of the selected multiples in the accumulators.

58. In a multiplying machine, the combination of a pair of product accumulators; means for entering amounts additively or subtractively in one of said product accumulators; means for entering amounts additively in the other product accumulator; a plurality of means each potentially effective to control the entering means to effect entries of amounts corresponding to a multiple of a multiplicand which multiple equals the multiplicand times a predetermined value, which amounts taken alone or additively or subtractively in combination equal the multiplicand times the several digits of a notation; multiplier control means for exerting a control in accordance with the digits of a multiplier; and means controlled by the multiplier control means in accordance with the digits of the multiplier for selectively rendering effective one or pairs of said plurality of means to enable these means to control the entering means and for controlling the entering means to cause a positive entry to be made if only one of said plurality of means is rendered effective and a concurrent positive or positive and negative entry if a pair of said plurality of means is rendered effective.

59. In an accounting machine having printing means, a plurality of accumulators, and a multiplying attachment, the combination of means to set up a multiplicand and a multiplier; a plurality of means to store multiples of the multiplicand each equal to the multiplicand times a predetermined digit of a notation; means to store the multiplier; means controlled by said set up means to form said multiples and enter them in said storage means; cycle control means for said attachment; means controlled by said cycle control means to automatically cause a multiplication in successive steps by selecting said multiples of the multiplicand corresponding to each digit of the multiplier beginning with the lowest order; means to accumulate the result of each step of multiplication to obtain a complete product; means to block operation of the accounting machine accumulators; and means controlled by said cycle control means to control the operation of the printing means and render the blocking means for the accounting machine accumulators effective until the product has been formed to cause the product to be transferred from the product accumulating means to the accounting machine accumulators and simultaneously recorded only after multiplication is completed.

60. In a machine of the class described, the combination of means to enter multiplicand and multiplier data; means to store various multiples of the multiplicand equal to the multiplicand times selected amounts, which amounts taken alone or additively or subtractively in combination equal the digits of a notation; means to store a multiplier; means controlled by the entry means to form and set up the multiples of the multiplicand in the storage means for multiples of the multiplicand, said means also adapted to be controlled by the entry means to set up the multiplier in the multiplier storage means; means to progressively interpret each denominational digit stored in the multiplier storage means and select the storage means containing the multiple or multiples of the multiplicand corresponding to said digits; means to accumulate multiples of the multiplicand having one portion thereof operable to receive positive or negative entries and another portion thereof operable to receive positive entries; and means actuated under control of the selected multiplicand storage means to operate the accumulating means to enter the multiples contained in the controlling multiplicand storage means selectively additively or subtractively in said one portion of the accumulator and simultaneously additively in the other portion of the accumulator depending upon the digit being interpreted in the multiplier storage means.

61. In an accounting machine having amount keys, accumulators, and differential mechanism controlled by said amount keys and normally operable to enter amounts in said accumulators in adding and subtracting operations, the combination of a multiplication control device conditioned prior to and operable during a multiplying operation; machine operation initiating means; means to store a multiplicand; means to store a multiplier; and means rendered operable by said control device to selectively and sequentially cause two values successively set up on said amount keys to be entered into the multiplicand storage means and the multiplier storage means by means of said differential mechanism during successive operations initiated by said initiating means.

SAMUEL BRAND.
GUNNAR NELSON.

CERTIFICATE OF CORRECTION.

Patent No. 2,216,063.                    September 24, 1940.

SAMUEL BRAND, ET AL.

It is hereby certified that error appears in the printed specification of the above numbered patent requiring correction as follows: Page 11, first column, line 46, strike out the word "and"; page 15, first column, lines 20 and 23, for "conencted" read --connected--; line 62, for "teeth" read --tooth--; and second column, line 70, for "etxension" read --extension--; page 17, first column, line 9, after "their" insert --respective--; and second column, line 10, for "bent-ove" read --bent-over--; page 21, second column, line 2, for "hub 67" read --hub 647--; page 38, second column, line 22, for "notations" read --notation--; line 66, claim 3, after "means" first occurrence, and before the semicolon, insert --and one of the actuating means in order to take a sub-total from said storage means--; line 68, same claim, after "means" and before the period insert the following -

--to be set up on each of the actuating means during the sub-total operation; and means to engage the two accumulators with the actuating means in the sub-total operation to enter therein the multiple contained in the storage means--;

page 44, second column, line 3, claim 50, for "transfer in" read --transferring--; and that the said Letters Patent should be read with this correction therein that the same may conform to the record of the case in the Patent Office.

Signed and sealed this 19th day of November, A. D. 1940.

(Seal)

Henry Van Arsdale,
Acting Commissioner of Patents.